United States Patent
Kawasaki

(10) Patent No.: US 7,145,508 B2
(45) Date of Patent: Dec. 5, 2006

(54) RADIO FREQUENCY SIGNAL RECEIVING APPARATUS, A RADIO FREQUENCY SIGNAL TRANSMITTING APPARATUS, AND A CALIBRATION METHOD

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 250 days.

(21) Appl. No.: 10/994,132

(22) Filed: Nov. 19, 2004

(65) Prior Publication Data
US 2006/0007040 A1 Jan. 12, 2006

(30) Foreign Application Priority Data
Jul. 6, 2004 (JP) ............... 2004-199681

(51) Int. Cl.
*H01Q 3/26* (2006.01)
(52) U.S. Cl. ...................... 342/368; 342/372
(58) Field of Classification Search ............. None
See application file for complete search history.

(56) References Cited

U.S. PATENT DOCUMENTS

| 6,157,343 A * | 12/2000 | Andersson et al. ......... 342/371 |
| 6,559,799 B1 * | 5/2003 | Aoyama et al. ............ 342/377 |
| 2003/0186725 A1 | 10/2003 | Miya et al. |
| 2004/0063469 A1 | 4/2004 | Kuwahara et al. |
| 2004/0070533 A1 * | 4/2004 | Azuma ...................... 342/174 |

FOREIGN PATENT DOCUMENTS

| EP | 0 954 053 | 11/1999 |
| EP | 1 235 361 | 8/2002 |
| EP | 1235361 A1 * | 8/2002 |
| JP | 11-046180 | 2/1999 |

OTHER PUBLICATIONS

European Search Report dated Oct. 28, 2005.

* cited by examiner

*Primary Examiner*—Gregory C. Issing
(74) *Attorney, Agent, or Firm*—Katten Muchin Rosenman LLP

(57) ABSTRACT

The disclosed radio frequency signal transmitting and receiving apparatuses compensate for phase and amplitude differences without detecting sync timing of a calibration signal.

The radio frequency signal receiving apparatus consists of two or more antennas, radio frequency signal receiving units each being connected to an antenna, a calibration signal generating unit that generates the calibration signal having a cycle different from the cycle of a spread code, a radio frequency signal transmitting unit that converts the calibration signal into a radio frequency signal, directional couplers that add a radio frequency signal received by the respective antennas and the calibration signal in the radio frequency, a delaying unit that delays a baseband signal from the first radio frequency signal receiving unit, a correlation detecting unit that detects correlation between the output of the delaying unit and the baseband signal from the second radio frequency signal receiving unit, a weight generating unit, and a complex multiplier that compensates for the phase and gain differences due to the radio frequency signal receiving units based on the output of the correlation detecting unit.

16 Claims, 23 Drawing Sheets

FIG.2

| | | CYCLE T | | | | |
|---|---|---|---|---|---|---|
| ANT 0 (A) | | Cal(nT=0) | Cal(nT=1) | Cal(nT=2) | Cal(nT=3) | Cal(nT=4) |
| ANT 1 (B) | | Cal(nT=0) | Cal(nT=1) | Cal(nT=2) | Cal(nT=3) | Cal(nT=4) |
| ANT 1 (DELAY) (C) | | Cal(nT=−1) | Cal(nT=0) | Cal(nT=1) | Cal(nT=2) | Cal(nT=3) |
| CORRELATION VALUE (D) | | R(nT=0) | R(nT=1) | R(nT=2) | R(nT=3) | R(nT=4) | nT REPRESENTS NUMBER OF CYCLES
R REPRESENTS AUTOCORRELATION nT REPRESENTS NUMBER OF CYCLES
R REPRESENTS AUTOCORRELATION

RADIO FREQUENCY SIGNAL RECEIVING APPARATUS, A RADIO FREQUENCY SIGNAL TRANSMITTING APPARATUS, AND A CALIBRATION METHOD

BACKGROUND OF THE INVENTION

1. Field of the Invention

The present invention generally relates to a radio communications apparatus that uses an array antenna, and especially relates to a calibration method of a phase difference and a gain ratio (amplitude difference) at an antenna edge.

2. Description of the Related Art

Development of digital cellular radio communications systems using DS-CDMA (Direct Spread Code Division Multiple Access) technology as the next-generation mobile communications system is progressing. The CDMA method defines a channel by assigning a code unique to each channel and offers simultaneous multi-channel communications. Here, communications of a channel are often interfered with by signals of other channels. Consequently the number of channels that can be offered, i.e., channel capacity, is limited. Conversely, the channel capacity can be increased if the interference is effectively suppressed.

An adaptive array antenna adaptively forms a beam for a user of choice according to the environment such that a null point is formed toward a source of great interference, enabling an increase in the channel capacity. That is, a beam is formed in the direction of the user of choice such that a radio wave from the user of choice is received with sufficient sensitivity, and a radio wave from the source of great interference is suppressed by setting a null point in the direction of the source of the great interference. In this manner, the amount of interference can be reduced, and the channel capacity can be increased.

Here, the adaptive array antenna provides a beam by using a phase difference and an amplitude difference at an antenna edge. For this reason, if the phase and the amplitude (gain) fluctuate at each radio frequency signal receiving/transmitting unit, adequate control of the beam pattern becomes unavailable.

Therefore, in order to adequately control the beam pattern, it is necessary to compensate for the gain and amplitude differences at each antenna edge. The differences of the phase and the gain are compensated for by multiplexing a calibration signal, and by detecting and compensating for differences of the phase and the gain of the multiplexed signal.

FIG. 23 shows a conventional calibration apparatus for array antennas (Patent Reference 1). According to the conventional calibration apparatus, the calibration signal is spread spectrum in the radio bandwidth by a spreading unit 309. For this reason, in order to demodulate the spectrum spreading signal, it is necessary to perform a despreading process, and to detect a correlation value of each radio frequency signal receiving unit. The despreading process is performed based on coherent timing detected by a coherent unit 303 that detects the coherent timing of the calibration signal received by each radio frequency signal receiving unit.

[Patent Reference 1] JP, 11-46180, A

[Problem(s) to be Solved by the Invention]

As described above, according to the conventional calibration apparatus, in order to restore the calibration signal, the despreading process is performed and the correlation value is detected for each radio frequency signal receiving unit. For this reason, the function to detect coherent timing is indispensable. Further, even if coherent timing is input from a calibration signal generating unit, in the case that timing of the calibration signal generating unit is in units of chips and timing of the radio frequency signal receiving unit follows a 4-time over sampling technique, precision of ¼ chip is needed. For this reason, adjustment in units of quarters of a chip is indispensable.

That is, the conventional calibration apparatus needs to detect the coherent timing, for example, at ¼-chip precision. On the other hand, as for calibration, what is important is to obtain differences of the phase and the gain between the antennas, and detection of coherent timing is theoretically unnecessary.

SUMMARY OF THE INVENTION

It is a general object of the present invention to provide a radio frequency signal receiving apparatus, a radio frequency signal transmitting apparatus, and a calibration method that substantially obviate one or more of the problems caused by the limitations and disadvantages of the related art.

Specifically, the object of the invention is to offer a radio frequency signal receiving apparatus, a radio frequency signal transmitting apparatus, and a calibration method of compensating for the differences of the phase and the gain between the antennas produced by the radio frequency signal receiving units or the radio frequency signal transmitting units, as applicable, with an easy configuration without performing coherent timing detection of the calibration signal.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by the radio frequency signal receiving apparatus, the radio frequency signal transmitting apparatus, and the calibration method particularly pointed out in the specification in such full, clear, concise, and exact terms as to enable a person having ordinary skill in the art to practice the invention.

To achieve these and other advantages and in accordance with the purpose of the invention, as embodied and broadly described herein, the radio frequency signal receiving apparatus of the present invention includes two or more antennas, two or more radio frequency signal receiving units that are configured to receive a radio frequency signal that is spread by a spread code, the radio frequency signal receiving units being connected to respective antennas, a calibration signal generating unit that generates a calibration signal having a frequency different from the frequency of the spread code, a conversion unit that converts the generated calibration signal into a radio frequency signal, an adder that adds the calibration signal, which is converted into the radio frequency signal, and the radio frequency signal received with each of the antennas, a delaying unit that delays a baseband signal obtained by a first radio frequency signal receiving unit, a detection unit that detects correlations between the delayed baseband signal and a baseband signal obtained by a second radio frequency signal receiving unit, and a compensation unit that compensates for a phase difference and/or a gain difference between the antennas generated by the radio frequency signal receiving units based on the detected correlations.

In addition, the detection unit detects differences of the phase and the gain between two or more antennas, or detects differences of the phase and the gain between a predetermined antenna and another antenna.

The concept of the radio frequency signal receiving apparatus described above is also applied to the radio frequency signal transmitting apparatus of the present invention.

EFFECT OF THE INVENTION

According to the present invention, the differences of the phase and the gain are compensated for by the radio frequency signal receiving unit and the radio frequency signal transmitting unit without detecting coherent timing of the calibration signal. In this manner, the configuration of the calibration apparatus is simplified and the processing amount for calibration is reduced.

Further, since it is unnecessary to detect the coherent timing, degradation due to a detection error of the coherent timing is not a concern. As the calibration signal, a spectrum spreading signal, an OFDM (Orthogonal Frequency Division Multiplexing) signal, a chirp signal, etc., can be used.

BRIEF DESCRIPTION OF THE DRAWINGS

FIG. 2 is a timing chart showing operations of the radio frequency signal receiving apparatus according to the first embodiment of the present invention;

DESCRIPTION OF THE PREFERRED EMBODIMENTS

Figure 3:
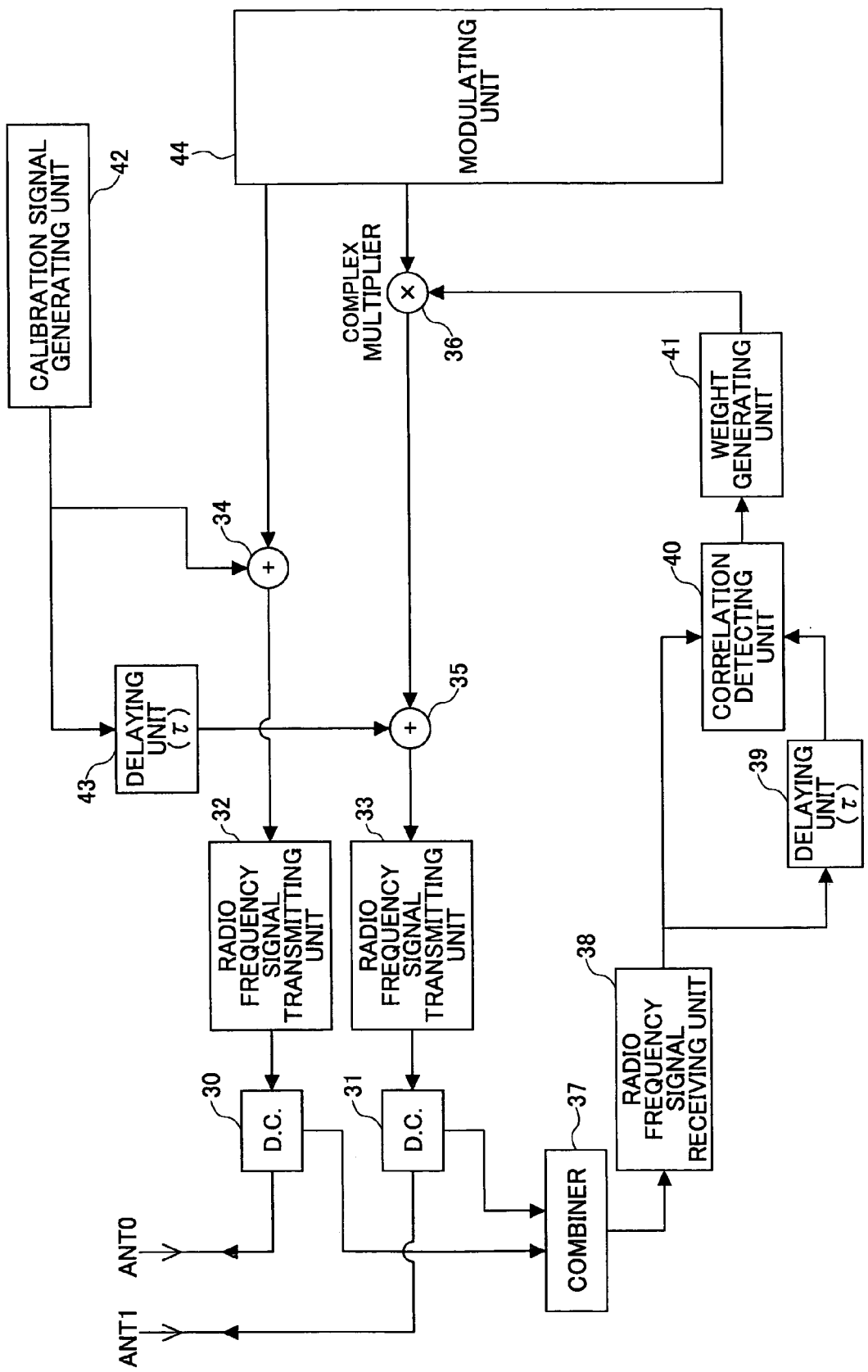
FIG. 3 is a block diagram showing the configuration of a radio frequency signal transmitting apparatus according to the second embodiment of the present invention.

In the following, embodiments of the present invention are described with reference to the accompanying drawings. First, examples to which the present invention is most suitably applied to are described, namely, the first embodiment (FIG. 1) and the second embodiment (FIG. 3). Then, modifications to the first embodiment are described with reference to FIG. 5 through FIG. 10, and modifications to the second embodiment are described with reference to FIG. 11 through FIG. 18.

Figure 1:
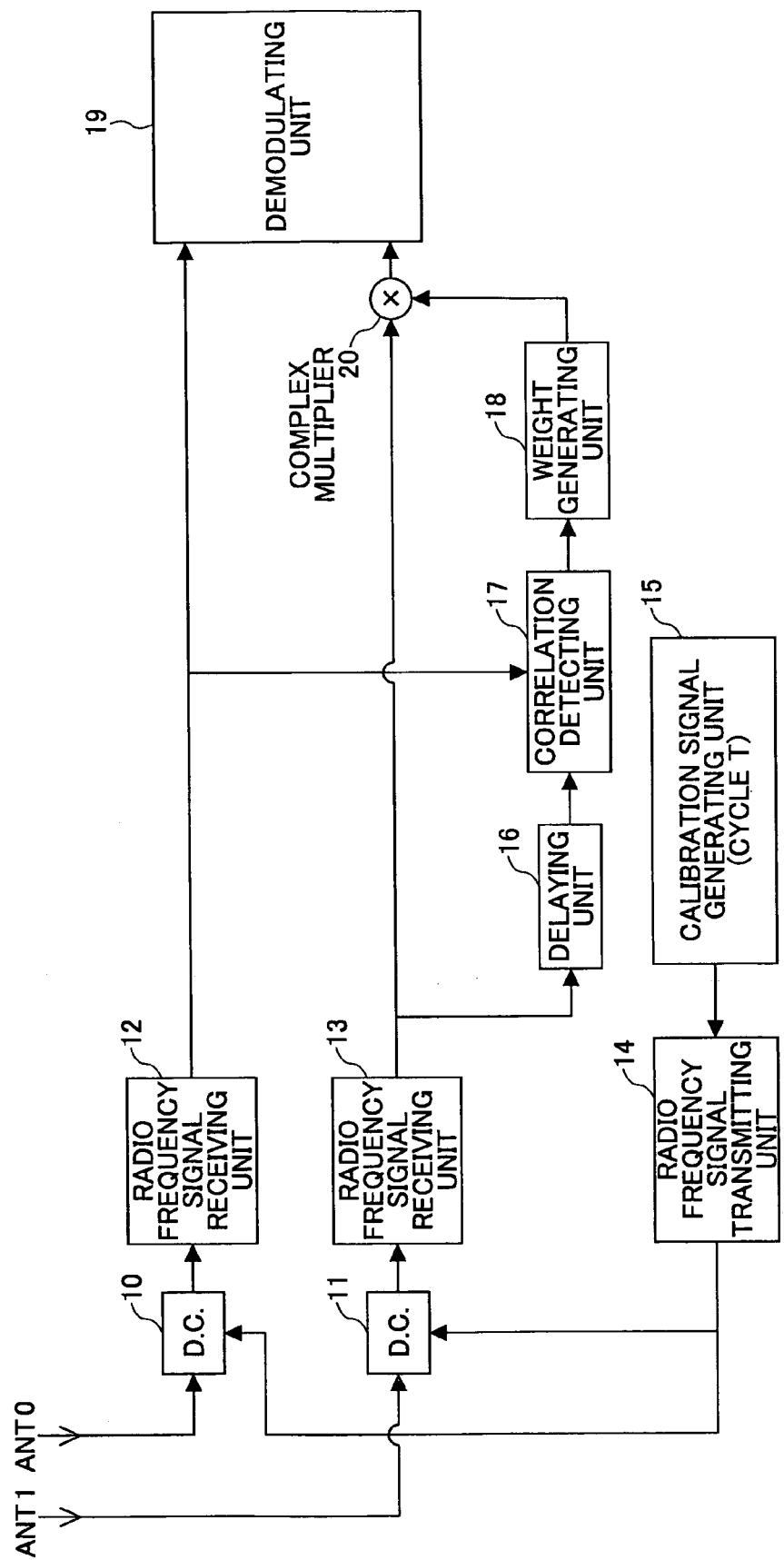
FIG. 1 is a block diagram showing the configuration of a radio frequency signal receiving apparatus according to the first embodiment of the present invention.

FIG. 1 is a block diagram showing the configuration of the radio frequency signal receiving apparatus according to the first embodiment of the present invention. The radio frequency signal receiving apparatus shown in FIG. 1 compensates for differences of the phase and the gain produced by radio frequency signal receiving units that are connected to respective antennas.

Specifically, the radio frequency signal receiving apparatus includes antennas ANT0 and ANT1, directional couplers (DCs) 10 and 11 that have a multiplexing function and an adding function, radio frequency signal receiving units 12 and 13, a radio frequency signal transmitting unit 14 with a baseband-to-RF conversion function, a calibration signal generating unit 15 that generates a calibration signal of a cycle T, a delaying unit 16, a correlation detecting unit 17, a weight generating unit 18, a demodulating unit 19, and a complex multiplier 20.

A radio frequency signal carrying a main signal is received by the antennas ANT0 and ANT1, and is provided to the radio frequency signal receiving units 12 and 13, respectively, through the DCs 10 and 11, respectively, and converted into baseband signals. The baseband signals are provided to the demodulating unit 19, and the main signal is obtained. Here, the baseband signal from the radio frequency signal receiving unit 13 is provided to the demodulating unit 19 through the complex multiplier 20.

The calibration signal generating unit 15 generates the calibration signal having the cycle T that is different from the cycle of the radio frequency signal received by the antennas ANT0 and ANT1. For example, if the received signal is a CDMA signal and the cycle of the spread code is expressed by T', T is set different from T', i.e., T<T' or T>T'.

The radio frequency signal transmitting unit 14 converts the calibration signal into a radio frequency signal. Then, DCs 10 and 11 multiplex the calibration signal in the radio frequency and the radio frequency signal carrying a main signal provided by the antennas ANT0 and ANT1, respectively.

The radio frequency signal receiving units 12 and 13 convert the respective multiplexed signals in the radio frequency into baseband signals. The baseband signals contain the main signal and the calibration signal, and the phase and the gain (amplitude) of the baseband signals output from the radio frequency signal receiving units 12 and 13 are often different from each other.

The delaying unit 16 delays the baseband signal from the radio frequency signal receiving unit 13 by n times the cycle T of the calibration signal, i.e., by nT, where n is a natural number. Then, the correlation detecting unit 17 detects correlations between the baseband signal that is delayed by the delaying unit 16, and the baseband signal from the radio frequency signal receiving unit 12.

At this time, if the phase and the amplitude of the two baseband signals output from the radio frequency signal receiving units 12 and 13 are the same, correlation of the calibration signals is 1. Further, in the case of the CDMA signals, if one of the two signals is delayed by 1 or more chips in reference to the other signal, they are not in correlation, and since noise also has a time difference, it is not in correlation. For this reason, the received signals from the antennas ANT1 and ANT0 are not in correlation.

The weight generating unit 18 converts a correlation value detected by the correlation detecting unit 17 into a weighting (weighting value). The complex multiplier 20 multiplies the weighting from the weight generating unit 18 by the baseband signal from the radio frequency signal receiving unit 13. The differences in the phase and the amplitude between the baseband signals obtained by the radio frequency signal receiving units 12 and 13 are compensated for by this multiplication.

Below, the calibration by the radio frequency signal receiving apparatus according to the present embodiment is explained using formulas, wherein the following notations are used.

The calibration signal generated by the calibration signal generating unit 15: $Cal = re^{j\omega t} = re^{j\omega t + nT}$ Received signal of an antenna (CDMA signal): Rx Delay by the radio frequency signal receiving unit connected to the antenna ANT0: $\tau_0$ Delay by the radio frequency signal receiving unit connected to the antenna ANT1: $\tau_1$ Phase rotation by the radio frequency signal receiving unit connected to the antenna ANT0: $\theta_0$ Phase rotation by the radio frequency signal receiving unit connected to the antenna ANT1: $\theta_1$ The baseband signal $Rx_0$ on the side of the antenna ANT0 is expressed by the following formula.

$$Rx_0(t) = r_0 e^{j(\omega(t-\tau_0)+\theta_0)} + Rx(t-\tau_0) \quad (1)$$

Similarly, the baseband signal $Rx_1$ on the side of the antenna ANT1 is expressed by the following formula.

$$Rx_1(t) = r_1 e^{j(\omega(t-\tau_1)+\theta_1)} + Rx(t-\tau_1) \quad (2)$$

A signal $RxDelay_1(t)$, which is the same as the baseband signal on the side of the antenna ANT1, but is delayed by nT, is expressed by the following formula.

$$RxDelay_1(t) = r_1 e^{j(\omega(t-\tau_1-nT)+\theta_1)} + Rx(t-\tau_1-nT) \quad (3)$$

Here, since $T = 2\pi/\omega$ \quad (4)

the formula (3) can be expressed as follows.

$$RxDelay_1(t) = r_1 e^{j(\omega(t-\tau_1)+\theta_1)} + Rx(t-\tau_1-nT) \quad (5)$$

Correlation between $Rx_0(t)$ and $RxDelay_1(t)$ is expressed by the following formula.

$$R(\tau) = \int_{-\infty}^{\infty} Rx_0(t) RxDelay_1^*(t-\tau) dt \quad (6)$$

In the above, $RxDelay_1(t)^*$ represents the complex conjugate of $RxDelay_1(t)$. Since the correlation value to calculate is at a point where the phases agree, i.e., $\tau=0$, and the calibration signal is a periodic signal of the cycle T, R(0) is expressed as follows.

$$R(0) = \int_0^T Rx_0(t) RxDelay_1^*(t) dt \quad (7)$$

Further, R(0) of the formula (7) is expressed as follows with reference to the formula (1) and the formula (5).

$$R(0) = \int_0^T (r_0 e^{j(\omega(t-\tau_0)+\theta_0)} + Rx(t-\tau_0))(r_1 e^{-j(\omega(t-\tau_1)+\theta_1)} + Rx^*(t-\tau_1-nT)) dt \quad (8)$$

$$= \int_0^T (r_0 e^{j(\omega(t-\tau_0)+\theta_0)} \times r_1 e^{-j(\omega(t-\tau_1)+\theta_1)}) dt + \quad (9)$$
$$\int_0^T (r_0 e^{j(\omega(t-\tau_0)+\theta_0)} \times Rx^*(t-\tau_1-nT)) dt +$$
$$\int_0^T (Rx(t-\tau_0) \times r_1 e^{-j(\omega(t-\tau_1)+\theta_1)}) dt +$$
$$\int_0^T (Rx(t-\tau_0) \times Rx^*(t-\tau_1-nT)) dt$$

In the formula (9), the second and the third terms have no correlation to the received signal (CDMA signal) and the calibration signal; therefore, they are approximated to zero. Further, the fourth term represents correlation between received signals (CDMA signal) having a time difference of 1 or more chips; therefore, it is approximated to zero.

Therefore, R(0) of formula (9) is approximated as follows.

$$R(0) \approx \int_0^T (r_0 e^{j(\omega(t-\tau_0)+\theta_0)} \times r_1 e^{-j(\omega(t-\tau_1)+\theta_1)}) dt \qquad (10)$$

$$= r_0 r_1 e^{j(\omega(\tau_1-\tau_0)+\theta_0-\theta_1)} \times T \qquad (11)$$

Here, $r_0 e^{j(\omega(-\tau_0)+\theta_0)}$ is taken as the base, i.e., $r_0 e^{j(\omega(-\tau_0)+\theta_0)}$ is set to 1, and R(0) is expressed as follows.

$$R(0) = r_1 e^{j(\omega\tau_1-\theta_1)} \times T \qquad (12)$$

In this manner, the differences of the phase and the gain between the antenna ANT0 and the antenna ANT1 are obtained.

Since the ratio of the frequency of the carrier (for example, several GHz) to the frequency ω of the calibration signal (for example, several kHz) is great, ωτ1 can be disregarded, and R(0) can be approximated as follows.

$$R(0) \approx r_1 e^{j\theta_1} \times T \qquad (13)$$

In this manner, the differences of the phase and the gain between the antennas ANT0 and the antenna ANT1 are obtained.

Based on the output R(0) from the correlation detecting unit 17, the weight generating unit 18 generates the weighting for compensating for the phase and gain differences between the antennas due to the radio frequency signal receiving units 12 and 13. The complex multiplier 20 multiplies the weighting and the output of the radio frequency signal receiving unit 13. In this manner, the phase and gain differences between the antenna edges due to the radio frequency signal receiving units 12 and 13 are compensated for.

FIG. 2 is a timing chart showing operations of the radio frequency signal receiving apparatus according to the present embodiment. In FIG. 2, ANT0 (A) shows the calibration signal multiplexed by the DC 10 that is connected to the antenna ANT0, and ANT1 (B) shows the calibration signal multiplexed by the DC 11 that is connected to the antenna ANT1. The multiplexed calibration signals of the cycle T are provided to the radio frequency signal receiving units 12 and 13 and converted into respective baseband signals.

Next, delay of the same time as the calibration signal cycle T is given to the baseband signal on the side of the antenna ANT1. The signal at this time is shown in ANT1 (delay) (C). A value of correlation between the signal of the antenna ANT0 and the signal of the antenna ANT1 (delay) can be detected every cycle T, and, accordingly, the phase and gain differences between the antennas ANT0 and ANT1 are detected and compensated for, as shown by Correlation Value (D) of FIG. 2.

FIG. 3 is a block diagram showing the configuration of a radio frequency signal transmitting apparatus according to the second embodiment of the present invention. The radio frequency signal transmitting apparatus shown in FIG. 3 compensates for the differences of the phase and the gain due to the radio frequency signal transmitting units corresponding to the antennas ANT0 and ANT1.

Specifically, the radio frequency signal transmitting apparatus includes the antennas ANT0 and ANT1, directional couplers (DCs) 30 and 31 that have signal branching functions, radio frequency signal transmitting units 32 and 33, adders 34 and 35, a complex multiplier 36, a combiner 37, a radio frequency signal receiving unit 38 that converts a radio frequency signal to a baseband signal, delaying units 39 and 43 that provide time delay τ, a correlation detecting unit 40, a weight generating unit 41, a calibration signal generating unit 42 that generates a calibration signal having a cycle T, and a modulating unit 44.

The calibration signal generating unit 42 generates a calibration signal that has a cycle different from the cycle of a signal to be transmitted (transmission signal), for example, the cycle of the spread code that is used in the case of the CDMA signal. The delaying unit 43 delays the generated calibration signal of a selected antenna system. Specifically, the delaying unit 43 delays the calibration signal that is to be added to the baseband signal for transmission from the antenna ANT1 by a time τ.

The adder 34 adds the calibration signal generated by the calibration signal generating unit 42 and an output from the modulating unit 44. The adder 35 adds the calibration signal that is delayed by the delaying unit 43 and an output from the complex multiplier 36. The adders 34 and 35 output the respective added signals, which are baseband signals, to the radio frequency signal transmitting units 32 and 33, respectively. The radio frequency signal transmitting units 32 and 33 convert the baseband signals from the adders 34 and 35, respectively, into radio frequency signals. The radio frequency signals are transmitted from the corresponding antennas ANT0 and ANT1 through the respective DCs 30 and 31.

Next, the DCs 30 and 31 branch the respective radio frequency signals provided from the respective radio frequency signal transmitting units 32 and 33 to the combiner 37. The combiner 37 combines the radio frequency signals corresponding to the antennas ANT0 and ANT1. The radio frequency signal receiving unit 38 converts the combined radio frequency signal provided by the combiner 37 into a baseband signal. A part of the baseband signal is provided to the delaying unit 39 while the other part is provided to the correlation detecting unit 40.

The delaying unit 39 delays the baseband signal provided by the radio frequency signal receiving unit 38. The delay time is the same delay time τ as the time that is delayed by the delaying unit 43. The correlation detecting unit 40 takes correlation between the baseband signal from the radio frequency signal receiving unit 38 and the baseband signal delayed by the delaying unit 39.

In this correlation detection, when the phase and amplitude of the radio frequency signals that are output from the radio frequency signal transmitting units 32 and 33 are the same, correlation of the calibration signals is 1. Further, in the case of the CDMA signals, if one of two signals is delayed by 1 or more chips in reference to the other signal, they are not in correlation. For this reason, the baseband signals output from the modulating unit 44 are not in correlation.

The weight generating unit 41 converts the correlation output from the correlation detecting unit 40 into a weighting, and outputs the weighting to the complex multiplier 36. The complex multiplier 36 multiplies the baseband signal from the modulating unit 44 and the weighting from the weight generating unit 41. In this manner, the phase and amplitude differences between the signals output from the radio frequency signal transmitting units 32 and 33 are compensated for.

Below, the calibration performed by the radio frequency signal transmitting apparatus according to the present embodiment is explained using formulas. Here, the case where a burst tone signal is used as the calibration signal is explained. The following notations are used in the formulas.

The calibration signal:

$$Cal = \begin{cases} re^{j\omega t} & 0 < t < \tau \\ 0 & \tau < t < T \end{cases} \quad (14)$$

Transmitting baseband signal output from the modulating unit 44: Tx

Delay by the radio frequency signal transmitting unit connected to the antenna ANT0: $\tau_0$ Delay by the radio frequency signal transmitting unit connected to the antenna ANT1: $\tau_1$ Phase rotation by the radio frequency signal transmitting unit connected to the antenna ANT0: $\theta_0$ Phase rotation by the radio frequency signal transmitting unit connected to the antenna ANT1: $\theta_1$ The transmitting baseband signal $Tx_0$ on the side of the antenna ANT0, and the transmitting baseband signal $Tx_1$ on the side of the antenna ANT1 are expressed by the following formulas.

$$Tx_0 = \begin{cases} re^{j(\omega t)} + Tx(t) & 0 < t < \tau \\ Tx(t) & \tau < t < T \end{cases} \quad (15), (16)$$

$$Tx_1 = \begin{cases} Tx(t) & 0 < t < \tau \\ re^{j(\omega(t-\tau))} + Tx(t) & \tau < t < 2\tau \\ Tx(t) & 2\tau < t < T \end{cases}$$

Further, the baseband signal, converted by the radio frequency signal receiving unit 38 after the combiner 37 combines the outputs of the DCs 30 and 31 connected to respective antennas, is expressed by the following formula.

$$Rx = Tx_0(t - \tau_0) + Tx_1(t - \tau_1) \quad (17)$$

$$= \begin{cases} r_0 e^{j(\omega(t-\tau_0)+\theta_0)} + Tx(t - \tau_0) + Tx(t - \tau_1) & 0 < t < \tau \\ r_1 e^{j(\omega(t-\tau_1)+\theta_1)} + Tx(t - \tau_0) + Tx(t - \tau_1) & \tau < t < 2\tau \\ Tx(t - \tau_0) + Tx(t - \tau_1) & 2\tau < t < T \end{cases}$$

The baseband signal RxDelay with the time delay $\tau$ is expressed as follows.

$$RxDelay = \quad (18)$$

$$\begin{cases} r_0 e^{j(\omega(t-\tau_0-\tau)+\theta_0)} + Tx(t - \tau_0 - \tau) + & \tau < t < 2\tau \\ Tx(t - \tau_1 - \tau) \\ r_1 e^{j(\omega(t-\tau_1-\tau)+\theta_1)} + Tx(t - \tau_0 - \tau) + & 2\tau < t < 3\tau \\ Tx(t - \tau_1 - \tau) \\ Tx(t - \tau_0 - \tau) + Tx(t - \tau_1 - \tau) & 3\tau < t < T + \tau \\ & (3\tau < t < T, 0 < t < \tau) \end{cases}$$

Here, if $$\tau = 2\pi n/\omega \quad (19)$$

is assumed, RxDelay of the formula (18) is expressed by the following formula.

$$RxDelay = \begin{cases} r_0 e^{j(\omega(t-\tau_0)+\theta_0)} + Tx(t - \tau_0 - \tau) + & \tau < t < 2\tau \\ Tx(t - \tau_1 - \tau) \\ r_1 e^{j(\omega(t-\tau_1)+\theta_1)} + Tx(t - \tau_0 - \tau) + & 2\tau < t < 3\tau \\ Tx(t - \tau_1 - \tau) \\ Tx(t - \tau_0 - \tau) + Tx(t - \tau_1 - \tau) & 3\tau < t < T + \tau \\ & (3\tau < t < T, 0 < t < \tau) \end{cases} \quad (20)$$

Correlation between Rx and RxDelay is expressed by the following formula.

$$R(\tau) = \int_{-\infty}^{\infty} Rx(t) \times RxDelay^*(t - \tau) dt \quad (21)$$

Since the correlation value to calculate is at the point $\tau=0$ where the phases agree, and since the signal is periodic, $R(0)$ is expressed as follows.

$$R(0) = \int_0^T Rx(t) \times RxDelay^*(t) dt \quad (22)$$

The formula (22) is expressed by the following formula based on the formula (17) and the formula (20).

$$R(0) = \int_0^T Rx(t) \times RxDelay^*(t) dt \quad (23)$$

$$= \int_0^\tau ((r_0 e^{j(\omega(t-\tau_0)+\theta_0)} + Tx(t - \tau_0) + Tx(t - \tau_1)) \times$$

$$(Tx(t - \tau_0 - \tau) + Tx(t - \tau_1 - \tau))^*) dt +$$

$$\int_\tau^{2\tau} (r_1 e^{j(\omega(t-\tau_1)+\theta_1)} + Tx(t - \tau_0) + Tx(t - \tau_1)) \times$$

$$((r_0 e^{j(\omega(t-\tau_0)+\theta_0)} + Tx(t - \tau_0 - \tau) + Tx(t - \tau_1 - \tau))^*) dt +$$

$$\int_{2\tau}^{3\tau} ((Tx(t - \tau_0) + Tx(t - \tau_1)) \times (r_1 e^{j(\omega(t-\tau_1)+\theta_1)} +$$

$$Tx(t - \tau_0 - \tau) + Tx(t - \tau_1 - \tau))^*) dt +$$

$$\int_{3\tau}^T ((Tx(t - \tau_0) + Tx(t - \tau_1)) \times (Tx(t - \tau_0 - \tau) +$$

$$Tx(t - \tau_1 - \tau))^*) dt$$

As for the formula (23), since at least one of correlation between the transmission signal (CDMA signal) and the calibration signal, and correlation between the transmission signals (CDMA signal), which are apart by 1 or more chips, is nearly zero, the first term, the third term, and the fourth term can be approximated to zero. Further, the second term is expressed as follows.

$$R(0) \approx \int_\tau^{2\tau} (r_1 e^{j(\omega(t-\tau_1)+\theta_1)} + Tx(t - \tau_0) + Tx(t - \tau_1)) \times \quad (24)$$

$$(r_0 e^{-j(\omega(t-\tau_0)+\theta_0)} + Tx^*(t - \tau_0 - \tau) + Tx^*(t - \tau_1 - \tau)) dt$$

$$= \int_\tau^{2\tau} (r_1 e^{j(\omega(t-\tau_1)+\theta_1)} \times r_0 e^{-j(\omega(t-\tau_0)+\theta_0)}) dt +$$

-continued $$\int_{\tau}^{2\tau} (r_1 e^{j(\omega(t-\tau_1)+\theta_1)} \times Tx^*(t-\tau_0-\tau))dt +$$

$$\int_{\tau}^{2\tau} (r_1 e^{j(\omega(t-\tau_1)+\theta_1)} \times Tx^*(t-\tau_1-\tau))dt +$$

$$\int_{\tau}^{2\tau} (Tx(t-\tau_0) \times r_0 e^{-j(\omega(t-\tau_0)+\theta_0)})dt +$$

$$\int_{\tau}^{2\tau} (Tx(t-\tau_0) \times Tx^*(t-\tau_0-\tau))dt +$$

$$\int_{\tau}^{2\tau} (Tx(t-\tau_0) \times Tx^*(t-\tau_1-\tau))dt +$$

$$\int_{\tau}^{2\tau} (Tx(t-\tau_1) \times r_0 e^{-j(\omega(t-\tau_0)+\theta_0)})dt +$$

$$\int_{\tau}^{2\tau} (Tx(t-\tau_1) \times Tx^*(t-\tau_0-\tau))dt +$$

$$\int_{\tau}^{2\tau} (Tx(t-\tau_1) \times Tx^*(t-\tau_1-\tau))dt$$

As for the formula (24), since at least one of correlation between the transmission signal (CDMA signal) and the calibration signal, and correlation between the transmission signals (CDMA signal), which are apart by 1 or more chips, is nearly zero, terms other than the first term can be approximated to be zero. Then, the formula (24) is expressed by the following formula.

$$R(0) \approx \int_{\tau}^{2\tau} (r_1 e^{j(\omega(t-\tau_1)+\theta_1)} \times r_0 e^{-j(\omega(t-\tau_0)+\theta_0)})dt \quad (25)$$

$$= r_1 r_0 e^{j(\omega(\tau_0-\tau_1)+\theta_1-\theta_0)} \times \tau$$

Further, the ratio of the carrier frequency (for example, several GHz) to the frequency ω of the calibration signal (for example, several kHz) is great, and for this reason, $\omega(\tau_0-\tau_1)$ is approximated to be zero. Then, R(0) is approximated as follows.

$$R(0) \approx r_1 r_0 e^{j(\theta_1-\theta_0)} \times \tau \quad (26)$$

Here, if R(0) is to be based on $Tx_0$ (i.e., $r_0 e^{j\theta_0}=1$), R(0) is expressed as follows.

$$R(0)=r_1 e^{j\theta_1} \quad (27)$$

The value of correlation between the antenna ANT0 and the antenna ANT1 is obtained in this manner.

Based on the output R(0) of the correlation detecting unit 40, the weight generating unit 41 generates a weighting for compensating for the phase and gain differences between the antennas due to the radio frequency signal transmitting units 32 and 33. The multiplication of the weighting by the baseband signal from the modulating unit 44 is carried out by the complex multiplier 36 such that the phase and gain differences due to the radio frequency signal transmitting units 32 and 33 are compensated for.

Figure 4:
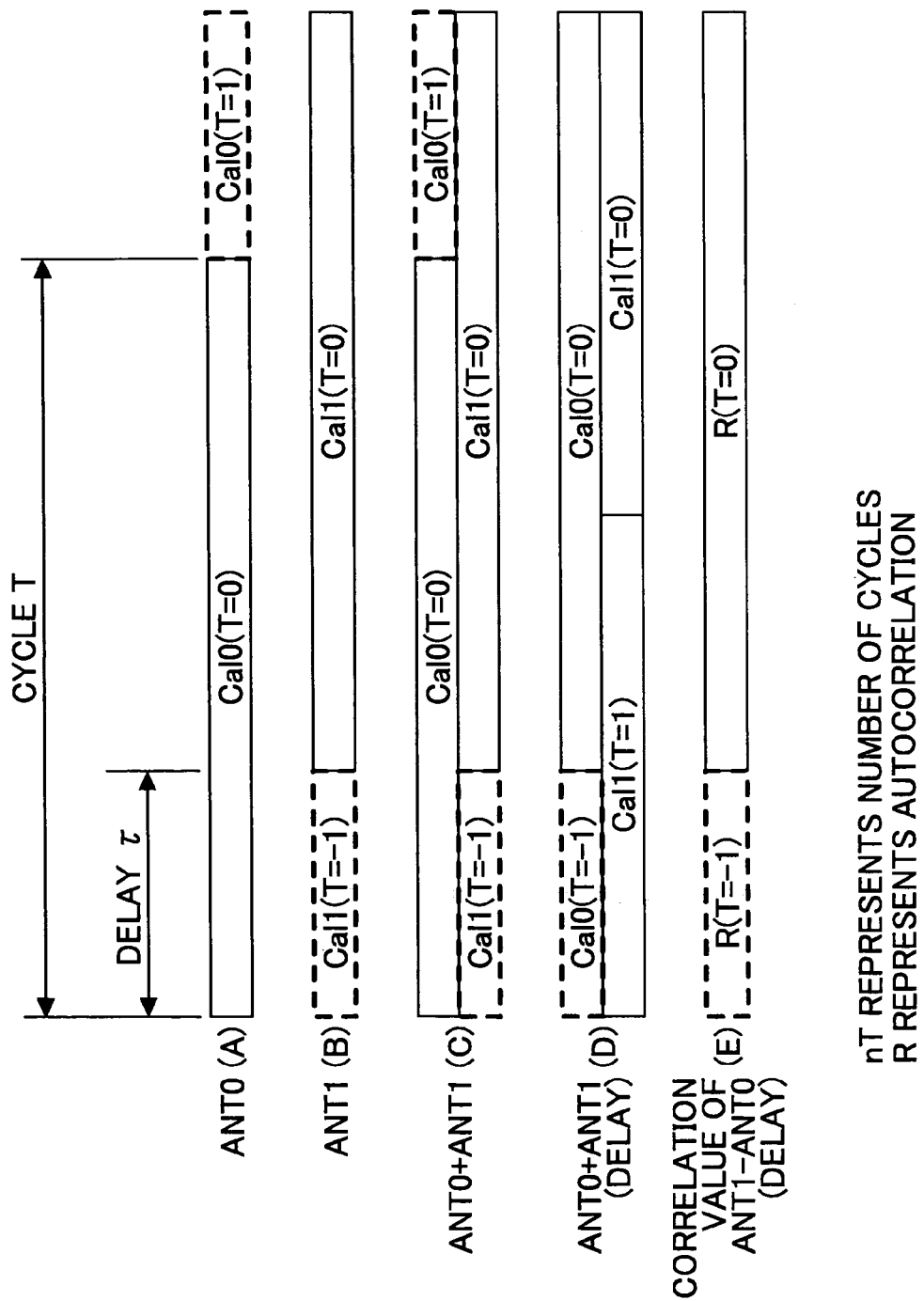
FIG. 4 is a timing chart showing operations of the radio frequency signal transmitting apparatus according to the second embodiment of the present invention.

FIG. 4 is a timing chart showing operations of the radio frequency signal transmitting apparatus according to the present embodiment.

In FIG. 4, ANT0 (A) shows the baseband signal (the main signal) from the modulating unit 44 to which the calibration signal has been added. Further, ANT1 (B) shows the baseband signal (the main signal) output from the modulating unit 44 to which the calibration signal delayed by the delaying unit 43 has been added. Then, the baseband signals ANT0 (A) and ANT1 (B) are converted into respective radio frequency signals by the respective radio frequency signal transmitting units 32 and 33, and provided to the respective DCs 30 and 31 that output parts of the signals ANT0 (A) and ANT1 (B) to the combiner 37. The combiner 37 combines the input signals, and the radio frequency signal receiving unit 38 converts the combined signal into a baseband signal. The baseband signal is shown as ANT0+ANT1 (C). Further, a part of the signal ANT0+ANT1 (C) is delayed by the delaying unit 39, and becomes ANT0+ANT1 (delay) (D).

Here, the signals ANT0+ANT1 (C) and ANT0+ANT1 (delay) (D) have the same timing, namely, Cal1 (T=−1) of ANT0+ANT1 (C), and Cal0 (T=−1) of ANT0+ANT1 (delay) (D). Accordingly, a value R of correlation between the signals ANT0+ANT1 (C) and ANT0+ANT1 (delay) (D) is detected over a period T. In this manner, the differences of phase and gain between the edges of the antennas ANT0 and ANT1 are detected and compensated for.

EXAMPLE

Figure 5:
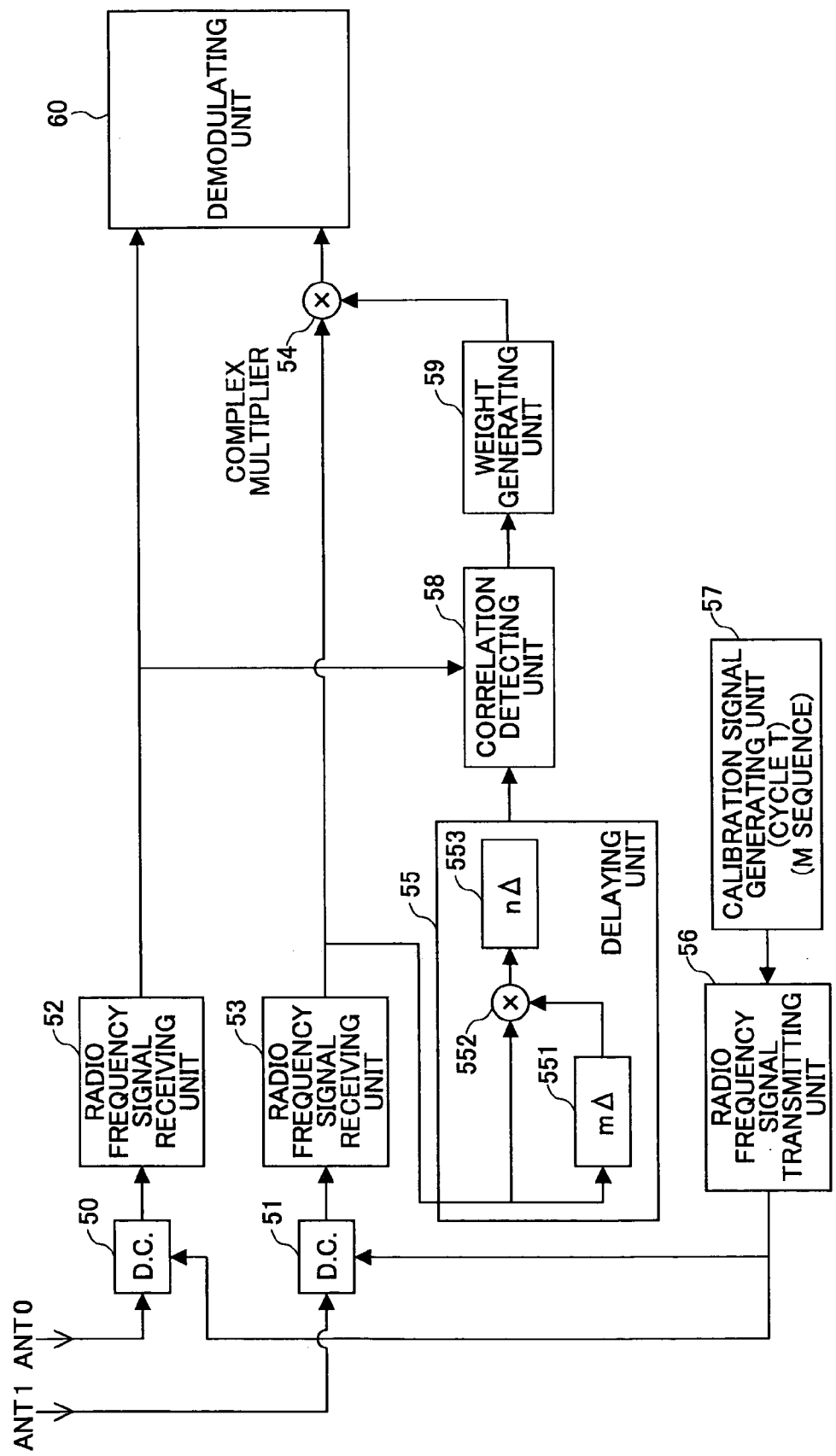
FIG. 5 is a block diagram showing the configuration of the radio frequency signal receiving apparatus according to the third embodiment of the present invention.

FIG. 5 is a block diagram showing the configuration of the radio frequency signal receiving apparatus according to the third embodiment of the present invention. The radio frequency signal receiving apparatus shown in FIG. 5 is variation 1 of the radio frequency signal receiving apparatus according to the first embodiment shown by FIG. 1.

The variation 1 is characterized in that a PN signal of an M sequence is used as the calibration signal, and the cycle-and-add property of the M sequence is used. A polynomial generator is employed in order to delay the PN signal of the M sequence. This configuration allows a simple circuit to provide the delay.

The radio frequency signal receiving apparatus according to the present embodiment includes the antennas ANT0 and ANT1, directional couplers (DCs) 50 and 51 having a multiplexing function and an adder function, radio frequency signal receiving units 52 and 53, a complex multiplier 54, a delaying unit 55, a radio frequency signal transmitting unit 56 with a frequency conversion function to a radio frequency signal, a calibration signal generating unit 57 that generates the calibration signal that is a PN signal of the M sequence of the cycle T, and a correlation detecting unit 58, a weight generating unit 59, and a demodulating unit 60.

Further, the delaying unit 55 consists of a delaying device 551 that delays the time of an input signal by mΔ, a multiplier 552, and a delaying device 553 that delays the time of an input signal by nΔ.

The radio frequency signal containing the main signal is received by the antennas ANT0 and ANT1, and provided to the radio frequency signal receiving units 52 and 53, respectively, through the DCs 50 and 51, respectively. The radio frequency signal receiving units 52 and 53 convert the radio frequency signal into respective baseband signals. The converted baseband signals are demodulated by the demodulating unit 60 such that the main signal is restored. Here, the baseband signal output by the radio frequency signal receiving unit 53 is provided to the demodulating unit 60 through the complex multiplier 54.

The calibration signal generating unit 57 generates a PN signal of the M sequence as the calibration signal that has a cycle T different from the received radio frequency signal. The radio frequency signal transmitting unit 56 converts the calibration signal into a radio frequency signal. The calibration signal in the radio frequency is provided to the DCs 50 and 51 and multiplexed with the radio frequency signal containing the main signal received by each of the antennas ANT0 and ANT1.

The radio frequency signal receiving units 52 and 53 convert the multiplexed signals in the radio frequency into respective baseband signals. The baseband signals contain the main signal and the calibration signal, which are multiplexed, and there are differences in the phase and gain between the outputs of the radio frequency signal receiving units 52 and 53.

The multiplier 552 of the delaying unit 55 multiplies the baseband signal from the radio frequency signal receiving unit 53 and the same signal that is delayed by $m\Delta$ by the delaying unit 551, and provides the multiplication result to the delaying unit 553. The delaying unit 553 delays the multiplication result by $n\Delta$, and provides the delayed multiplication result to the correlation detecting unit 58.

The correlation detecting unit 58 detects correlation between the baseband signal from the radio frequency signal receiving unit 52, and the baseband signal delayed by the delaying unit 55. If the phase and amplitude of the baseband signals output from the radio frequency signal receiving units 52 and 53 are the same, the value of correlation of the calibration signal is 1.

The weight generating unit 59 converts the correlation value from the correlation detecting unit 58 into a weighting. The complex multiplier 54 multiplies the weighting from the weight generating unit 59 by the baseband signal from the radio frequency signal receiving unit 53. The differences of the phase and amplitude between the radio frequency signal receiving units 52 and 53 are compensated for by this multiplication.

Below, the calibration by the radio frequency signal receiving apparatus according to the present embodiment is explained using formulas.

The following notations are used. Calibration Signal:

$$Cal = re^{jc(t)\frac{\pi}{2}} \atop c(t) = 1 \text{ or } -1 \Bigg\} \quad (28)$$

Cycle-and-Add Property:

$$c(t)c(t-m\Delta)=c(t+n\Delta) \quad (29)$$

Received signal at an antenna (CDMA signal): Rx
Delay by the radio frequency signal receiving unit connected to the antenna ANT0: $\tau_0$
Delay by the radio frequency signal receiving unit connected to the antenna ANT1: $\tau_1$
Phase rotation of the radio frequency signal receiving unit connected to the antenna ANT0: $\theta_0$
Phase rotation of the radio frequency signal receiving unit connected to the antenna ANT1: $\theta_1$ The baseband signal of the antenna ANT0 is expressed by the following formula.

$$Rx_0(t) = r_0 e^{j(c(t-\tau_0)\frac{\pi}{2}+\theta_0)} + Rx(t-\tau_0) \quad (30)$$

Further, the baseband signal of the antenna ANT is expressed as follows.

$$Rx_1(t) = r_1 e^{j(c(t-\tau_1)\frac{\pi}{2}+\theta_1)} + Rx(t-\tau_1) \quad (31)$$

Next, $Rx_1(t)$ is delayed by the delaying unit 55 using the cycle-and-add property of the calibration signal. First, the output of the multiplier 552 is expressed by the following formula.

$$(r_1 e^{j(c(t-\tau_1)\frac{\pi}{2}+\theta_1)} + Rx(t-\tau_1)) \quad (32)$$
$$(r_1 e^{j(c(t-\tau_1-m\Delta)\frac{\pi}{2}+\theta_1)} + Rx(t-\tau_1-m\Delta)) =$$
$$r_1 e^{j(c(t-\tau_1)\frac{\pi}{2}+\theta_1)} \times r_1 e^{j(c(t-\tau_1-m\Delta)\frac{\pi}{2}+\theta_1)} +$$
$$r_1 e^{j(c(t-\tau_1)\frac{\pi}{2}+\theta_1)} \times Rx(t-\tau_1-m\Delta) +$$
$$Rx(t-\tau_1) \times r_1 e^{j(c(t-\tau_1-m\Delta)\frac{\pi}{2}+\theta_1)} + Rx(t-\tau_1) \times Rx(t-\tau_1-m\Delta)$$

The output of the multiplier 552 expressed by the formula (32) is then delayed by the delaying unit 553, which becomes $Rx_1$Delay that is expressed by the following formula.

$$Rx_1 Delay = r_1 e^{j(c(t-\tau_1-n\Delta)\frac{\pi}{2}+\theta_1)} \times r_1 e^{j(c(t-\tau_1-m\Delta-n\Delta)\frac{\pi}{2}+\theta_1)} + \quad (33)$$
$$r_1 e^{j(c(t-\tau_1-n\Delta)\frac{\pi}{2}+\theta_1)} \times Rx(t-\tau_1-m\Delta-n\Delta) +$$
$$Rx(t-\tau_1-n\Delta) \times r_1 e^{j(c(t-\tau_1-m\Delta-n\Delta)\frac{\pi}{2}+\theta_1)} +$$
$$Rx(t-\tau_1-n\Delta) \times Rx(t-\tau_1-m\Delta-n\Delta)$$

Next, the correlation detecting unit 58 detects a value of correlation between $Rx_0$ expressed by the formula (30) and $Rx_1$Delay expressed by the formula (33). The correlation value at the point where the phases agree, i.e., $\tau=0$ is expressed as follows.

$$R(0) = \int_0^T Rx_0(t) RxDelay_1^*(t) dt \quad (34)$$
$$= \int_0^T \left( r_0 e^{j(c(t-\tau_0)\frac{\pi}{2}+\theta_0)} + \times r_1 e^{-j(c(t-\tau_1-n\Delta)\frac{\pi}{2}+\theta_1)} \times \right.$$
$$\left. r_1 e^{-j(c(t-\tau_1-m\Delta-n\Delta)\frac{\pi}{2}+\theta_1)} \right) dt + \int_0^T \left( r_0 e^{j(c(t-\tau_0)\frac{\pi}{2}+\theta_0)} \times \right.$$
$$\left. r_1 e^{-j(c(t-\tau_1-n\Delta)\frac{\pi}{2}+\theta_1)} \times Rx^*(t-\tau_1-m\Delta-n\Delta) \right) dt +$$
$$\int_0^T \left( r_0 e^{j(c(t-\tau_0)\frac{\pi}{2}+\theta_0)} \times Rx^*(t-\tau_1-n\Delta) \times \right.$$
$$\left. r_1 e^{-j(c(t-\tau_1-m\Delta-n\Delta)\frac{\pi}{2}+\theta_1)} \right) dt +$$
$$\int_0^T \left( r_0 e^{j(c(t-\tau_0)\frac{\pi}{2}+\theta_0)} \times Rx^*(t-\tau_1-n\Delta) \times \right.$$
$$\left. Rx^*(t-\tau_1-m\Delta-n\Delta) \right) dt +$$
$$\int_0^T \left( Rx(t-\tau_0) \times r_1 e^{-j(c(t-\tau_1-n\Delta)\frac{\pi}{2}+\theta_1)} \right) \times$$
$$r_1 e^{-j(c(t-\tau_1-m\Delta-n\Delta)\frac{\pi}{2}+\theta_1)} dt + \int_0^T (Rx(t-\tau_0) \times$$
$$r_1 e^{-j(c(t-\tau_1-n\Delta)\frac{\pi}{2}+\theta_1)} \times Rx^*(t-\tau_1-m\Delta-n\Delta) ) dt +$$
$$\int_0^T (Rx(t-\tau_0) \times Rx^*(t-\tau_1-n\Delta) \times$$

-continued $$r_1 e^{-j(c(t-\tau_1-m\Delta-n\Delta)\frac{\pi}{2}+\theta_1)})dt + \int_0^T (Rx(t-\tau_0) \times$$
$$Rx^*(t-\tau_1-n\Delta) \times Rx^*(t-\tau_1-m\Delta-n\Delta))dt$$

In the formula (34), since the received signal (CDMA signal) and the calibration signal are not in correlation, or the received signal (CDMA signal) and the delayed signal, which is delayed by 1 or more chips, are not in correlation, the second through the eighth terms of the formula (34) can be approximated to zero, and the formula (34) is approximated as follows.

$$R(0) \approx \int_0^T \left(r_0 e^{j(c(t-\tau_0)\frac{\pi}{2}+\theta_0)} \times r_1 e^{-j(c(t-\tau_1-n\Delta)\frac{\pi}{2}+\theta_1)} \times \right. \quad (35)$$
$$\left. r_1 e^{-j(c(t-\tau_1-m\Delta-n\Delta)\frac{\pi}{2}+\theta_1)}\right) dt$$
$$= \int_0^T \left(r_0 e^{j(c(t-\tau_0)\frac{\pi}{2}+\theta_0)} \times r_1 r_1 e^{-j(c(t-\tau_1)\frac{\pi}{2}+\theta_1)}\right) dt$$
$$= \int_0^T \left(r_0 r_1 r_1 e^{j((c(t-\tau_0)-c(t-\tau_1))\frac{\pi}{2}+\theta_0-\theta_1)}\right) dt$$

This R(0) can be further approximated as follows.

$$R(0) \approx \int_0^T (r_0 r_1 r_1 e^{j(\theta_0-\theta_1)}) dt \quad (36)$$
$$= r_0 r_1 r_1 e^{j(\theta_0-\theta_1)} \times T$$

Here, $r_0 e^{j\theta_0}$ is made equal to 1 ($r_0 e^{j\theta_0}=1$) such that R(0) is based on $r_0 e^{j\theta_0}$, and the differences of the phase and the gain between the antenna ANT0 and the antenna ANT1 are detected as in the formula (13).

Based on the output R(0) from the correlation detecting unit 58, the weight generating unit 59 generates a weighting for compensating for the phase difference and the gain difference between the antennas due to the radio frequency signal receiving units 52 and 53. The complex multiplier 54 multiplies the weighting and the output from the radio frequency signal receiving unit 53 such that the phase difference and the gain difference between the antenna edges of the radio frequency signal receiving units 52 and 53 are compensated for.

Figure 6:
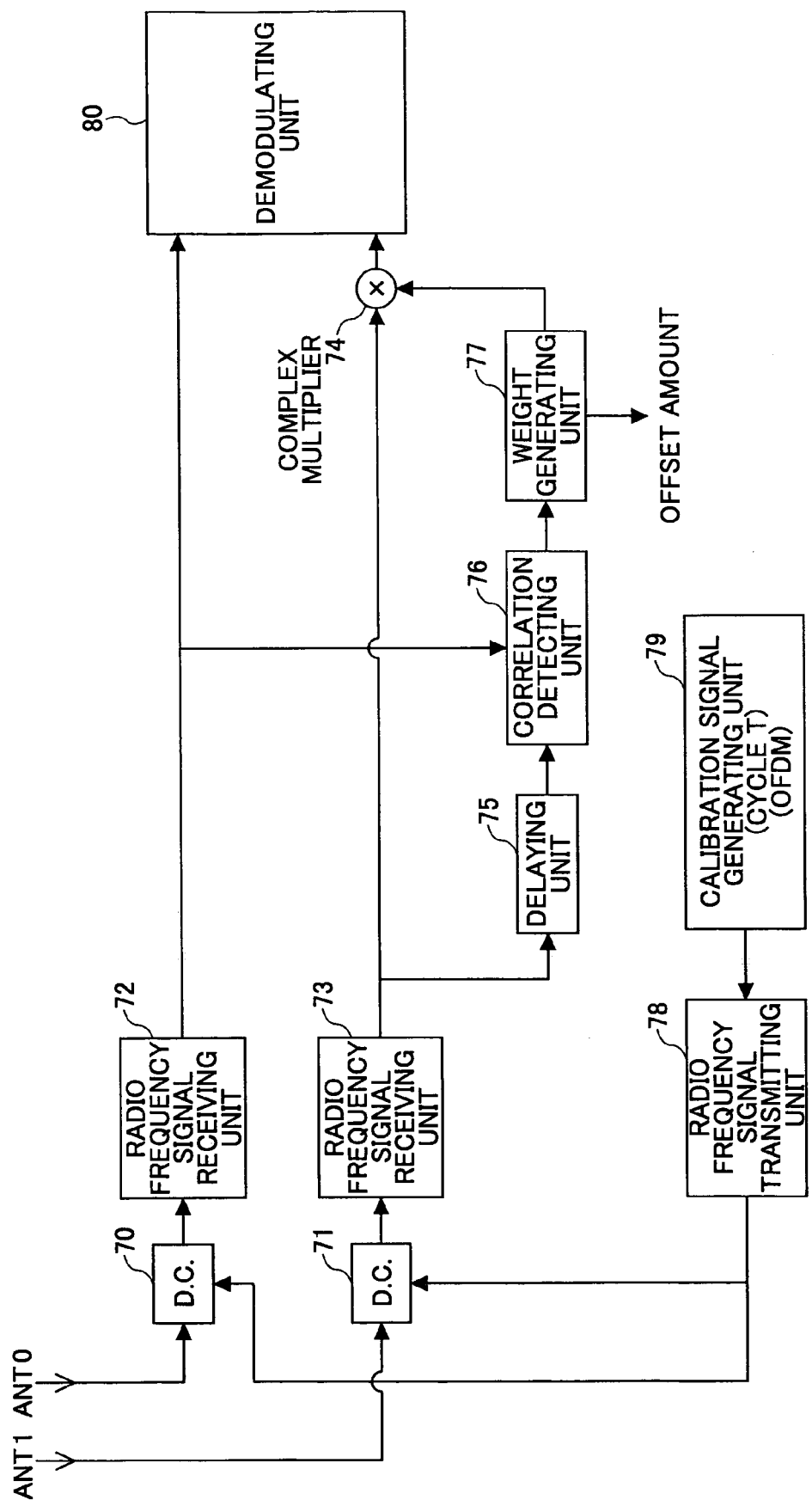
FIG. 6 is a block diagram showing the configuration of the radio frequency signal receiving apparatus according to the fourth embodiment of the present invention.

FIG. 6 is a block diagram showing the configuration of the radio frequency signal receiving apparatus according to the fourth embodiment of the present invention. The radio frequency signal receiving apparatus shown in FIG. 6 is variation 2 of the radio frequency signal receiving apparatus according to the first embodiment shown by FIG. 1.

According to the variation 2, an OFDM signal is used as the calibration signal. With this OFDM signal, frequency relations of subcarriers are known factors. Therefore, the phase difference can be easily obtained. When the amount of delay is set at less than one cycle, it is possible to reduce the amount of delay by compensating for the phase difference according to the amount of delay.

The radio frequency signal receiving apparatus according to the present embodiment, the variation 2 includes the antennas ANT0 and ANT1, directional couplers (DCs) 70 and 71 having a multiplexing function and an adder function, radio frequency signal receiving units 72 and 73, a complex multiplier 74, a delaying unit 75, a correlation detecting unit 76, a weight generating unit 77, a radio frequency signal transmitting unit 78 with a frequency conversion function to a radio frequency signal, a calibration signal generating unit 79 that generates the calibration signal that is an OFDM signal of a cycle T, and a demodulation unit 80.

The variation 2 differs from the first embodiment as shown by FIG. 1 in that the OFDM signal is used as the calibration signal, and that an offset amount related to the amount of delay provided by the delaying unit 75 is provided to the weight generating unit 77. The offset is provided in order to compensate for a quantity equivalent to delay time of the OFDM signal. For example, if the delay is equal to ½ of the cycle T, the offset amount is set at 180 degrees; and if the delay is equal to T/3, the offset amount is set at 120 degrees.

The radio frequency signal received by the antennas ANT0 and ANT1 contains a main signal, and the radio frequency signal receiving units 72 and 73, respectively, convert the radio frequency signal into respective baseband signals. The baseband signal from the radio frequency signal receiving unit 72 is provided to the demodulator 80. The base band signal from the radio frequency signal receiving unit 73 is provided to the demodulator 80 through the complex multiplexer 74. The demodulator restores the main signal from the baseband signals.

The calibration signal generating unit 79 generates the OFDM signal as the calibration signal that has the cycle T that is different from the cycle of the received radio frequency signal. The radio frequency signal transmitting unit 78 converts the calibration signal into a radio frequency signal. The DCs 70 and 71 multiplex the radio frequency calibration signal and the radio frequency signal containing the main signal received by the antennas ANT0 and ANT1, respectively.

The radio frequency signal receiving units 72 and 73 convert the respective multiplexed signals in the radio frequency into baseband signals. The baseband signals contain the main signal and the calibration signal, and the phases and the amplitudes of the baseband signals output by the radio frequency signal receiving units 72 and 73 are often different from each other.

The delaying unit 75 delays the baseband signal from the radio frequency signal receiving unit 73 by time nT, i.e., a natural number times the cycle T of the calibration signal. The correlation detecting unit 76 detects correlation between the baseband signal from the radio frequency signal receiving unit 72 and the baseband signal from the radio frequency signal receiving unit 73 that is delayed by the delaying unit 75.

The weight generating unit 77 converts the correlation value provided by the correlation detecting unit 76 into a weighting in consideration of the offset amount. The complex multiplier 74 multiplies the weighting from the weight generating unit 77 by the baseband signal from the radio frequency signal receiving unit 73. The differences of the phase and amplitude produced by the radio frequency signal receiving units 72 and 73 are compensated for by this multiplication.

Below, the calibration by the radio frequency signal receiving apparatus according to the present embodiment is explained using formulas. Here, the case where a tone signal is used as the calibration signal is explained. The following notations are used.

The calibration signal generated by the calibration signal generating unit 79: Cal=$re^{j\omega t}=re^{j\omega t+nT}$ Received signal by an antenna (CDMA signal): Rx Delay by the radio frequency signal receiving unit connected to the antenna ANT0: $\tau_0$ Delay by the radio frequency signal receiving unit connected to the antenna ANT1: $\tau_1$ Phase rotation by the radio frequency signal receiving unit connected to the antenna ANT0: $\theta_0$ Phase rotation by the radio frequency signal receiving unit connected to the antenna ANT1: $\theta_1$ The baseband signal of the antenna ANT0 is expressed by the following formula.

$$Rx_0(t)=r_0 e^{j(\omega(t-\tau_0)+\theta_0)}+Rx(t-\tau_0) \quad (37)$$

Similarly, the baseband signal of the antenna ANT1 is expressed by the following formula.

$$Rx_1(t)=r_1 e^{j(\omega(t-\tau_1)+\theta_1)}+Rx(t-\tau_1) \quad (38)$$

The baseband signal of the antenna ANT1 is delayed by T (n of nT is set to 1), and made into a signal $RxDelay_1(t)$ that is expressed by the following formula.

$$RxDelay_1(t)=r_1 e^{j(\omega(t-\tau_1-T)+\theta_1)}+Rx(t-\tau_1-T) \quad (39)$$

In addition, $T=2\pi/\omega$ (40)

Further, correlation between $Rx_0(t)$ and $RxDelay_1(t)$ is expressed by the following formula.

$$R(\tau) = \int_{-\infty}^{\infty} Rx_0(t) RxDelay_1^*(t-\tau) dt \quad (41)$$

Since the correlation value to calculate is at the point where the phases agree, i.e., $\tau=0$, and the calibration signal is a periodic signal of the cycle T, R(0) is expressed as follows.

$$R(\tau) = \int_0^T Rx_0(t) RxDelay_1^*(t) dt \quad (42)$$

Further, R(0) of the formula (42) is reformed as follows employing the formula (37) and the formula (39).

$$R(0) = \int_0^T (r_0 e^{j(\omega(t-\tau_0)+\theta_0)} + Rx(t-\tau_0)) \quad (43)$$
$$(r_1 e^{-j(\omega(t-\tau_1-T)+\theta_1)} + Rx^*(t-\tau_1-T)) dt$$

$$= \int_0^T (r_0 e^{j(\omega(t-\tau_0)+\theta_0)} \times r_1 e^{-j(\omega(t-\tau_1-T)+\theta_1)}) dt + \quad (44)$$
$$\int_0^T (r_0 e^{j(\omega(t-\tau_0)+\theta_0)} \times Rx^*(t-\tau_1-T)) dt +$$
$$\int_0^T (Rx(t-\tau_0) \times r_1 e^{-j(\omega(t-\tau_1-T)+\theta_1)}) dt +$$
$$\int_0^T (Rx(t-\tau_0) \times Rx^*(t-\tau_1-T)) dt$$

Concerning the formula (44), since the received signal (CDMA signal) and the calibration signal are not correlated, the second term and the third term can be approximated to zero. Further, since the fourth term represents correlation between received signals (CDMA signal) with the time difference of 1 or more chips, it can be approximated to zero.

Therefore, R(0) of the formula (44) is expressed as follows.

$$R(0) \approx \int_0^T (r_0 e^{j(\omega(t-\tau_0)+\theta_0)} \times r_1 e^{-j(\omega(t-\tau_1-T)+\theta_1)}) dt \quad (45)$$

$$= r_0 r_1 e^{j(\omega(\tau_1-\tau_0+T)+\theta_0-\theta_1)} \times T \quad (46)$$

Here, $r_0 e^{j(\omega\tau_0+\theta_0)}$ is made equal to 1 ($r_0 e^{j(\omega\tau_0+\theta_0)}=1$) such that R(0) is based on $r_0 e^{j(\omega\tau_0+\theta_0)}$.

$$R(0)=r_1 e^{j(\omega(\tau_1+T)-\theta_1)} \times T \quad (47)$$

In this manner, the differences of the phase and the gain between the antenna ANT0 and the antenna ANT1 are acquired.

Further, since the ratio of the carrier frequency (for example, several GHz) to the frequency ω of the calibration signal (for example, several kHz) is great, $\omega\tau_1$ can be disregarded, and R(0) can be approximated as follows.

$$R(0) \approx r_1 e^{j(\omega T-\theta_1)} \times T \quad (48)$$

Here, since T and ω are known factors, the phase and gain differences between the antenna ANT0 and the antenna ANT1 are obtained.

Based on the output R(0) of the correlation detecting unit 76, the weight generating unit 77 generates a weighting for compensating for the phase difference and the gain difference between the antenna edges due to the radio frequency signal receiving units 72 and 73. At this time, the weight generating unit 77 generates the weighting using the offset amount ωT, which can be obtained from the known factors T and ω of the OFDM signal. The complex multiplier 74 multiplies the weighting by the output from the radio frequency signal receiving unit 73. In this manner, the phase difference and the gain difference between the antenna edges that are produced by the radio frequency signal receiving units 72 and 73 are compensated for.

Figure 7:
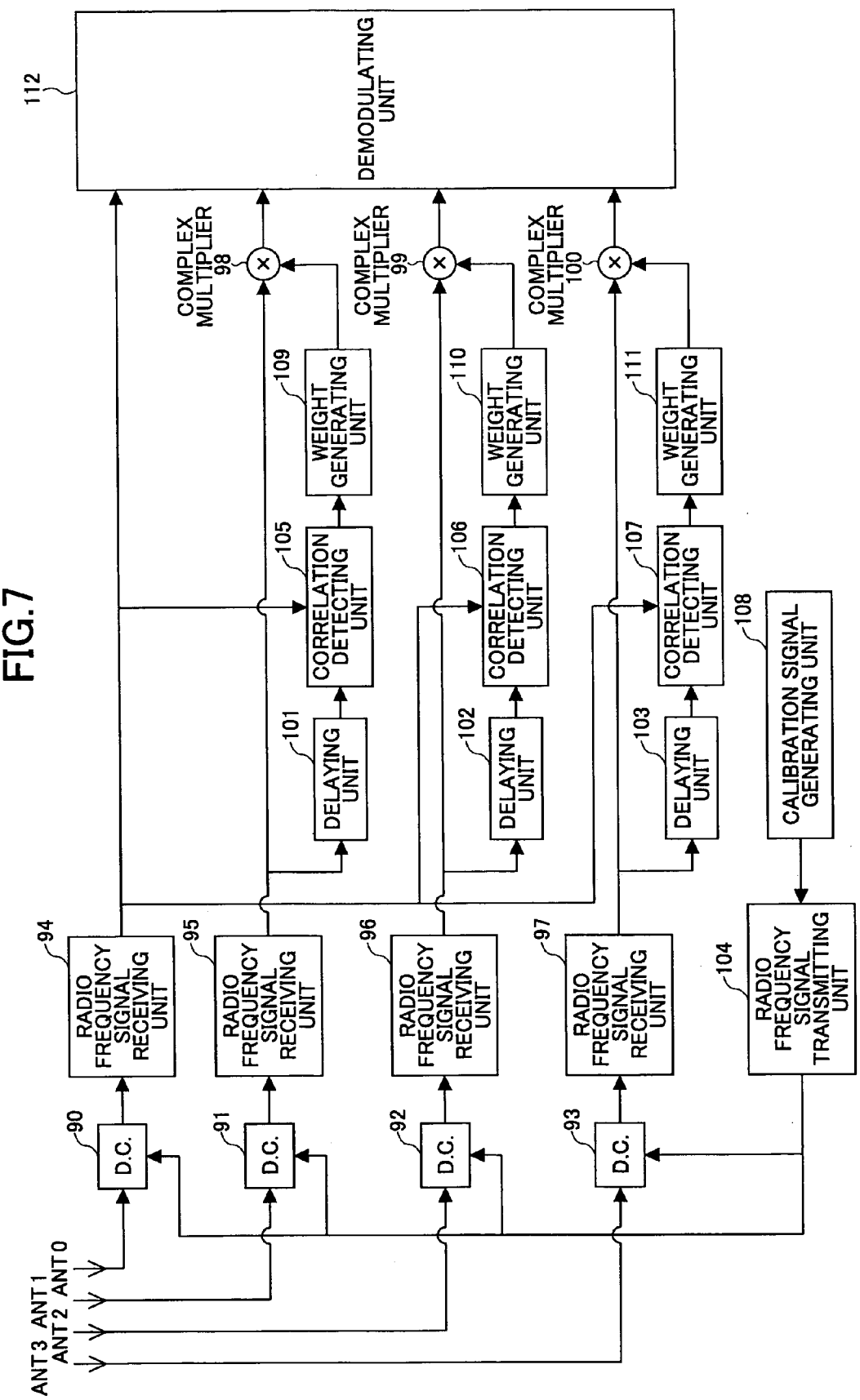
FIG. 7 is a block diagram showing a configuration of a radio frequency signal receiving apparatus according to the fifth embodiment of the present invention.

FIG. 7 is a block diagram showing the configuration of the radio frequency signal receiving apparatus according to the fifth embodiment of the present invention. The radio frequency signal receiving apparatus shown in FIG. 7 is variation 3 of the radio frequency signal receiving apparatus according to the first embodiment shown in FIG. 1.

The radio frequency signal receiving apparatus includes antennas ANT0 through ANT3, directional couplers (DCs) 90 through 93 with a multiplexing function and an adder function, radio frequency signal receiving units 94 through 97, complex multipliers 98 through 100, delaying units 101 through 103, a radio frequency signal transmitting unit 104 with a frequency conversion function, a calibration signal generating unit 108 that generates the calibration signal of the cycle T, correlation detecting units 105 through 107, weight generating units 109 through 111, and a demodulating unit 112.

As described above, the radio frequency signal receiving apparatus according to the present embodiment includes four antennas and associated components, constituting four antenna systems, wherein one of the antenna systems is selected as a reference antenna system. The radio frequency signal receiving apparatus compensates for differences of the phase and the gain between the antenna systems by adjusting the phase and the gain of an antenna system in reference to the reference antenna system.

Namely, the antenna system of the antenna ANT0 includes DC 90 and the radio frequency signal receiving unit 94; the antenna system of the antenna ANT1 includes DC 91, the radio frequency signal receiving unit 95, the delaying unit 101, the correlation detecting unit 105, the weight generating unit 109, and the complex multiplier 98; the antenna system of the antenna ANT2 includes DC 92, the radio frequency signal receiving unit 96, the delaying unit 102, the correlation detecting unit 106, the weight generating unit 110, and the complex multiplier 99; and the antenna system of the antenna ANT3 includes DC 93, the radio frequency signal receiving unit 97, the delaying unit 103, the correlation detecting unit 107, the weight generating unit 111, and the complex multiplier 100.

A radio frequency signal carrying the main signal is received by the antennas ANT0 through ANT3, and converted into baseband signals by the respective radio frequency signal receiving units 94 through 97. The baseband signals are provided to the demodulating unit 112, through the respective complex multipliers where applicable, and the main signal is demodulated.

The calibration signal generating unit 108 generates the calibration signal of the cycle T that is different from the cycle of the radio frequency signal received. The calibration signal is converted into a radio frequency signal by the radio frequency signal transmitting unit 104, and is provided to DCs 90 through 93, where the calibration signal in the radio frequency is multiplexed with the radio frequency signal carrying the main signal received by the respective antennas ANT0 through ANT3. The radio frequency signal receiving units 94 through 97 convert the multiplexed signals into respective baseband signals. The baseband signals contain the main signal and the calibration signal, and have different phases and different amplitudes from each other.

The baseband signals from the radio frequency signal receiving units 94 through 97 are branched into two parts. Specifically, one part of the baseband signal corresponding to the antenna ANT0 is provided to the demodulating unit 112, and the other part is provided to the correlation detecting units 105 through 107; and one part of the baseband signal corresponding to the antenna ANT1 is provided to the complex multiplier 98 of the same antenna system, and the other part is provided to the delaying unit 101 of the same antenna system. Similarly, one part of the baseband signal corresponding to the antenna ANT2 is provided to the complex multiplier 99 of the same antenna system, and the other part is provided to the delaying unit 102 of the same antenna system; and one part of the baseband signal corresponding to the antenna ANT3 is provided to the complex multiplier 100 of the same antenna system, and the other part is provided to the delaying unit 103 of the same antenna system.

The correlation detecting units 105 through 107 obtain correlation between the baseband signal from the radio frequency signal receiving unit 94 connected to the antenna ANT0 and the baseband signals of the respective antenna systems delayed by the respective delaying units. Specifically, the correlation detecting unit 105 obtains correlation between the baseband signal from the radio frequency signal receiving unit 94 and the baseband signal delayed by the delaying unit 101. The correlation detecting unit 106 obtains correlation between the baseband signal from the radio frequency signal receiving unit 94 and the baseband signal delayed by the delaying unit 102. The correlation detecting unit 107 obtains correlation between the baseband signal from the radio frequency signal receiving unit 94 and the baseband signal delayed by the delaying unit 103.

According to the radio frequency signal receiving apparatus of the present embodiment, correlation between a delayed baseband signal of an antenna system and the baseband signal of the antenna system of the antenna ANT0 is obtained. That is, the antenna system of the antenna ANT0 is used as the reference antenna system.

The weight generating units 109 through 111 convert correlation values obtained by the correlation detecting units 105 through 107, respectively, into weightings, and provide the weightings to the respective complex multipliers 98 through 100. The complex multipliers 98 through 100 multiply the weightings from the respective weight generating units 109 through 111 by the respective baseband signals from the respective radio frequency signal receiving units 95 through 97. The complex multipliers 98 through 100 output the multiplication results to the demodulating unit 112.

Specifically, the complex multiplier 98 multiplies the weighting from the weight generating unit 109 and the baseband signal from the radio frequency signal receiving unit 95, and outputs the multiplication result to the demodulating unit 112. Further, the complex multiplier 99 multiplies the weighting from the weight generating unit 110 and the baseband signal from the radio frequency signal receiving unit 96, and outputs the multiplication result to the demodulating unit 112. Similarly, the complex multiplier 100 multiplies the weighting from the weight generating unit 111 and the baseband signal from the radio frequency signal receiving unit 97, and outputs the multiplication result to the demodulating unit 112. The differences of the phase and amplitude in the radio frequency signal receiving units 94 through 97 are compensated for by the multiplication operations.

Below, the calibration by the radio frequency signal receiving apparatus according to the present embodiment is explained using formulas. Here, the case where the calibration signal is a tone signal is explained. Notations as follows are used.

The calibration signal generated in the calibration signal generating unit 108: $Cal = re^{j\omega t} = re^{j\omega t + nT}$ Received signal by an antenna (CDMA signal): Rx Delay by the radio frequency signal receiving unit connected to the antenna ANT0: $\tau_0$ Delay by the radio frequency signal receiving unit connected to the antenna ANT1: $\tau_1$ Delay by the radio frequency signal receiving unit connected to the antenna ANT2: $\tau_2$ Delay by the radio frequency signal receiving unit connected to the antenna ANT3: $\tau_3$ Phase rotation of the radio frequency signal receiving unit connected to the antenna ANT0: $\theta_0$ Phase rotation of the radio frequency signal receiving unit connected to the antenna ANT1: $\theta_1$ Phase rotation of the radio frequency signal receiving unit connected to the antenna ANT2: $\theta_2$ Phase rotation of the radio frequency signal receiving unit connected to the antenna ANT3: $\theta_3$ Correlation between the reference antenna system and each of other antenna systems is obtained. Specifically, correlation between the antenna ANT0 and the antenna ANT1 is expressed by the following formula.

$$R_{0-1}(0) = r_0 r_1 e^{j(\theta_0 - \theta_1)} \times T \tag{49}$$

Correlation between the antenna ANT0 and the antenna ANT2 is expressed by the following formula.

$$R_{0-2}(0) = r_0 r_2 e^{j(\theta_0 - \theta_2)} \times T \tag{50}$$

Correlation between the antenna ANT0 and the antenna ANT3 is expressed by the following formula.

$$R_{0-3}(0) = r_0 r_3 e^{j(\theta_0 - \theta_3)} \times T \tag{51}$$

The weighting of the antenna ANT1 is calculated based on the correlation value between the antenna ANT0 and the antenna ANT1.

$$W_1 = \frac{1}{r_1} e^{-j\theta_1} \quad (52)$$

Similarly, the weighting of the antenna ANT2 is expressed by the following formula.

$$W_2 = \frac{1}{r_2} e^{-j\theta_2} \quad (53)$$

Further, the weighting of the antenna ANT3 is expressed by the following formula.

$$W_3 = \frac{1}{r_3} e^{-j\theta_3} \quad (54)$$

A signal OUT, after the calibration of the antenna ANT1 becomes 1 (the same as the baseband signal of the antenna ANT0) as shown below.

$$\begin{aligned} Out_1 &= r_1 e^{j\theta_1} \times W_1 \\ &= r_1 e^{j\theta_1} \times \frac{1}{r_1} e^{-j\theta_1} \\ &= 1 \end{aligned}$$

A signal $OUT_2$ after the calibration of the antenna ANT2 becomes 1 (the same as the baseband signal of the antenna ANT0) as shown below.

$$\begin{aligned} Out_2 &= r_2 e^{j\theta_2} \times W_2 \\ &= r_2 e^{j\theta_2} \times \frac{1}{r_2} e^{-j\theta_2} \\ &= 1 \end{aligned}$$

A signal $OUT_3$ after the calibration of the antenna ANT3 becomes 1 (the same as the baseband signal of the antenna ANT0) as shown below.

$$\begin{aligned} Out_3 &= r_3 e^{j\theta_3} \times W_3 \\ &= r_3 e^{j\theta_3} \times \frac{1}{r_3} e^{-j\theta_3} \\ &= 1 \end{aligned}$$

Figure 8:
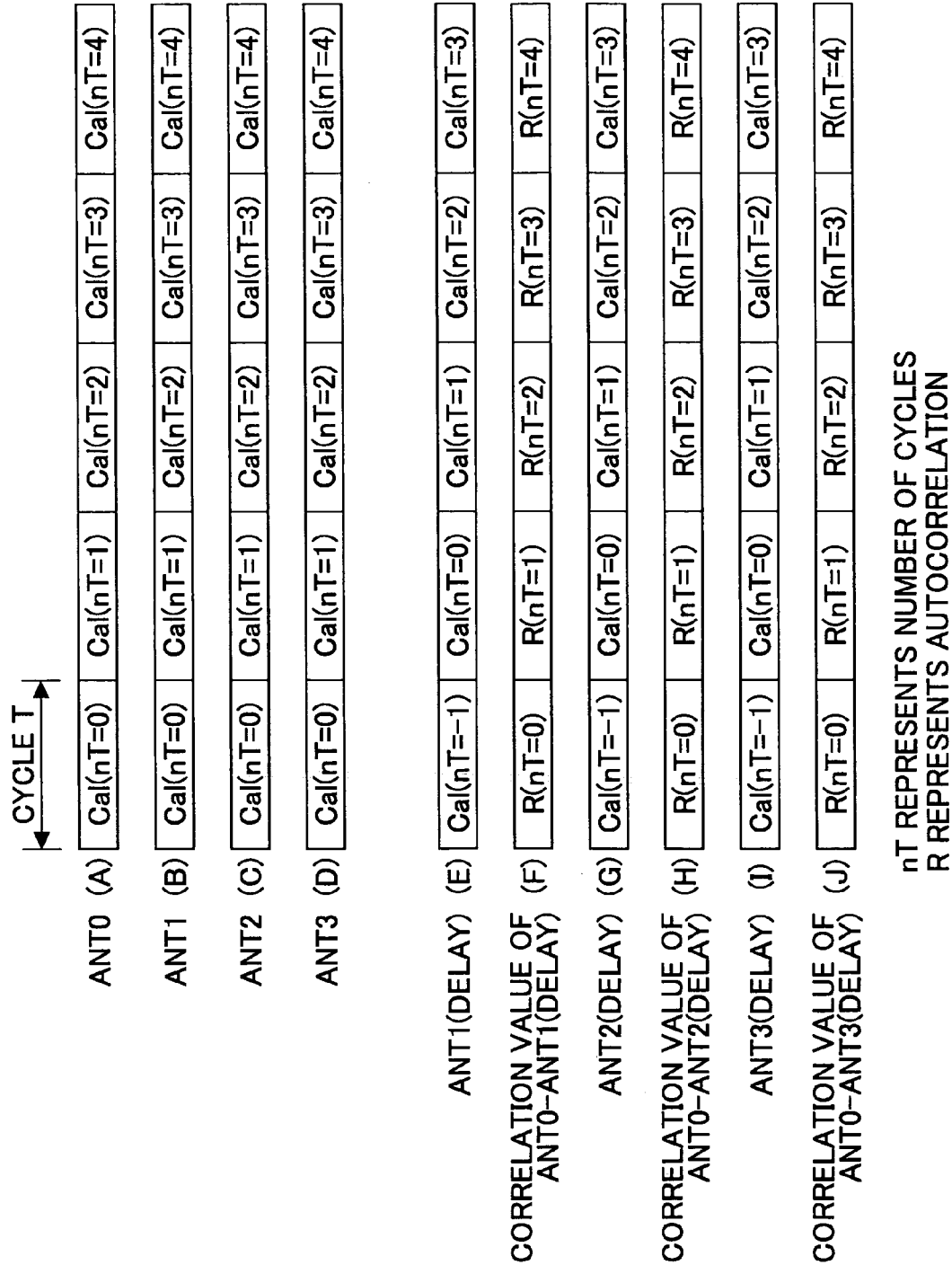
FIG. 8 is a timing chart showing operations of a radio frequency signal receiving apparatus according to the fifth embodiment of the present invention.

FIG. 8 is a timing chart showing operations of the radio frequency signal receiving apparatus according to the present embodiment.

In FIG. 8, ANT0 (A), ANT1 (B), ANT2 (C), and ANT3 (D) represent the calibration signals multiplexed by the DCs 90 through 93, respectively, connected to the antennas ANT0 through ANT3, respectively.

Further, ANT1 (delay) (E), ANT2 (delay) (G), and ANT3 (delay) (I) represent the outputs of the delaying units 101, 102, and 103, respectively. Further, (F) represents the correlation value between ANT0 (A) and ANT1 (delay) (E). Further, (H) represents the correlation value between ANT0 (A) and ANT2 (delay) (G), and (J) represents the correlation value between ANT0(C) and ANT3 (delay) (I).

In this manner, the present embodiment is applicable to a system with any number of antennas, since the calibration is performed by obtaining correlation to a predetermined reference antenna system.

Figure 9:
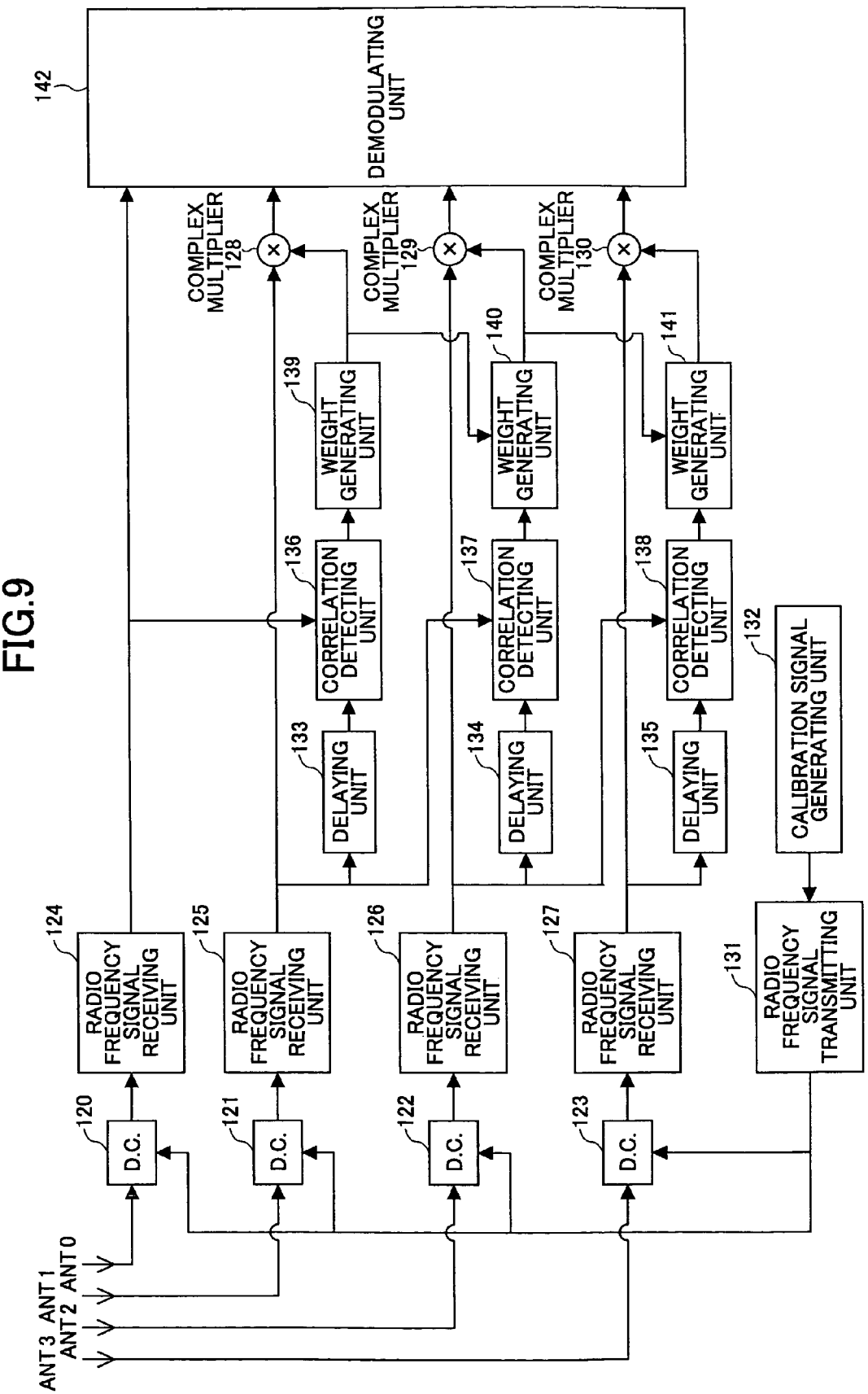
FIG. 9 is a block diagram showing a configuration of a radio frequency signal receiving apparatus according to the sixth embodiment of the present invention.

FIG. 9 is a block diagram showing the configuration of the radio frequency signal receiving apparatus according to the sixth embodiment of the present invention. The sixth embodiment is variation 4 of the radio frequency signal receiving apparatus according to the first embodiment as shown in FIG. 1.

This radio frequency signal receiving apparatus includes the antennas ANT0 through ANT3, directional couplers (DCs) 120 through 123 having a multiplexing function and an adder function, radio frequency signal receiving units 124 through 127, complex multipliers 128 through 130, delaying units 133 through 135, a radio frequency signal transmitting unit 131 with the frequency conversion function, a calibration signal generating unit 132 that generates the calibration signal of the cycle T, correlation detecting units 136 through 138, weight generating units 139 through 141, and a demodulating unit 142.

The radio frequency signal receiving apparatus according to the present embodiment compensates for phase and gain differences between two or more antenna systems corresponding to the antennas.

Specifically, the antenna system corresponding to the antenna ANT0 includes the DC 120 and the radio frequency signal receiving unit 124. The antenna system corresponding to the antenna ANT1 includes the DC 121, the radio frequency signal receiving unit 125, the delaying unit 133, the correlation detecting unit 136, the weight generating unit 139, and the complex multiplier 128. The antenna system corresponding to the antenna ANT2 includes the DC 122, the radio frequency signal receiving unit 126, the delaying unit 134, the correlation detecting unit 137, the weight generating unit 140, and the complex multiplier 129. The antenna system corresponding to the antenna ANT3 includes the DC 123, the radio frequency signal receiving unit 127, the delaying unit 135, the correlation detecting unit 138, the weight generating unit 141, and the complex multiplier 130.

The radio frequency signal containing the main signal is received by the antennas ANT0 through ANT3, and is provided to the radio frequency signal receiving units 124 through 127, respectively, through the DCs 120 through 123, respectively, and converted into respective baseband signals. The demodulating unit 142 demodulates the baseband signals provided by the radio frequency signal receiving units 124 through 127, through the complex multipliers 128 through 130 where applicable, and the main signal is restored.

The calibration signal generating unit 132 generates a calibration signal that has a cycle T that is different from the cycle of the received radio frequency signal. The calibration signal is converted into a radio frequency signal by the radio frequency signal transmitting unit 131, and provided to the DCs 120 through 123 where it is multiplexed with the radio frequency signal containing the main signal received by the antennas ANT0 through ANT3, respectively. The radio frequency signal receiving units 124 through 127 convert the respective multiplexed signal into respective baseband signals. Each baseband signal contains the main signal and the calibration signal, and has a phase and an amplitude both different from other baseband signals.

Each of the baseband signals from the radio frequency signal receiving units 124 through 127 is divided into two parts. Specifically, one part of the baseband signal corresponding to the antenna ANT0 is provided to the demodulating unit 142, and the other part is provided to the correlation detecting unit 136 of the antenna system of the antenna ANT1. Further, a part of the baseband signal corresponding to the antenna ANT1 is provided to the complex multiplier 128, and the other part is provided to the delaying unit 133 and to the correlation detecting unit 137 of the antenna system of the antenna ANT2.

Further, a part of the baseband signal corresponding to the antenna ANT2 is provided to the complex multiplier 129, and the other part is provided to the delaying unit 134 and to the correlation detecting unit 138 of the antenna system of the antenna ANT3. Furthermore, a part of the baseband signal corresponding to the antenna ANT3 is provided to the delaying unit 135, and the other part is provided to the complex multiplier 130.

The correlation detecting units 136 through 138 detect correlation between the baseband signal of a neighboring antenna system and the baseband signal delayed by the delaying unit of their own respective antenna systems. Specifically, the correlation detecting unit 136 takes correlation between the baseband signal from the radio frequency signal receiving unit 124 and the baseband signal delayed by the delaying unit 133. The correlation detecting unit 137 takes correlation between the baseband signal from the radio frequency signal receiving unit 125 and the baseband signal delayed by the delaying unit 134. The correlation detecting unit 138 takes correlation between the baseband signal from the radio frequency signal receiving unit 126 and the baseband signal delayed by the delaying unit 135.

The weight generating units 139 through 141 convert the correlation values detected by the respective antenna systems into weightings based on the weightings generated by the respective neighboring systems. Specifically, the weight generating unit 139 converts the correlation value from the correlation detecting unit 136 into a weighting; and the weighting is provided to the complex multiplier 128, and to the weight generating unit 140 of the neighboring antenna system.

Further, the weight generating unit 140 converts the correlation value from the correlation detecting unit 137 into a weighting based on the weighting from the weight generating unit 139, and provides the weighting to the weight generating unit 141 of the neighboring antenna system, the weighting being also provided to the complex multiplier 129. Based on the weighting from the weight generating unit 140, the weight generating unit 141 converts the correlation value from the correlation detecting unit 138 into a weighting, and provides the weighting to the complex multiplier 130.

According to the embodiment, correlation is detected using the baseband signal of the neighboring antenna system, and the weighting of an antenna system is generated based on the weighting of the neighboring antenna system.

The complex multipliers 128 through 130 multiply the weightings from the respective weight generating units 139 through 141 and the respective baseband signals from the respective radio frequency signal receiving units 124 through 127 of the respective antenna systems ANT0 through ANT3, and provide the multiplication results to the demodulating unit 142.

Specifically, the complex multiplier 128 multiplies the weighting from the weight generating unit 139 and the baseband signal from the radio frequency signal receiving unit 125, and provides the multiplication result to the demodulating unit 142. Further, the complex multiplier 129 multiplies the weighting from the weight generating unit 140 and the baseband signal from the radio frequency signal receiving unit 126, and provides the multiplication result to the demodulating unit 142. Furthermore, the complex multiplier 130 multiplies the weighting from the weight generating unit 141 and the baseband signal from the radio frequency signal receiving unit 127, and provides the multiplication result to the demodulating unit 142. The phase and amplitude differences due to the radio frequency signal receiving units 124 through 127 are compensated for by these multiplying operations.

Below, the calibration by the radio frequency signal receiving apparatus according to the present embodiment is explained using formulas. Here, the case where the calibration signal is a tone signal is explained. The following notations are used.

The calibration signal generated in the calibration signal generating unit 132: $Cal = re^{j\omega t} = re^{j\omega t + nt}$ Received signal of an antenna (CDMA signal): Rx Delay by the radio frequency signal receiving unit connected to the antenna ANT0: $\tau_0$ Delay by the radio frequency signal receiving unit connected to the antenna ANT1: $\tau_1$ Delay by the radio frequency signal receiving unit connected to the antenna ANT2: $\tau_2$ Delay by the radio frequency signal receiving unit connected to the antenna ANT3: $\tau_3$ Phase rotation by the radio frequency signal receiving unit connected to the antenna ANT0: $\theta_0$ Phase rotation by the radio frequency signal receiving unit connected to the antenna ANT1: $\theta_1$ Phase rotation by the radio frequency signal receiving unit connected to the antenna ANT2: $\theta_2$ Phase rotation by the radio frequency signal receiving unit connected to the antenna ANT3: $\theta_3$ The correlation between two adjacent antennas is searched for as follows.

Correlation between the antenna ANT0 and the antenna ANT1 is expressed by the following formula.

$$R_{0-1}(0) = r_0 r_1 e^{j(\theta_0 - \theta_1)} \times T \tag{55}$$

Correlation between the antenna ANT1 and the antenna ANT2 is expressed by the following formula.

$$R_{1-2}(0) = r_1 r_2 e^{j(\theta_1 - \theta_2)} \times T \tag{56}$$

Correlation between the antenna ANT2 and the antenna ANT3 is expressed by the following formula.

$$R_{2-3}(0) = r_2 r_3 e^{j(\theta_2 - \theta_3)} \times T \tag{57}$$

The weight W, of the antenna ANT1 is calculated as follows based on the value of correlation between the antenna ANT0 and the antenna ANT1 expressed by the formula (55).

$$W_1 = \frac{1}{r_1} e^{-j\theta_1} \tag{58}$$

The weight $W_2$ of the antenna ANT2 is calculated as follows based on the value of correlation between the antenna ANT1 and the antenna ANT2 expressed by the formula (56).

$$W_2 = \frac{1}{r_1 r_2} e^{j(\theta_1 - \theta_2)} \times r_1 e^{-j\theta_1} \quad (59)$$
$$= \frac{1}{r_2} e^{-j\theta_2}$$

Similarly, the weight $W_3$ of the antenna ANT3 is expressed by the following formula.

$$W_3 = \frac{1}{r_2 r_3} e^{j(\theta_2 - \theta_3)} \times r_2 e^{-j\theta_2} \quad (60)$$
$$= \frac{1}{r_3} e^{-j\theta_3}$$

The compensation is carried out by the complex multiplier 128 multiplying the weighting expressed by the formula (58) by the baseband signal of the antenna ANT1. The signal $OUT_1$ after the calibration of the antenna ANT1 becomes 1 (the same as the baseband signal of the antenna ANT0) as shown below.

$$Out_1 = r_1 e^{j\theta_1} \times W_1$$
$$= r_1 e^{j\theta_1} \times \frac{1}{r_1} e^{-j\theta_1}$$
$$= 1$$

The signal $OUT_2$ after the calibration of the antenna ANT2 becomes 1 as shown below.

$$Out_2 = r_2 e^{j\theta_2} \times W_2$$
$$= r_2 e^{j\theta_2} \times \frac{1}{r_2} e^{-j\theta_2}$$
$$= 1$$

The signal $OUT_3$ after the calibration of the antenna ANT3 becomes 1 as shown below.

$$Out_3 = r_3 e^{j\theta_3} \times W_3$$
$$= r_3 e^{j\theta_3} \times \frac{1}{r_3} e^{-j\theta_3}$$
$$= 1$$

Figure 10:
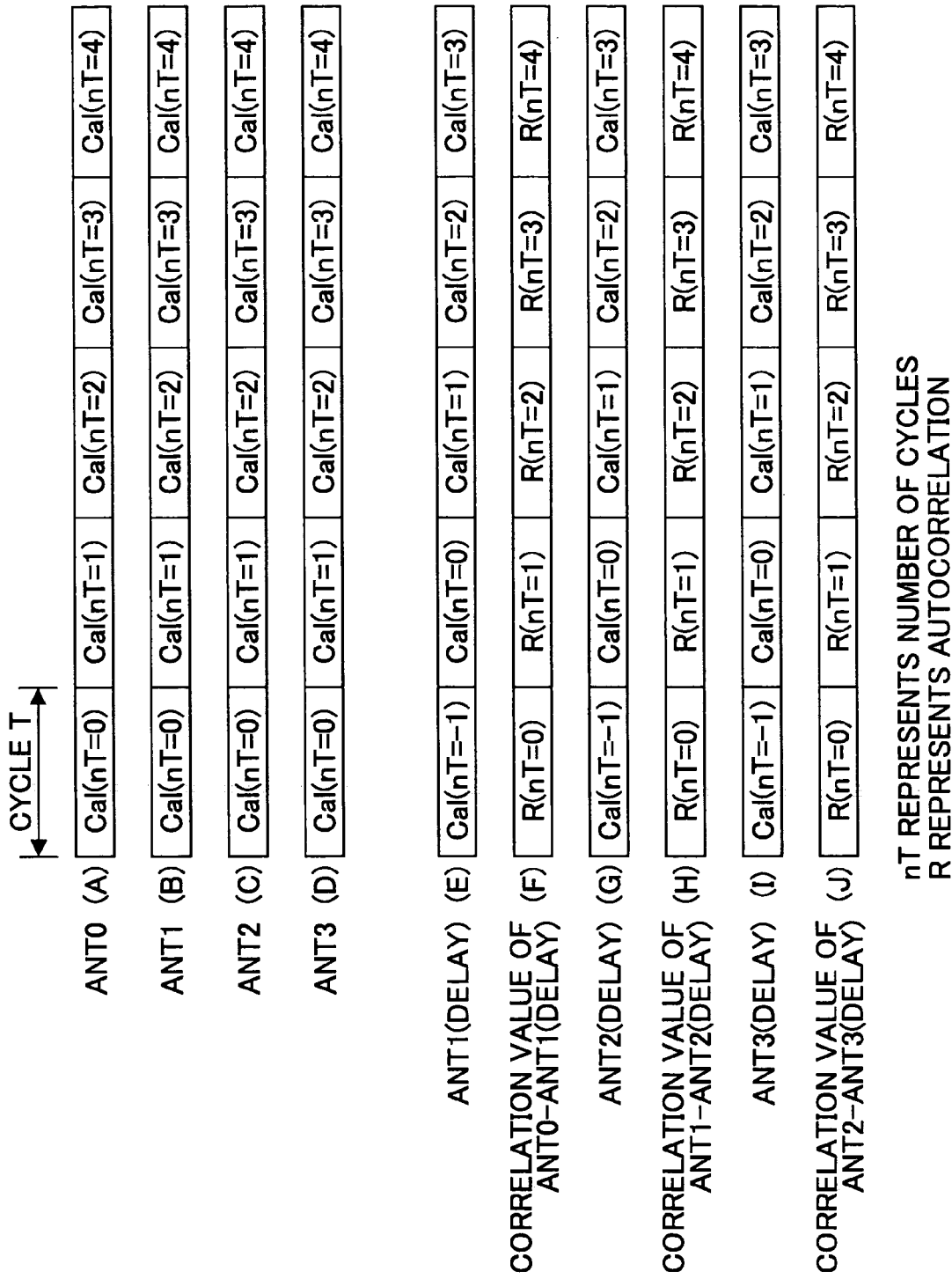
FIG. 10 is a timing chart showing operations of the radio frequency signal receiving apparatus according to the sixth embodiment of the present invention.

FIG. 10 is a timing chart showing operations of the radio frequency signal receiving apparatus according to the present embodiment.

In FIG. 10, ANT0 (A), ANT1 (B), ANT2 (C), and ANT3 (D) represent the calibration signals multiplexed by the DCs 120, 121, 122 and 123, respectively, connected to the antennas ANT0, ANT1, ANT2, and ANT3, respectively.

Further, ANT1 (delay) (E), ANT2 (delay) (G), and ANT3 (delay) (I) represent outputs from the delaying units 133, 134 and 135, respectively. Further, (F) represents the correlation value between ANT0 (A) and ANT1 (delay) (E), (H) represents the correlation value between ANT1 (B) and ANT2 (delay) (G), and (J) represents the correlation value between ANT2 (C) and ANT3 (delay) (I).

In this manner, the present embodiment is applicable to a system with any number of antennas, since the calibration is performed by obtaining differences of the phase and the gain between adjacent antenna systems.

Figure 11:
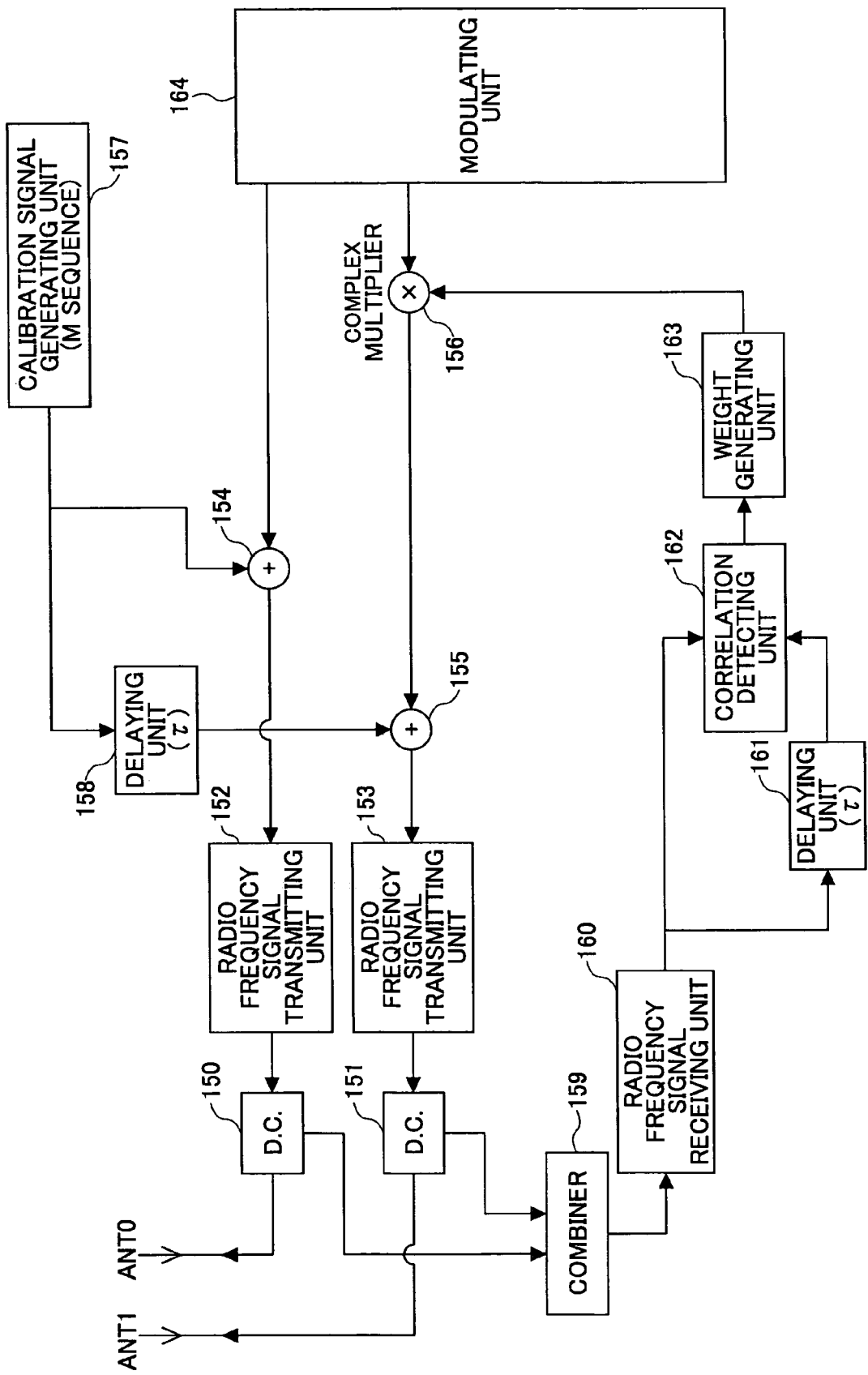
FIG. 11 is a block diagram showing the configuration of the radio frequency signal transmitting apparatus according to the seventh embodiment of the present invention.

FIG. 11 is a block diagram showing the configuration of the radio frequency signal transmitting apparatus according to the seventh embodiment of the present invention. The radio frequency signal transmitting apparatus shown in FIG. 11 is variation 1 of the radio frequency signal transmitting apparatus of the second embodiment as shown in FIG. 3.

According to the present embodiment, a PN signal of an M sequence is used as the calibration signal. The PN signal of the M sequence is a signal, the correlation of which becomes the greatest where the phase difference is 0, and becomes nearly zero where the phase difference is 1 or more unit timings, i.e., chip periods.

The radio frequency signal transmitting apparatus according to the seventh embodiment includes the antennas ANT0 and ANT1, directional couplers (DCs) 150 and 151 having a signal branching function, radio frequency signal transmitting units 152 and 153, adders 154 and 155, a complex multiplier 156, a combiner 159, a radio frequency signal receiving unit 160 with a frequency conversion function to baseband, delaying units 158 and 161 providing delay τ, a correlation detecting unit 162, a weight generating unit 163, a calibration signal generating unit 157 that generates the calibration signal that is a PN signal of the M sequence of the cycle T, and a modulating unit 164.

The calibration signal generating unit 157 generates the calibration signal of the cycle T that is different from the cycle of a transmitting signal. The delaying unit 158 delays the generated calibration signal. According to the present embodiment, the delaying unit 158 delays the calibration signal that is to be added to the baseband signal corresponding to the antenna ANT1.

The adder 154 adds the calibration signal generated by the calibration signal generating unit 157 to the output from the modulating unit 164, and the added result is provided to the radio frequency signal transmitting unit 152. The adder 155 adds the calibration signal delayed by the delaying unit 158 to the output from the modulator 164 through the complex multiplier 156, and the added result is provided to the radio frequency signal transmitting unit 153.

The radio frequency signal transmitting units 152 and 153 convert the respective added results, which are baseband signals, into radio frequency signals. The radio frequency signals are transmitted from the respective antennas ANT0 and ANT1 through the respective DCs 150 and 151.

Next, the DCs 150 and 151 branch the respective radio frequency signals provided by the respective radio frequency signal transmitting units 152 and 153, and the branched signals are provided to the combiner 159. The combiner 159 combines the radio frequency signals corresponding to the antennas ANT0 and ANT1. The radio frequency signal receiving unit 160 converts the radio frequency signal from the combiner 159 into a baseband signal. A part of the baseband signal is provided to the delaying unit 161, while the other part is provided to the correlation detecting unit 162.

The delaying unit 161 delays the baseband signal by the delay time τ that is the same as the time by which the calibration signal is delayed by the delaying unit 158. The correlation detecting unit 162 takes correlation between the baseband signal from the radio frequency signal receiving unit 160 and the baseband signal delayed by the delaying unit 161.

In this correlation detection, when the phase and amplitude of the two radio frequency signals respectively output from the radio frequency signal transmitting units 152 and 153 are the same, correlation of the calibration signals becomes 1. Further, in the case of CDMA signals, if one of two signals is delayed by 1 or more chips in reference to the other signal, they are not in correlation. For this reason, the baseband signals output from the modulating unit 164 are not in correlation.

The weight generating unit 163 converts the correlation output from the correlation detecting unit 162 into a weighting, and outputs the weighting to the complex multiplier 156. The complex multiplier 156 multiplies the baseband signal from the modulating unit 164 and the weighting from the weight generating unit 163. The phase and amplitude differences due to the radio frequency signal transmitting units 152 and 153 are compensated for by this multiplication.

Below, the calibration by the radio frequency signal transmitting apparatus according to the present embodiment is explained using formulas. The following notations are used.

$$\text{Calibration signal:} \quad \begin{aligned} Cal &= re^{jc(t)\frac{\pi}{2}} \\ C(t) &= -1 \text{ or } 1 \end{aligned} \quad (61)$$

Transmitting baseband signal output from the modulating unit 164: Tx

Delay of the radio frequency signal transmitting unit connected to the antenna ANT0: $\tau_0$ Delay of the radio frequency signal transmitting unit connected to the antenna ANT1: $\tau_1$ Phase rotation of the radio frequency signal transmitting unit connected to the antenna ANT0: $\theta_0$ Phase rotation of the radio frequency signal transmitting unit connected to the antenna ANT1: $\theta_1$ The transmitting baseband signal $Tx_0$ on the side of the antenna ANT0 and the transmitting baseband signal $Tx_1$ on the side of the antenna ANT1 are expressed by the following formula.

$$Tx_0 = re^{j(C(t)\frac{\pi}{2})} + Tx(t) \quad (62)$$

$$Tx_1 = re^{j(C(t-\tau)\frac{\pi}{2})} + Tx(t) \quad (63)$$

The combiner 159 combines these signals, and then, the radio frequency signal receiving unit 160 converts the combined signal into a baseband signal Rx. The baseband signal Rx is expressed by the following formula.

$$Rx = Tx_0(t-\tau_0) + Tx_1(t-\tau_1) \quad (64)$$

$$= r_0 e^{j(C(t-\tau_0)\frac{\pi}{2}+\theta_0)} + r_1 e^{j(C(t-\tau-\tau_1)\frac{\pi}{2}+\theta_1)} +$$

$$Tx(t-\tau_0) + Tx(t-\tau_1)$$

Further, the delaying unit 161 delays the baseband signal Rx by τ, which is RxDelay and is expressed by the following formula.

$$RxDelay = r_0 e^{j(C(t-\tau_0-\tau)\frac{\pi}{2}+\theta_0)} + \quad (65)$$

$$r_1 e^{j(C(t-\tau_1-2\tau)\frac{\pi}{2}+\theta_1)} + Tx(t-\tau_0-\tau) + Tx(t-\tau_1-\tau)$$

Correlation between the Rx and RxDelay is expressed by the following formula.

$$R(\tau) = \int_{-\infty}^{\infty} Rx(t) \times RxDelay^*(t-\tau) dt \quad (66)$$

Since the correlation value R(0) is at the point where the phases agree, i.e., τ=0, and the signal is periodic, R(0) is expressed as follows.

$$R(0) = \int_0^T Rx(t) \times RxDelay^*(t) dt \quad (67)$$

Further, this correlation value R(0) is expressed by the following formula by substituting the formula (64) and the formula (65) into the formula (67).

$$R(0) = \int_0^T \left( r_0 e^{j(C(t-\tau_0)\frac{\pi}{2}+\theta_0)} \times r_0 e^{-j(C(t-\tau_0-\tau)\frac{\pi}{2}+\theta_0)} \right) dt + \quad (68)$$

$$\int_0^T \left( r_0 e^{j(C(t-\tau_0)\frac{\pi}{2}+\theta_0)} \times r_1 e^{-j(C(t-\tau_1-2\tau)\frac{\pi}{2}+\theta_1)} \right) dt +$$

$$\int_0^T \left( r_0 e^{j(C(t-\tau_0)\frac{\pi}{2}+\theta_0)} \times Tx^*(t-\tau_0-\tau) \right) dt +$$

$$\int_0^T \left( r_0 e^{j(C(t-\tau_0)\frac{\pi}{2}+\theta_0)} \times Tx^*(t-\tau_1-\tau) \right) dt +$$

$$\int_0^T \left( r_1 e^{j(C(t-\tau_1-\tau)\frac{\pi}{2}+\theta_1)} \times r_0 e^{-j(C(t-\tau_0-\tau)\frac{\pi}{2}+\theta_0)} \right) dt +$$

$$\int_0^T \left( r_1 e^{j(C(t-\tau_1-\tau)\frac{\pi}{2}+\theta_1)} \times r_1 e^{-j(C(t-\tau_1-2\tau)\frac{\pi}{2}+\theta_1)} \right) dt +$$

$$\int_0^T \left( r_1 e^{j(C(t-\tau_1-\tau)\frac{\pi}{2}+\theta_1)} \times Tx^*(t-\tau_0-\tau) \right) dt +$$

$$\int_0^T \left( r_1 e^{j(C(t-\tau_1-\tau)\frac{\pi}{2}+\theta_1)} \times Tx^*(t-\tau_1-\tau) \right) dt +$$

$$\int_0^T \left( Tx(t-\tau_0) \times r_0 e^{-j(C(t-\tau_0-\tau)\frac{\pi}{2}+\theta_0)} \right) dt +$$

$$\int_0^T \left( Tx(t-\tau_0) \times r_1 e^{-j(C(t-\tau_1-2\tau)\frac{\pi}{2}+\theta_1)} \right) dt +$$

$$\int_0^T (Tx(t-\tau_0) \times Tx^*(t-\tau_0-\tau)) dt +$$

$$\int_0^T (Tx(t-\tau_0) \times Tx^*(t-\tau_1-\tau)) dt +$$

$$\int_0^T \left( Tx(t-\tau_1) \times r_0 e^{-j(C(t-\tau_0-\tau)\frac{\pi}{2}+\theta_0)} \right) dt +$$

$$\int_0^T \left( Tx(t-\tau_1) \times r_1 e^{-j(C(t-\tau_1-2\tau)\frac{\pi}{2}+\theta_1)} \right) dt +$$

$$\int_0^T (Tx(t-\tau_1) \times Tx^*(t-\tau_0-\tau)) dt +$$

-continued $$\int_0^T (Tx(t-\tau_1) \times Tx^*(t-\tau_1-\tau))dt$$

Here, in the formula (68), since the transmission signal (CDMA signal) and the calibration signal are not in correlation, and since the transmission signals (CDMA signals) having the time difference of 1 or more chips are not in correlation, all terms other than the fifth term can be approximated to zero. Then, the fifth term is expressed as follows.

$$R(0) \approx \int_0^T \left( r_1 e^{j(C(t-\tau_1-\tau)\frac{\pi}{2}+\theta_1)} \times r_0 e^{-j(C(t-\tau_0-\tau)\frac{\pi}{2}+\theta_0)} \right) dt \quad (69)$$

$$= \int_0^T \left( r_0 r_1 e^{j((C(t-\tau_1-\tau)-C(t-\tau_0-\tau))\frac{\pi}{2}+\theta_1-\theta_0)} \right) dt$$

$$\approx \int_0^T (r_0 r_1 e^{j(\theta_1-\theta_0)}) dt \quad (70)$$

$$= r_0 r_1 e^{j(\theta_1-\theta_0)} \times T \quad (71)$$

If $R(0)$ is expressed based on $Tx_0$, $R(0)$ is expressed as follows, and the correlation value is acquired.

$$R(0) = r_1 e^{j\theta_1} \quad (72)$$

Based on the output $R(0)$ of the correlation detecting unit 162, the weight generating unit 163 generates the weighting for compensating for the phase and/or the gain difference between the antennas produced by the radio frequency signal transmitting units 152 and 153. The complex multiplier 156 multiplies the weighting and the baseband signal from the modulating unit 164. Thereby, the phase and/or the gain difference produced by the radio frequency signal transmitting units 152 and 153 is compensated for.

Figure 12:
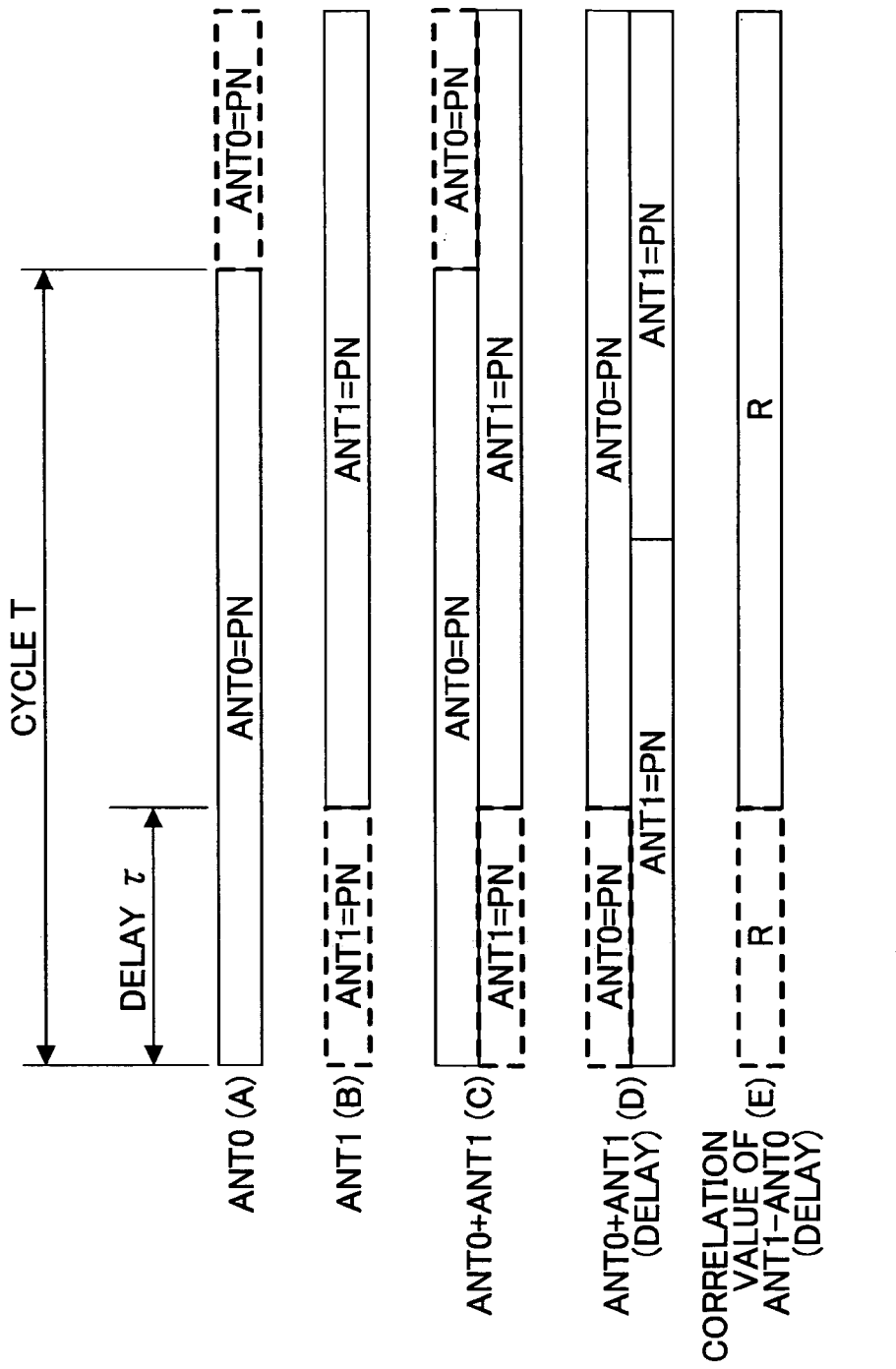
FIG. 12 is a timing chart showing operations of the radio frequency signal transmitting apparatus according to the seventh embodiment of the present invention.

FIG. 12 is a timing chart showing operations of the radio frequency signal transmitting apparatus according to the present embodiment.

In FIG. 12, ANT0 (A) represents the baseband signal (the main signal) output from the modulating unit 164 to which the calibration signal is added. Further, ANT1 (B) represents the baseband signal (the main signal) that is output from the modulating unit 164, and is delayed by the delaying unit 158, to which the calibration signal is added.

The signal of ANT0 (A) and the signal of ANT1 (B) are provided to the DCs 150 and 151, respectively, then are combined by the combiner 159, and are converted into a baseband signal by the radio frequency signal receiving unit 160, which baseband signal is shown by ANT0+ANT1 (C). The baseband signal that is delayed by the delaying unit 161 is shown by ANT0+ANT1 (delay) (D).

The signals ANT0+ANT1 (C) and ANT0+ANT1 (delay) (D) have the same timing at ANT1=PN and ANT0=PN. Therefore, when correlation of the signal of ANT0+ANT1 (C) and ANT0+ANT1 (delay) (D) is detected over the period T, the correlation value R between the signal of ANT0=PN of ANT0+ANT1 (delay) (D) and the signal of ANT1=PN of ANT0+ANT1 (C) is obtained. The phase and gain differences at the antennas ANT0 and ANT1 edges are compensated for using the correlation detection result.

Figure 13:
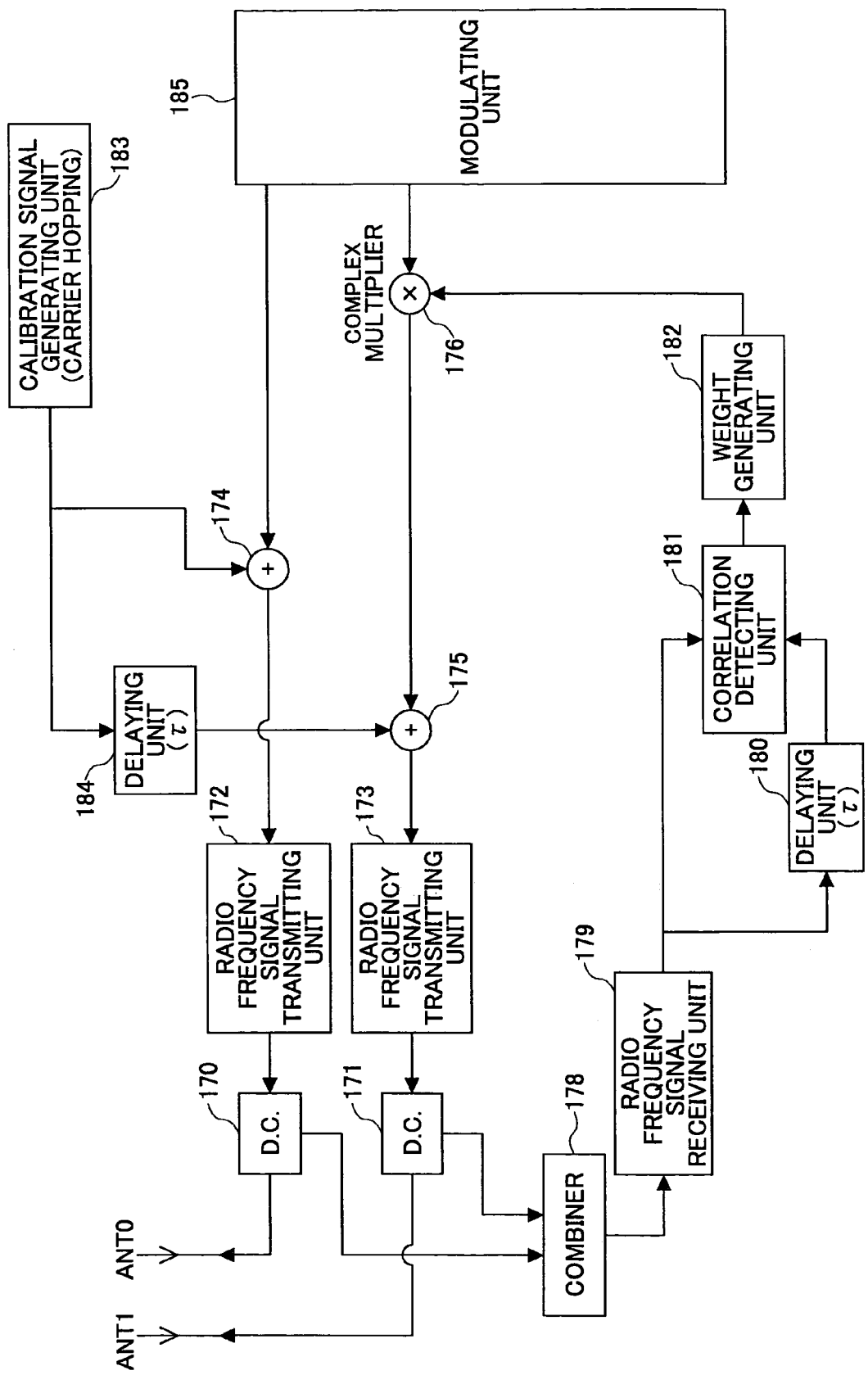
FIG. 13 is a block diagram showing the configuration of the radio frequency signal transmitting apparatus according to the eighth embodiment of the present invention.

FIG. 13 is a block diagram showing the configuration of the radio frequency signal transmitting apparatus according to the eighth embodiment of the present invention. The radio frequency signal transmitting apparatus shown in FIG. 13 is variation 2 of the radio frequency signal transmitting apparatus according to the second embodiment as shown in FIG. 3.

According to the present embodiment, a carrier hopping signal is used as the calibration signal of the transmitting radio unit. Since the frequency of the calibration signal changes with time, calibration signals having different frequencies are not in correlation, and correlation is detected only for the calibration signals whose frequencies agree.

The radio frequency signal transmitting apparatus includes the antennas ANT0 and ANT1, directional couplers (DCs) 170 and 171 having a signal branching function, radio frequency signal transmitting units 172 and 173, adders 174 and 175, a complex multiplier 176, a combiner 178, a radio frequency signal receiving unit 179 with the frequency conversion function to baseband, delaying units 180 and 184 that give time delay τ, a correlation detecting unit 181, a weight generating unit 182, a calibration signal generating unit 183 that generates the calibration signal that is a PN signal of the M sequence of a cycle T, and a modulating unit 185.

The calibration signal generating unit 183 generates the calibration signal that has a cycle different from the cycle of a transmission signal. The delaying unit 184 delays the generated calibration signal. According to the present embodiment, the delaying unit 184 delays the calibration signal that is to be added to the baseband signal of an antenna system of the antenna ANT1.

The adder 174 adds the calibration signal generated by the calibration signal generating unit 183 to the output from the modulating unit 185. The adder 175 adds the calibration signal generated by the calibration signal generating unit 183 and delayed by the delaying unit 184 to the output from the modulating unit 185 through the complex multiplier 176. Outputs of the adders 174 and 175 are provided to the radio frequency signal transmitting units 172 and 173, respectively.

The radio frequency signal transmitting units 172 and 173 convert the baseband signals that are adding results of the adders 174 and 175, respectively, into radio frequency signals. The radio frequency signals are transmitted from the antennas ANT0 and ANT1 through the respective DCs 170 and 171.

The DCs 170 and 171 branch the radio frequency signals from the radio frequency signal transmitting units 172 and 173, respectively, and provide them to the combiner 178. The combiner 178 combines the branched radio frequency signals corresponding to antennas ANT0 and ANT1. Then the radio frequency signal receiving unit 179 converts the combined radio frequency signal into a baseband signal. The baseband signal is provided to the delaying unit 180 and the correlation detecting unit 181.

The delaying unit 180 delays the baseband signal from the radio frequency signal receiving unit 179 by the delay time τ, which is the same amount as used by the delaying unit 184 for delaying the calibration signal. The correlation detecting unit 181 takes correlation between the baseband signal from the radio frequency signal receiving unit 179, and the baseband signal delayed by the delaying unit 180.

In this correlation detection, when the phase and amplitude of the two radio frequency signals output from the radio frequency signal transmitting units 172 and 173 are the same, correlation of the calibration signal becomes 1. Further, in the case of CDMA signals, if one of two signals is delayed by 1 or more chips in reference to the other signal, they are not in correlation. For this reason, the baseband signals output from the modulating unit 185 are not in correlation.

The weight generating unit 182 converts the correlation output from the correlation detecting unit 181 into a weighting, and outputs the weighting to the complex multiplier 176. The complex multiplier 176 multiplies the baseband signal from the modulating unit 185 and the weighting from the weight generating unit 182. The phase and amplitude differences due to the radio frequency signal transmitting units 172 and 173 are compensated for by this multiplication.

Below, the calibration by the radio frequency signal transmitting apparatus according to the present embodiment is explained using formulas. The following notations are used.

Calibration signal Cal:

$$Cal = \begin{cases} re^{j\omega_0 t} & 0 < t < \tau \\ 0 & \tau < t < \dfrac{T}{2} \\ re^{j\omega_1 t} & \dfrac{T}{2} < t < \dfrac{T}{2}+\tau \\ 0 & \dfrac{T}{2}+\tau < t < T \end{cases} \quad (73)$$

Transmitting baseband signal output from the modulating unit 185: Tx

Delay by the radio frequency signal transmitting unit connected to the antenna ANT0: $\tau_0$ Delay by the radio frequency signal transmitting unit connected to the antenna ANT1: $\tau_1$ Phase rotation of the radio frequency signal transmitting unit connected to the antenna ANT0: $\theta_0$ Phase rotation of the radio frequency signal transmitting unit connected to the antenna ANT1: $\theta_1$ The transmitting baseband signal $Tx_0$ on the side of the antenna ANT0 and the transmitting baseband signal $Tx_1$ on the side of the antenna ANT1 are expressed by the following formulas.

$$Tx_0 = \begin{cases} re^{j(\omega_0(t))} + Tx(t) & 0 < t < \tau \\ Tx(t) & \tau < t < 2\tau \\ re^{j(\omega_1(t))} + Tx(t) & 2\tau < t < 3\tau \\ Tx(t) & 3\tau < t < 4\tau \end{cases} \quad (74)$$

$$Tx_1 = \begin{cases} Tx(t) & 0 < t < \tau \\ re^{j(\omega_0(t-\tau))} + Tx(t) & \tau < t < 2\tau \\ Tx(t) & 2\tau < t < 3\tau \\ re^{j(\omega_1(t-\tau))} + Tx(t) & 3\tau < t < 4\tau \end{cases} \quad (75)$$

These signals are combined by the combiner 178, and are converted to a baseband signal Rx by the radio frequency signal receiving unit 179. The baseband signal Rx is expressed by the following formula.

$$Rx = Tx_0(t-\tau_0) + Tx_1(t-\tau_1) \quad (76)$$

-continued $$= \begin{cases} r_0 e^{j(\omega_0(t-\tau_0)+\theta_0)} + Tx(t-\tau_0) + Tx(t-\tau_1) & 0 < t < \tau \\ r_1 e^{j(\omega_0(t-\tau-\tau_1)+\theta_1)} + Tx(t-\tau_0) + Tx(t-\tau_1) & \tau < t < 2\tau \\ r_0 e^{j(\omega_1(t-\tau_0)+\theta_0)} + Tx(t-\tau_0) + Tx(t-\tau_1) & 2\tau < t < 3\tau \\ r_1 e^{j(\omega_1(t-\tau-\tau_1)+\theta_1)} + Tx(t-\tau_0) + Tx(t-\tau_1) & 3\tau < t < 4\tau \end{cases}$$

The baseband signal Rx which is delayed by $\tau=T/4$ by the delaying unit 180 is called RxDelay, and expressed by the following formula.

$$RxDelay = \quad (77)$$

$$\begin{cases} r_0 e^{j(\omega_0(t-\tau_0-\tau)+\theta_0)} + Tx(t-\tau_0-\tau) + Tx(t-\tau_1-\tau) & \tau < t < 2\tau \\ r_1 e^{j(\omega_0(t-2\tau-\tau_1)+\theta_1)} + Tx(t-\tau_0-\tau) + Tx(t-\tau_1-\tau) & 2\tau < t < 3\tau \\ r_0 e^{j(\omega_1(t-\tau_0-\tau)+\theta_0)} + Tx(t-\tau_0-\tau) + Tx(t-\tau_1-\tau) & 3\tau < t < 4\tau \\ r_1 e^{j(\omega_1(t-2\tau-\tau_1)+\theta_1)} + Tx(t-\tau_0-\tau) + Tx(t-\tau_1-\tau) & 4\tau < t < 5\tau \end{cases}$$

Correlation between Rx and RxDelay is expressed by the following formula.

$$R(\tau) = \int_{-\infty}^{\infty} Rx(t) \times RxDelay^*(t-\tau) dt \quad (78)$$

Since the correlation value to obtain is at the point where the phases agree, i.e., $\tau=0$, and is a periodic signal, $R(0)$ can be expressed as follows.

$$R(0) = \int_0^T Rx(t) \times RxDelay^*(t) dt \quad (79)$$

Further, the correlation value $R(0)$ is expressed by the following formula by substituting the formula (76) and the formula (77) into the formula (79), given that the difference between $\tau_0$ and $\tau_1$ is negligible as described above.

$$R(0) = \int_0^T Rx(t) \times RxDelay^*(t) dt \quad (80)$$

$$= \int_0^\tau ((r_0 e^{j\omega_0 t+\theta_0} + 2Tx(t)) \times (r_1 e^{j\omega_1(t-2\tau)+\theta_1} +$$

$$2Tx(t-\tau))^*) dt + \int_\tau^{2\tau} ((r_1 e^{j\omega_0(t-\tau)+\theta_1} + 2Tx(t)) \times$$

$$(r_0 e^{j\omega_0(t-\tau)+\theta_0} + 2Tx(t-\tau))^*) dt + \int_{2\tau}^{3\tau} ((r_0 e^{j\omega_1(t)+\theta_0} +$$

$$2Tx(t)) \times (r_1 e^{j\omega_0(t-2\tau)+\theta_1} + 2Tx(t-\tau))^*) dt +$$

$$\int_{3\tau}^\tau ((r_1 e^{j\omega_1(t-\tau)+\theta_1} + 2Tx(t)) \times (r_0 e^{j\omega_1(t-\tau)+\theta_0} +$$

$$2Tx(t-\tau))^*) dt$$

Since the frequencies differ, the first term and the third term can be approximated to zero, and the formula (80) is approximated as follows.

$$R(0) \approx \tag{81}$$

$$\int_\tau^{2\tau} ((r_1 e^{j(\omega_0(t-\tau)+\theta_1)} + 2Tx(t)) \times (r_1 e^{j(\omega_0(t-\tau)+\theta_0)} + 2Tx(t-\tau))^*) dt +$$

$$\int_{3\tau}^{T} ((r_1 e^{j(\omega_1(t-\tau)+\theta_1)} + 2Tx(t)) \times (r_0 e^{j(\omega_1(t-\tau)+\theta_0)} + 2Tx(t-\tau))^*) dt$$

The formula (81) is developed further as follows.

$$R(0) = \int_\tau^{2\tau} (r_1 e^{j(\omega_0(t-\tau)+\theta_1)} \times r_1 e^{-j(\omega_0(t-\tau)+\theta_0)}) dt + \tag{82}$$

$$\int_\tau^{2\tau} (r_1 e^{j(\omega_0(t-\tau)+\theta_1)} \times 2Tx^*(t-\tau)) dt +$$

$$\int_\tau^{2\tau} (2Tx(t) \times r_1 e^{-j(\omega_0(t-\tau)+\theta_0)}) dt + \int_\tau^{2\tau} (2Tx(t) \times 2Tx^*(t-\tau)) dt +$$

$$\int_{3\tau}^{4\tau} (r_1 e^{j(\omega_1(t-\tau)+\theta_1)} \times r_0 e^{-j(\omega_1(t-\tau)+\theta_0)}) dt +$$

$$\int_{3\tau}^{4\tau} (r_1 e^{j(\omega_1(t-\tau)+\theta_1)} \times 2Tx^*(t-\tau)) dt +$$

$$\int_{3\tau}^{4\tau} (2Tx(t) \times r_0 e^{-j(\omega_1(t-\tau)+\theta_0)}) dt + \int_{3\tau}^{4\tau} (2Tx(t) \times 2Tx^*(t-\tau)) dt$$

Here, in the formula (82), since the calibration signal and the transmission signal are not in correlation, the second, third, sixth and seventh terms can be approximated to zero. Further, since the fourth and eighth terms represent correlation between transmission signals (CDMA signal) that are apart by a time difference of 1 or more chips, these terms can be approximated to zero. Accordingly, R(0) is approximated as follows.

$$R(0) \approx \int_\tau^{2\tau} (r_1 e^{j(\omega_0(t-\tau)+\theta_1)} \times r_0 e^{-j(\omega_0(t-\tau)+\theta_0)}) dt + \tag{83}$$

$$\int_{3\tau}^{4\tau} (r_1 e^{j(\omega_1(t-\tau)+\theta_1)} \times r_0 e^{-j(\omega_1(t-\tau)+\theta_0)}) dt$$

$$= r_0 r_1 e^{j(\theta_1-\theta_0)} \times 2\tau$$

If R(0) is based on $Tx_0$, it is expressed as follows, and the correlation value is obtained.

$$R(0) = r_1 e^{j\theta_1} \times 2\tau \tag{84}$$

Based on the output R(0) of the correlation detecting unit 181, the weight generating unit 182 generates the weighting for compensating for the phase and/or the gain difference between the antennas of the radio frequency signal transmitting units 172 and 173. The complex multiplier 176 multiplies the weighting by the baseband signal from the modulating unit 185. Thereby, the phase and/or the gain difference between the antennas produced by the radio frequency signal transmitting units 172 and 173 is compensated for.

Figure 14:
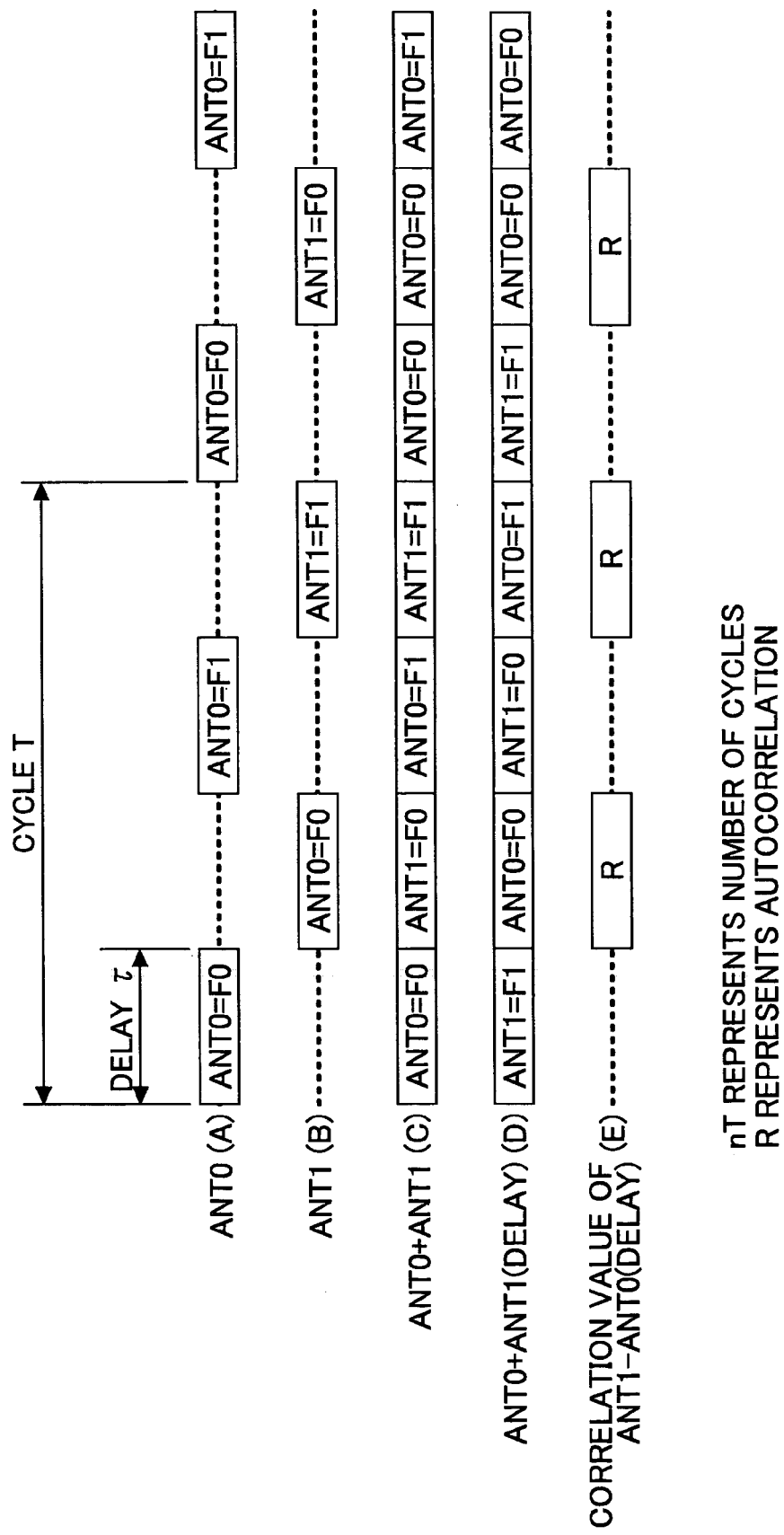
FIG. 14 is a timing chart showing operations of the radio frequency signal transmitting apparatus according to the eighth embodiment of the present invention.

FIG. 14 is a timing chart showing operations of the radio frequency signal transmitting apparatus according to the present embodiment.

In FIG. 14, ANT0 (A) represents the baseband signal (the main signal) from the modulating unit 185 to which the calibration signal is added. Further, ANT1 (B) represents the baseband signal (the main signal) from the modulating unit 185, to which baseband signal the calibration signal that is delayed by the delaying unit 184 is added.

The signal ANT0 (A) and the signal ANT1 (B) are provided to the DCs 170 and 171, respectively, are further provided to the combiner 178, and are combined. The combined signal is then converted into a baseband signal by the radio frequency signal receiving unit 179. The baseband signal is shown by ANT0+ANT1 (C). The baseband signal that is delayed by the delaying unit 180 is shown by ANT0+ANT1 (delay) (D).

The signals of ANT0+ANT1 (C) and ANT0+ANT1 (delay) (D) have the same frequency during periods R of "Correlation value between ANT1 and ANT0 (delay) (E)", namely, when ANT1=F0 and ANT0=F0, for example. Therefore, the correlation value of ANT0+ANT1 (C) and ANT0+ANT1 (delay) (D) is available for the periods R. Using the correlation value, detection of and compensation for the phase and gain differences between the antennas ANT0 and ANT1 are carried out.

Figure 15:
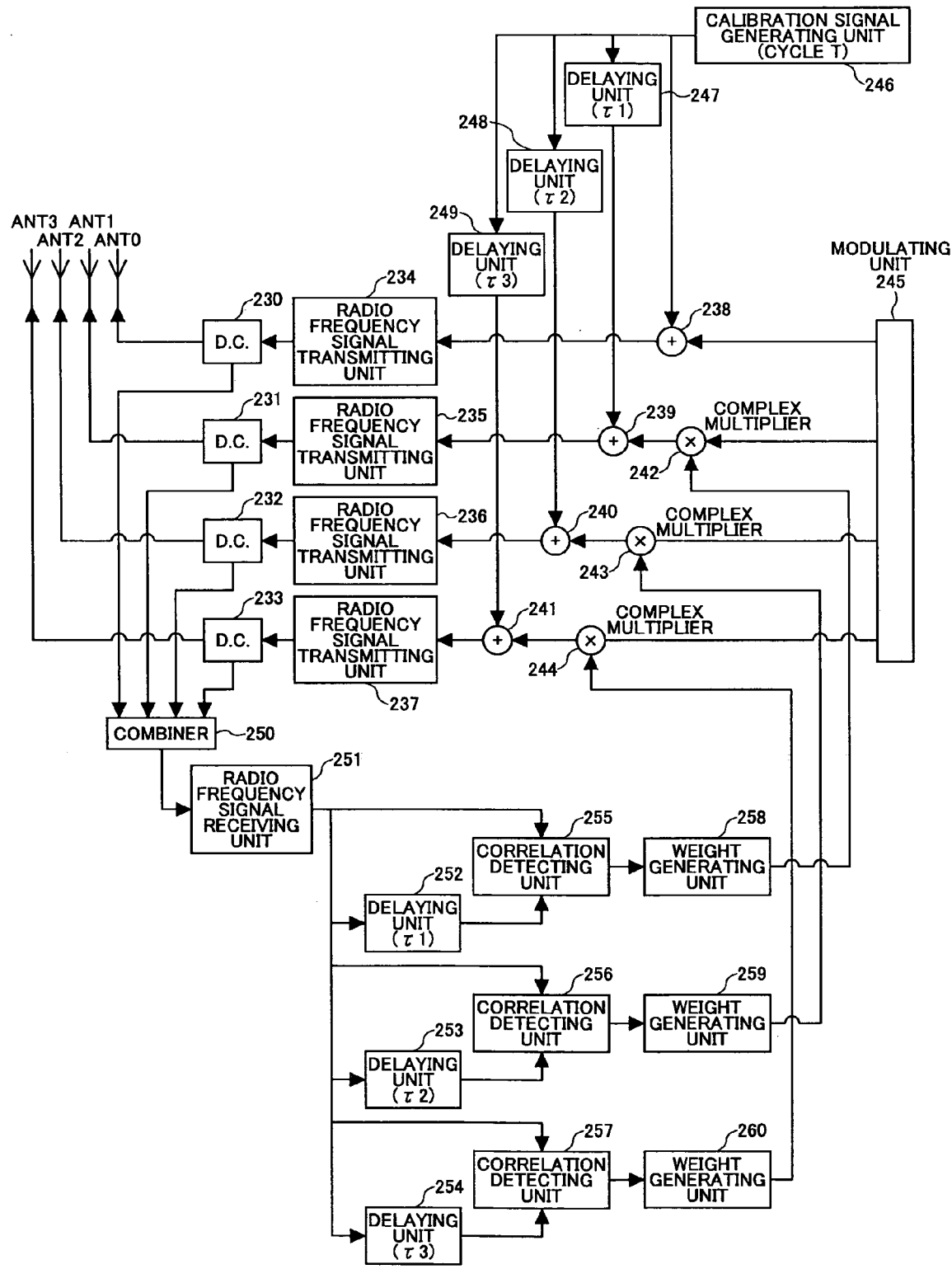
FIG. 15 is a block diagram showing the configuration of the radio frequency signal transmitting apparatus according to the ninth embodiment of the present invention.

FIG. 15 is a block diagram showing the configuration of the radio frequency signal transmitting apparatus according to the ninth embodiment of the present invention. The ninth embodiment shown in FIG. 15 is variation 3 of the second embodiment of the radio frequency signal transmitting apparatus as shown in FIG. 3.

The radio frequency signal transmitting apparatus includes the antennas ANT0 through ANT3, directional couplers (DCs) 230 through 233 having a signal branch function, radio frequency signal transmitting units 234 through 237, adders 238 through 241, complex multipliers 242 through 244, a multiplexer 250, a radio frequency signal receiving unit 251 having a frequency conversion function to baseband, delaying units 247 and 252 that provide delay $\tau_1$, delaying units 248 and 253 that provide delay $\tau_2$, delaying units 249 and 254 that provide delay $\tau_3$, correlation detecting units 255 through 257, weight generating units 258 through 260, a calibration signal generating unit 246 that generates the calibration signal of a cycle T, and a modulating unit 245.

The radio frequency signal transmitting apparatus according to the present embodiment compensates for phase and gain differences between a predetermined antenna and other antennas, wherein four antenna systems corresponding to the four antennas ANT0 through ANT3 are provided.

An antenna system corresponding to the antenna ANT0 includes DC 230, the radio frequency signal transmitting unit 234, and the adder 238. An antenna system corresponding to the antenna ANT1 includes DC 231, the radio frequency signal transmitting unit 235, the adder 239, the delaying unit 247, and the complex multiplier 242. An antenna system corresponding to the antenna ANT2 includes DC 232, the radio frequency signal transmitting unit 236, the adder 240, the delaying unit 248, and the complex multiplier 243. An antenna system corresponding to the antenna ANT3 includes DC 233, the radio frequency signal transmitting unit 237, the adder 241, the delaying unit 249, and the complex multiplier 244.

The calibration signal generating unit 246 generates the calibration signal that has a cycle different from the cycle of the transmission signal. The delaying units 247 through 249 delay the calibration signal.

According to the present embodiment, the delaying unit 247 delays the calibration signal that is to be added to the baseband signal corresponding to the antenna ANT1 by $\tau_1$, the delaying unit 248 delays the calibration signal that is to be added to the baseband signal corresponding to the antenna ANT2 by $\tau_2$, and the delaying unit 249 delays the calibration signal that is to be added to the baseband signal corresponding to the antenna ANT3 by $\tau_3$.

The adders 238 through 241 add the calibration signal generated by the calibration signal generating unit 246 as delayed by the delaying units 247 through 249, as applicable, to the output from the modulating unit 245 through the complex multipliers 242 through 244, as applicable. Outputs of the adders 238 through 241 are provided to the radio frequency signal transmitting units 234 through 237, respectively.

Specifically, the adder 238 adds the calibration signal and the baseband signal from the modulating unit 245, and provides the addition result to the radio frequency signal transmitting unit 234. Further, the adder 239 adds the output from the complex multiplier 242 and the calibration signal that is delayed by $\tau_1$, and provides the addition result to the radio frequency signal transmitting unit 235. Further, the adder 240 adds the output from the complex multiplier 243 and the calibration signal that is delayed by $\tau_2$, and provides the addition result to the radio frequency signal transmitting unit 236. Furthermore, the adder 241 adds the output from the complex multiplier 244 and the calibration signal and that is delayed by $\tau_3$, and provides the addition result to the radio frequency signal transmitting unit 237.

The radio frequency signal transmitting units 234 through 237 convert the addition results, which are baseband signals, from the adders 238 through 241, respectively, into radio frequency signals. The radio frequency signals are transmitted from the respective antennas ANT0 through ANT3 through DCs 230 through 233, respectively.

The DCs 230 through 233 branch the radio frequency signals from the radio frequency signal transmitting units 234 through 237, respectively, to the multiplexer 250. The multiplexer 250 combines the radio frequency signals corresponding to antennas ANT0 through ANT3. The combined radio frequency signal is provided to the radio frequency signal receiving unit 251, and is converted into a baseband signal. The baseband signal is divided into three parts.

Specifically, the first part of the branched baseband signal is provided to the delaying unit 252 while it is also provided to the correlation detecting unit 255. The delaying unit 252 delays the provided baseband signal by $\tau_1$, which is the same delay as given to the calibration signal by the delaying unit 247, and provides the delayed signal to the correlation detecting unit 255.

Further, the second part of the branched baseband signal is provided to the delaying unit 253 while it is also provided to the correlation detecting unit 256. The delaying unit 253 delays the provided baseband signal by $\tau_2$, which is the same delay as given to the calibration signal by the delaying unit 248, and provides the delayed signal to the correlation detecting unit 256. Furthermore, the third part of the branched baseband signal is provided to the delaying unit 254 while it is also provided to the correlation detecting unit 257. The delaying unit 254 delays the provided baseband signal by $\tau_3$, which is the same delay as given to the calibration signal by the delaying unit 249, and provides the delayed signal to the correlation detecting unit 257.

The correlation detecting units 255 through 257 take correlation between the baseband signal from the radio frequency signal receiving unit 251, and the respective baseband signals delayed by the corresponding delaying units 252 through 254. The weight generating units 258 through 260 convert the correlation values from the corresponding correlation detecting units 255 through 257, respectively, into weightings, and provide the weightings to the complex multipliers 242 through 244, respectively.

The weight generating unit 258 converts the correlation value from the correlation detecting unit 255 into a weighting, and provides the weighting to the complex multiplier 242. Further, the weight generating unit 259 converts the correlation value from the correlation detecting unit 256 into a weighting, and provides the weighting to the complex multiplier 243. Furthermore, the weight generating unit 260 converts the correlation value from the correlation detecting unit 257 into a weighting, and provides the weighting to the complex multiplier 244.

The complex multipliers 242 through 244 multiply the baseband signals from the modulating unit 245 and the weightings from the respective weight generating units 258 through 260, and provide the multiplication results to the respective adders 239 through 241. The phase and amplitude differences of the radio frequency signal transmitting units 234 through 237 are compensated for by these multiplication operations.

Below, the calibration by the radio frequency signal transmitting apparatus according to the present embodiment is explained using formulas. The following notations are used.

$$\text{Calibration signal: } \begin{aligned} Cal &= re^{jC(t)\frac{\pi}{2}} \\ C(t) &= -1 \text{ or } 1 \end{aligned} \quad (85)$$

Transmitting baseband signal output from the modulating unit 245: Tx

Delay of the radio frequency signal transmitting unit connected to the antenna ANT0: $\tau_0$ Delay of the radio frequency signal transmitting unit connected to the antenna ANT1: $\tau_1$ Delay of the radio frequency signal transmitting unit connected to the antenna ANT2: $\tau_2$ Delay of the radio frequency signal transmitting unit connected to the antenna ANT3: $\tau_3$ Phase rotation of the radio frequency signal transmitting unit connected to the antenna ANT0: $\theta_0$ Phase rotation of the radio frequency signal transmitting unit connected to the antenna ANT1: $\theta_1$ Phase rotation of the radio frequency signal transmitting unit connected to the antenna ANT2: $\theta_2$ Phase rotation of the radio frequency signal transmitting unit connected to the antenna ANT3: $\theta_3$ The transmitting baseband signal $Tx_0$ on the side of the antenna ANT0, the transmitting baseband signal $Tx_1$ on the side of the antenna ANT1, the transmitting baseband signal $Tx_2$ on the side of the antenna ANT2, and the transmitting baseband signal $Tx_3$ on the side of the antenna ANT3 are expressed by the following formulas.

$$Tx_0 = re^{j(C(t)\frac{\pi}{2})} + Tx(t) \quad (86)$$

$$Tx_1 = re^{j(C(t-\tau)\frac{\pi}{2})} + Tx(t) \quad (87)$$

$$Tx_2 = re^{j(C(t-3\tau)\frac{\pi}{2})} + Tx(t) \quad (88)$$

$$Tx_3 = re^{j(C(t-5\tau)\frac{\pi}{2})} + Tx(t) \quad (89)$$

The multiplexer 250 combines these signals, and provides the combined signal to the radio frequency signal receiving unit 251 where frequency conversion is carried out such that a baseband signal Rx is obtained. This baseband signal Rx is expressed by the following formula.

$$Rx = Tx_0(t-\tau_0) + Tx_1(t-\tau_1) + Tx_2(t-\tau_2) + Tx_3(t-\tau_3) \qquad (90)$$

$$= r_0 e^{j\left(C(t-\tau_0)\frac{\pi}{2}+\theta_0\right)} + r_1 e^{j\left(C(t-\tau-\tau_1)\frac{\pi}{2}+\theta_1\right)} +$$

$$r_2 e^{j\left(C(t-3\tau-\tau_2)\frac{\pi}{2}+\theta_2\right)} + r_3 e^{j\left(C(t-5\tau-\tau_3)\frac{\pi}{2}+\theta_3\right)} +$$

$$Tx(t-\tau_0) + Tx(t-\tau_1) + Tx(t-\tau_2) + Tx(t-\tau_3)$$

The baseband signal Rx is delayed by the delaying unit 252 by $\tau(\tau_1=\tau)$, and is made RxDelay$_1$ that is expressed by the following formula.

$$RxDelay_1 = r_0 e^{j\left(C(t-\tau_0-\tau)\frac{\pi}{2}+\theta_0\right)} + r_1 e^{j\left(C(t-\tau_1-2\tau)\frac{\pi}{2}+\theta_1\right)} + \qquad (91)$$

$$r_2 e^{j\left(C(t-\tau_2-4\tau)\frac{\pi}{2}+\theta_2\right)} + r_3 e^{j\left(C(t-\tau_3-6\tau)\frac{\pi}{2}+\theta_3\right)} + Tx(t-\tau_0-\tau) +$$

$$Tx(t-\tau_1-\tau) + Tx(t-\tau_2-\tau) + Tx(t-\tau_3-\tau)$$

The baseband signal Rx that is delayed by the delaying unit 253 by $3\tau(\tau_2=3\tau)$ is made RxDelay$_2$, and is expressed by the following formula.

$$RxDelay_2 = r_0 e^{j\left(C(t-\tau_0-3\tau)\frac{\pi}{2}+\theta_0\right)} + r_1 e^{j\left(C(t-\tau_1-4\tau)\frac{\pi}{2}+\theta_1\right)} + \qquad (92)$$

$$r_2 e^{j\left(C(t-\tau_2-6\tau)\frac{\pi}{2}+\theta_2\right)} + r_3 e^{j\left(C(t-\tau_3-8\tau)\frac{\pi}{2}+\theta_3\right)} + Tx(t-\tau_0-3\tau) +$$

$$Tx(t-\tau_1-3\tau) + Tx(t-\tau_2-3\tau) + Tx(t-\tau_3-3\tau)$$

The baseband signal Rx that is delayed by the delaying unit 254 by $5\tau(\tau_3=5\tau)$ is made RxDelay$_3$, and is expressed by the following formula.

$$RxDelay_3 = r_0 e^{j\left(C(t-\tau_0-5\tau)\frac{\pi}{2}+\theta_0\right)} + r_1 e^{j\left(C(t-\tau_1-6\tau)\frac{\pi}{2}+\theta_1\right)} + \qquad (93)$$

$$r_2 e^{j\left(C(t-\tau_2-8\tau)\frac{\pi}{2}+\theta_2\right)} + r_3 e^{j\left(C(t-\tau_3-10\tau)\frac{\pi}{2}+\theta_3\right)} + Tx(t-\tau_0-5\tau) +$$

$$Tx(t-\tau_1-5\tau) + Tx(t-\tau_2-5\tau) + Tx(t-\tau_3-5\tau)$$

Correlation between Rx and RxDelay is expressed by the following formula.

$$R(\tau) = \int_{-\infty}^{\infty} Rx(t) \times RxDelay^*(t-\tau)\,dt \qquad (94)$$

Since the correlation value to calculate is at the point where the phases agree, i.e., ($\tau=0$), and the signal is periodical, R(0) is obtained as follows.

$$R(0) = \int_0^T Rx(t) \times RxDelay^*(t)\,dt \qquad (95)$$

Correlation between Rx and RxDelay$_1$ is expressed by the following formula as in the above-mentioned embodiments.

$$R_{0-1}(0) \approx \int_0^T \left(r_1 e^{j\left(C(t-\tau_1-\tau)\frac{\pi}{2}+\theta_1\right)} \times r_0 e^{-j\left(C(t-\tau_0-\tau)\frac{\pi}{2}+\theta_0\right)}\right) dt \qquad (96)$$

$$= \int_0^T \left(r_0 r_1 e^{j\left((C(t-\tau_1-\tau)-C(t-\tau_0-\tau))\frac{\pi}{2}+\theta_1-\theta_0\right)}\right) dt$$

$$\approx \int_0^T \left(r_0 r_1 e^{j(\theta_1-\theta_0)}\right) dt$$

$$= r_0 r_1 e^{j(\theta_1-\theta_0)} \times T$$

Similarly, correlation between Rx and RxDelay$_2$ is expressed by the following formula.

$$R_{0-2}(0) \approx \int_0^T \left(r_2 e^{j\left(C(t-\tau_2-3\tau)\frac{\pi}{2}+\theta_2\right)} \times r_0 e^{-j\left(C(t-\tau_0-3\tau)\frac{\pi}{2}+\theta_0\right)}\right) dt \qquad (97)$$

$$= \int_0^T \left(r_0 r_2 e^{j\left((C(t-\tau_2-3\tau)-C(t-\tau_0-3\tau))\frac{\pi}{2}+\theta_2-\theta_0\right)}\right) dt$$

$$\approx \int_0^T \left(r_0 r_2 e^{j(\theta_2-\theta_0)}\right) dt$$

$$= r_0 r_2 e^{j(\theta_2-\theta_0)} \times T$$

Similarly, correlation of Rx and RxDelay$_3$ is expressed by the following formula.

$$R_{0-3}(0) \approx \int_0^T \left(r_3 e^{j\left(C(t-\tau_3-5\tau)\frac{\pi}{2}+\theta_3\right)} \times r_0 e^{-j\left(C(t-\tau_0-5\tau)\frac{\pi}{2}+\theta_0\right)}\right) dt \qquad (98)$$

$$= \int_0^T \left(r_0 r_3 e^{j\left((C(t-\tau_3-5\tau)-C(t-\tau_0-5\tau))\frac{\pi}{2}+\theta_3-\theta_0\right)}\right) dt$$

$$\approx \int_0^T \left(r_0 r_3 e^{j(\theta_3-\theta_0)}\right) dt$$

$$= r_0 r_3 e^{j(\theta_3-\theta_0)} \times T$$

Accordingly, the weighting $W_1$ of the antenna ANT1 is expressed by the following formula.

$$W_1 = \frac{1}{r_1} e^{-j\theta_1} \qquad (99)$$

Further, the weighting $W_2$ of the antenna ANT2 is expressed by the following formula.

$$W_2 = \frac{1}{r_2} e^{-j\theta_2} \qquad (100)$$

Further, the weighting $W_3$ of the antenna ANT3 is expressed by the following formula.

$$W_3 = \frac{1}{r_3} e^{-j\theta_3} \qquad (101)$$

Figure 16:
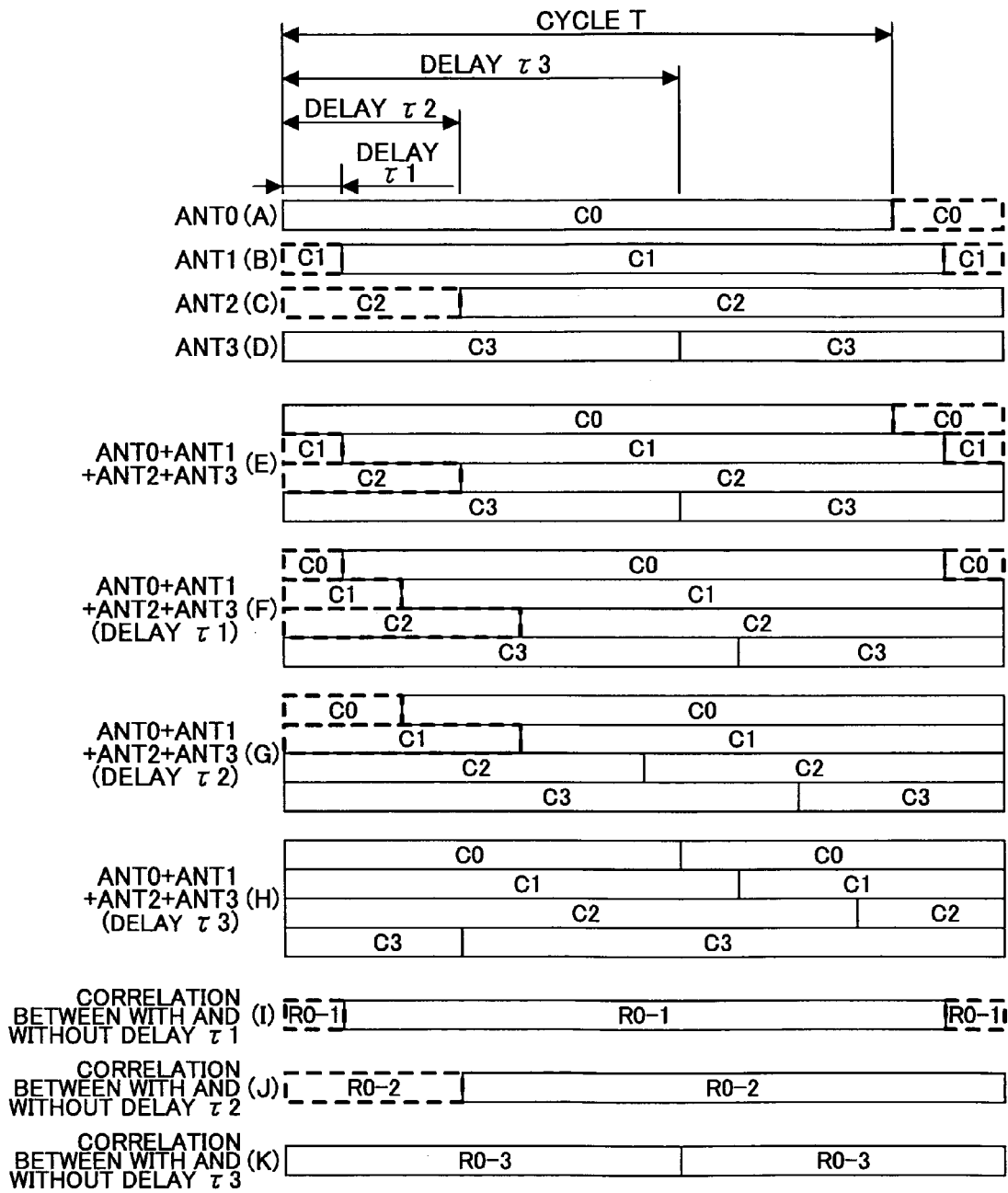
FIG. 16 is a timing chart showing operations of the radio frequency signal transmitting apparatus according to the ninth embodiment of the present invention.

FIG. 16 is a timing chart showing operations of the radio frequency signal transmitting apparatus according to the present embodiment.

In FIG. 16, ANT0 (A) represents the baseband signal (the main signal) from the modulating unit 245 to which the calibration signal is directly added. ANT1 (B) represents the baseband signal from the modulating unit 245 to which the calibration signal delayed by the delaying unit 247 is added. Further, ANT2 (C) represents the baseband signal from the modulating unit 245 to which the calibration signal delayed by the delaying unit 248 is added. Furthermore, ANT3 (D) represents the baseband signal from the modulating unit 245 to which the calibration signal delayed by the delaying unit 249 is added.

Further, ANT0 (A), ANT1 (B), ANT2 (C), and ANT3 (D) are converted to radio frequency signals by the respective radio frequency signal transmitting units 234 through 237, provided to the respective DCs 230 through 233, and combined by the multiplexer 250. The combined signal is converted into a baseband signal by the radio frequency signal receiving unit 251, which baseband signal is shown as ANT0+ANT1+ANT2+ANT3 (E).

Further, the baseband signal (E) that is delayed by the delaying unit 252 is shown by ANT0+ANT1+ANT2+ANT3 (delay $\tau_1$) (F). Further, the baseband signal (E) that is delayed by the delaying unit 253 is shown in ANT0+ANT1+ANT2+ANT3 (delay $\tau_2$) (G). Furthermore, the baseband signal (E) that is delayed by the delaying unit 254 is shown in ANT0+ANT1+ANT2+ANT3 (delay $\tau_3$) (H).

Furthermore, (I), (J), and (K) show the correlation values detected by the correlation detecting units 255, 256, and 257, respectively. That is, (I) shows the correlation value between the antenna ANT0 and the antenna ANT1, (J) shows the correlation value between the antenna ANT0 and the antenna ANT2, and (K) shows the correlation value between the antenna ANT0 and the antenna ANT3.

In this manner, the present embodiment is applicable to a system with any number of antennas, since the calibration is performed by obtaining correlation between a predetermined antenna ANT0 and each of other antennas such as ANT1, ANT2, and ANT3.

Figure 17:
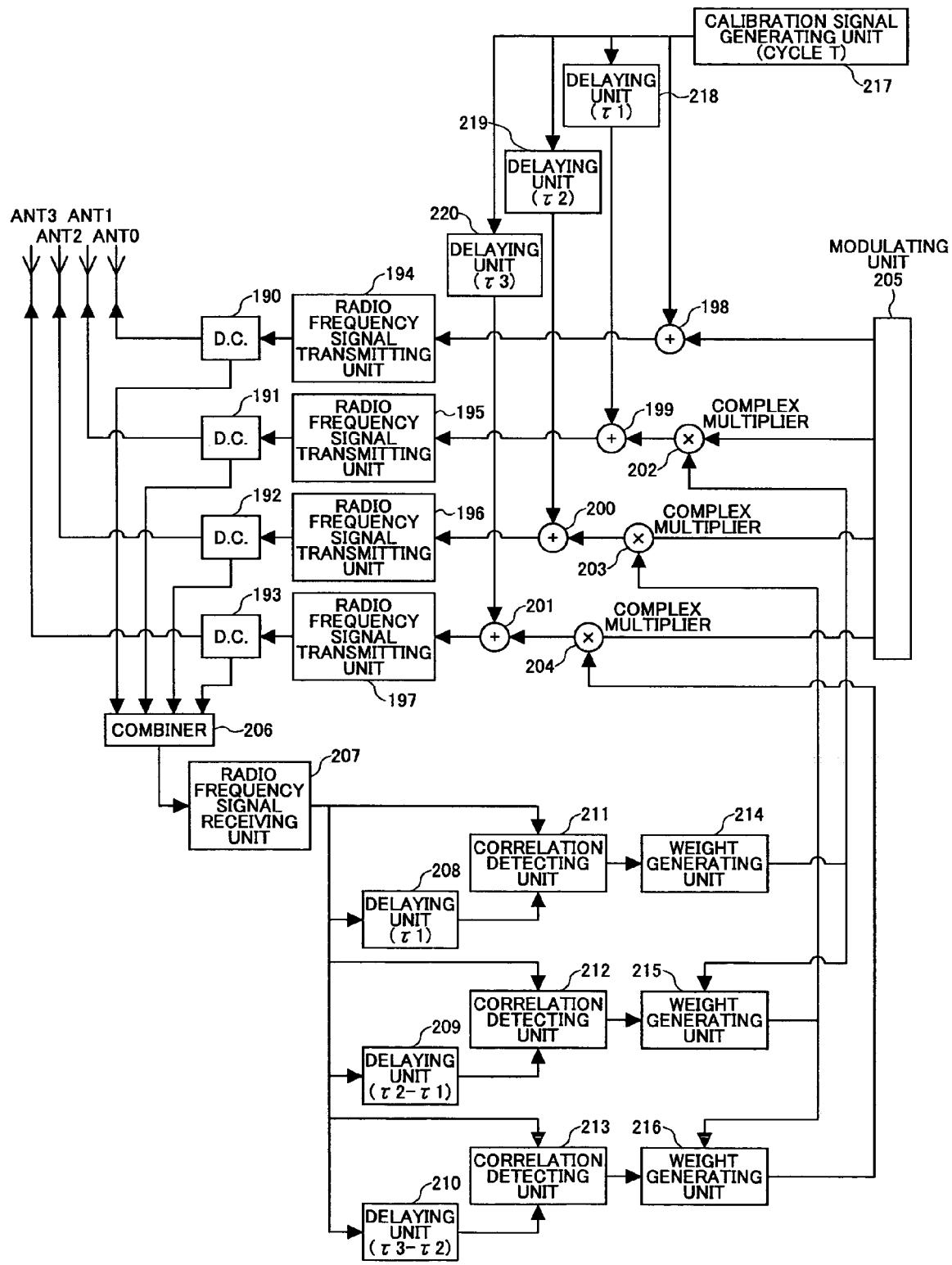
FIG. 17 is a block diagram showing the configuration of the radio frequency signal transmitting apparatus according to the tenth embodiment of the present invention.

FIG. 17 is a block diagram showing the configuration of the radio frequency signal transmitting apparatus according to the tenth embodiment of the present invention. The radio frequency signal transmitting apparatus shown in FIG. 17 is variation 4 of the radio frequency signal transmitting apparatus of the second embodiment shown in FIG. 3.

The radio frequency signal transmitting apparatus includes the antennas ANT0 through ANT3, directional couplers (DCs) 190 through 193 having a signal branching function, radio frequency signal transmitting units 194 through 197, adders 198 through 201, complex multipliers 202 through 204, a multiplexer 206, a radio frequency signal receiving unit 207 with the conversion function to baseband, a delaying unit 208 for delaying $\tau_1$, a delaying unit 209 for delaying $\tau_2-\tau_1$, a delaying unit 210 for delaying $\tau_3-\tau_2$, correlation detecting units 211 through 213, weight generating units 214 through 216, a calibration signal generating unit 217 that generates the calibration signal, a delaying unit 218 for delaying $\tau_1$, a delaying unit 219 for delaying $\tau_2$, a delaying unit 220 for delaying $\tau_3$, and a modulating unit 205.

The radio frequency signal transmitting apparatus according to the present embodiment shown in FIG. 17 compensates for differences of phase and gain between two or more antennas like the radio frequency signal transmitting apparatus shown in FIG. 15 having four antenna systems corresponding to four antennas.

An antenna system corresponding to the antenna ANT0 includes DC 190, the radio frequency signal transmitting unit 194, and the adder 198. An antenna system corresponding to the antenna ANT1 includes DC 191, the radio frequency signal transmitting unit 195, the adder 199, the delaying unit 218, and the complex multiplier 202. An antenna system corresponding to the antenna ANT2 includes DC 192, the radio frequency signal transmitting unit 196, the adder 200, the delaying unit 219, and the complex multiplier 203. An antenna system corresponding to the antenna ANT3 includes DC 193, the radio frequency signal transmitting unit 197, the adder 201, the delaying unit 220, and the complex multiplier 204.

The calibration signal generating unit 217 generates the calibration signal that has a cycle different from the cycle of the transmission signal. The delaying units 218 through 220 are for selectively delaying the calibration signal according to the antenna systems.

The delaying unit 218 delays the calibration signal to be added to the baseband signal corresponding to the antenna ANT1 by $\tau_1$. The delaying unit 219 delays the calibration signal to be added to the baseband signal corresponding to the antenna ANT2 by $\tau_2$. The delaying unit 220 delays the calibration signal to be added to the baseband signal corresponding to the antenna ANT3 by $\tau_3$.

The adder 198 adds the calibration signal to the output from the modulating unit 205. The adders 199 through 201 add the calibration signal delayed by the delaying units 218 through 220, respectively, to the output from the complex multipliers 202 through 204. The adders 198 through 201 output the respective added signals to the radio frequency signal transmitting units 194 through 197, respectively.

Specifically, the adder 198 adds the calibration signal without delay and the baseband signal from the modulating unit 205, and provides the addition result to the radio frequency signal transmitting unit 194. The adder 199 adds the calibration signal delayed by the delaying unit 218 and the output from the complex multiplier 202, and provides the addition result to the radio frequency signal transmitting unit 195. The adder 200 adds the calibration signal delayed by the delaying unit 219 and the output from the complex multiplier 203, and provides the addition result to the radio frequency signal transmitting unit 196. The adder 201 adds the calibration signal delayed by the delaying unit 220 and the output from the complex multiplier 204, and provides the addition result to the radio frequency signal transmitting unit 197.

The radio frequency signal transmitting units 194 through 197 convert the respective addition results, which are baseband signals, into respective radio frequency signals. The radio frequency signals are provided to the DCs 190 through 193, respectively, and are transmitted from the respective antennas ANT0 through ANT3.

The DCs 190 through 193 branch the radio frequency signals from the radio frequency signal transmitting units 194 through 197, respectively, to the multiplexer 206. The multiplexer 206 combines the radio frequency signals corresponding to antennas ANT0 through ANT3. The combined radio frequency signal is converted into a baseband signal by the radio frequency signal receiving unit 207. The baseband signal is branched and provided to the three correlation detecting units 211 through 213.

Specifically, the first branched baseband signal is provided to the delaying unit 208 and the correlation detecting unit 211. The delaying unit 208 delays the provided baseband signal by $\tau_1$, which is the same delay amount as the delaying unit 218 delays the calibration signal, and provides the delayed baseband signal to the correlation detecting unit 211.

Further, the second branched baseband signal is provided to the delaying unit 209 and the correlation detecting unit 212. The delaying unit 209 delays the provided baseband signal by $\tau_2-\tau_1$, $\tau_2$ being the delay amount that the delaying unit 219 delays the calibration signal, and provides the delayed baseband signal to the correlation detecting unit 212.

Further, the third branched baseband signal is provided to the delaying unit 210 and the correlation detecting unit 213. The delaying unit 210 delays the provided baseband signal by $\tau_3-\tau_2$, $\tau_3$ being the delay amount that the delaying unit 220 delays the calibration signal, and provides the delayed baseband signal to the correlation detecting unit 213.

The correlation detecting units 211 through 213 obtain values of correlation between the baseband signal from the radio frequency signal receiving unit 207 and the respective baseband signals delayed by the delaying units 208 through 210. The weight generating units 214 through 216 convert the respective correlation values provided by the respective correlation detecting units into weightings. The conversion to weightings by certain weight generating units is based on weighting values of the neighboring weight generating unit.

Specifically, while the weight generating unit 214 converts the correlation output from the correlation detecting unit 211 into a weighting and provides the weighting to the complex multiplier 202, the weighting is also provided to the weight generating unit 215. Further, while the weight generating unit 215 converts the correlation output from the correlation detecting unit 212 into a weighting based on the weight from the weighting generating unit 214, and provides the converted weighting to the complex multiplier 203, the converted weighting is also provided to the weight generating unit 216. Furthermore, the weight generating unit 216 converts the correlation output from the correlation detecting unit 213 into a weighting based on the weighting from the weight generating unit 215, and provides the converted weighting to the complex multiplier 204.

The complex multipliers 202 through 204 multiply the weightings from the weight generating units 214 through 216, respectively, by the baseband signals from the modulating unit 205, and provide the multiplication results to the adders 199 through 201, respectively. Compensation for the phase differences and the gain differences is carried out by the multiplication operations. That is, the phase differences and the amplitude differences due to the corresponding radio frequency signal transmitting units 194 through 197 are compensated for by these multiplication operations.

Below, the calibration performed by the radio frequency signal transmitting apparatus according to the present embodiment is explained using formulas.

$$\text{Calibration signal: } Cal = re^{jC(t)\frac{\pi}{2}} \quad (102)$$
$$C(t) = -1 \text{ or } 1$$

Transmitting baseband signal output from the modulating unit 205: Tx

Delay of the signal transmitting unit connected to the antenna ANT0: $\tau_0$

Delay of the signal transmitting unit connected to the antenna ANT1: $\tau_1$

Delay of the signal transmitting unit connected to the antenna ANT2: $\tau_2$

Delay of the signal transmitting unit connected to the antenna ANT3: $\tau_3$

Phase rotation of the radio frequency signal transmitting unit connected to the antenna ANT0: $\theta_0$ Phase rotation of the radio frequency signal transmitting unit connected to the antenna ANT1: $\theta_1$ Phase rotation of the radio frequency signal transmitting unit connected to the antenna ANT2: $\theta_2$ Phase rotation of the radio frequency signal transmitting unit connected to the antenna ANT3: $\theta_3$ The transmitting baseband signal $Tx_0$ on the side of the antenna ANT0, the transmitting baseband signal $Tx_1$ on the side of the antenna ANT1, the transmitting baseband signal $Tx_2$ on the side of the antenna ANT2, and the transmitting baseband signal $Tx_3$ on the side of the antenna ANT3 are expressed by the following formulas.

$$Tx_0 = re^{j\left(C(t)\frac{\pi}{2}\right)} + Tx(t) \quad (103)$$

$$Tx_1 = re^{j\left(C(t-\tau)\frac{\pi}{2}\right)} + Tx(t) \quad (104)$$

$$Tx_2 = re^{j\left(C(t-3\tau)\frac{\pi}{2}\right)} + Tx(t) \quad (105)$$

$$Tx_3 = re^{j\left(C(t-7\tau)\frac{\pi}{2}\right)} + Tx(t) \quad (106)$$

These signals are converted to respective radio frequency signals, provided to the multiplexer 206 through the respective DCs, combined by the multiplexer 206, and converted to a baseband signal Rx by the radio frequency signal receiving unit 207. The baseband signal Rx is expressed by the following formula.

$$\begin{aligned} Rx &= Tx_0(t-\tau_0) + Tx_1(t-\tau_1) + Tx_2(t-\tau_2) + Tx_3(t-\tau_3) \quad (107)\\ &= r_0 e^{j\left(C(t-\tau_0)\frac{\pi}{2}+\theta_0\right)} + r_1 e^{j\left(C(t-\tau-\tau_1)\frac{\pi}{2}+\theta_1\right)} + \\ &\quad r_2 e^{j\left(C(t-3\tau-\tau_2)\frac{\pi}{2}+\theta_2\right)} + r_3 e^{j\left(C(t-7\tau-\tau_3)\frac{\pi}{2}+\theta_3\right)} + Tx(t-\tau_0) + \\ &\quad Tx(t-\tau_1) + Tx(t-\tau_2) + Tx(t-\tau_3) \end{aligned}$$

The baseband signal Rx that is delayed by $\tau(\tau_1=\tau)$ is made into $RxDelay_1$, the delay being given by the delaying unit 208. $RxDelay_1$ is expressed by the following formula.

$$\begin{aligned} RxDelay_1 &= r_0 e^{j\left(C(t-\tau_0-\tau)\frac{\pi}{2}+\theta_0\right)} + r_1 e^{j\left(C(t-\tau_1-2\tau)\frac{\pi}{2}+\theta_1\right)} + \quad (108)\\ &\quad r_2 e^{j\left(C(t-\tau_2-4\tau)\frac{\pi}{2}+\theta_2\right)} + r_3 e^{j\left(C(t-\tau_3-8\tau)\frac{\pi}{2}+\theta_3\right)} + Tx(t-\tau_0-\tau) + \\ &\quad Tx(t-\tau_1-\tau) + Tx(t-\tau_2-\tau) + Tx(t-\tau_3-\tau) \end{aligned}$$

The baseband signal Rx that is delayed by $2\tau(\tau_2-\tau_1=2\tau)$ is made into $RxDelay_2$, the delay being given by the delaying unit 209. $RxDelay_2$ is expressed by the following formula.

$$\begin{aligned} RxDelay_2 &= r_0 e^{j\left(C(t-\tau_0-2\tau)\frac{\pi}{2}+\theta_0\right)} + r_1 e^{j\left(C(t-\tau_1-3\tau)\frac{\pi}{2}+\theta_1\right)} + \quad (109)\\ &\quad r_2 e^{j\left(C(t-\tau_2-5\tau)\frac{\pi}{2}+\theta_2\right)} + r_3 e^{j\left(C(t-\tau_3-9\tau)\frac{\pi}{2}+\theta_3\right)} + Tx(t-\tau_0-2\tau) + \\ &\quad Tx(t-\tau_1-2\tau) + Tx(t-\tau_2-2\tau) + Tx(t-\tau_3-2\tau) \end{aligned}$$

The baseband signal Rx that is delayed by $4\tau(\tau_3-\tau_2=4\tau)$ is made into $RxDelay_3$, the delay being given by the delaying unit 210. $RxDelay_3$ is expressed by the following formula.

$$RxDelay_3 = r_0 e^{j(C(t-\tau_0-4\tau)\frac{\pi}{2}+\theta_0)} + r_1 e^{j(C(t-\tau_1-5\tau)\frac{\pi}{2}+\theta_1)} + \quad (110)$$
$$r_2 e^{j(C(t-\tau_2-7\tau)\frac{\pi}{2}+\theta_2)} + r_3 e^{j(C(t-\tau_3-11\tau)\frac{\pi}{2}+\theta_3)} + Tx(t-\tau_0-4\tau) +$$
$$Tx(t-\tau_1-4\tau) + Tx(t-\tau_2-4\tau) + Tx(t-\tau_3-4\tau)$$

Correlation between Rx and RxDelay is expressed by the following formula.

$$R(\tau) = \int_{-\infty}^{\infty} Rx(t) \times RxDelay^*(t-\tau) dt \quad (111)$$

Since the correlation value to calculate is at the point where the phases agree (i.e., τ=0), and the signal is periodic, R(0) is expressed as follows.

$$R(0) = \int_0^T Rx(t) \times RxDelay^*(t) dt \quad (112)$$

Correlation between Rx and $RxDelay_1$ is expressed by the following formula as in the above-mentioned embodiments.

$$R_{0-1}(0) \approx \int_0^T \left( r_1 e^{j(C(t-\tau_1-\tau)\frac{\pi}{2}+\theta_1)} \times r_0 e^{-j(C(t-\tau_0-\tau)\frac{\pi}{2}+\theta_0)} \right) dt \quad (113)$$
$$= \int_0^T \left( r_0 r_1 e^{j((C(t-\tau_1-\tau)-C(t-\tau_0-\tau))\frac{\pi}{2}+\theta_1-\theta_0)} \right) dt$$
$$\approx \int_0^T (r_0 r_1 e^{j(\pi+\theta_1-\theta_0)}) dt$$
$$= r_0 r_1 e^{j(\theta_1-\theta_0)} \times T$$

Similarly, correlation between Rx and $RxDelay_2$ is expressed by the following formula.

$$R_{1-2}(0) \approx \int_0^T \left( r_2 e^{j(C(t-\tau_2-3\tau)\frac{\pi}{2}+\theta_2)} \times r_1 e^{-j(C(t-\tau_1-3\tau)\frac{\pi}{2}+\theta_1)} \right) dt \quad (114)$$
$$= \int_0^T \left( r_1 r_2 e^{j((C(t-\tau_2-3\tau)-C(t-\tau_1-3\tau))\frac{\pi}{2}+\theta_2-\theta_1)} \right) dt$$
$$\approx \int_0^T (r_1 r_2 e^{j(\theta_2-\theta_1)}) dt$$
$$= r_1 r_2 e^{j(\theta_2-\theta_1)} \times T$$

Similarly, correlation between Rx and $RxDelay_3$ is expressed by the following formula.

$$R_{2-3}(0) = \int_0^T \left( r_3 e^{j(C(t-\tau_3-7\tau)\frac{\pi}{2}+\theta_3)} \times r_2 e^{-j(C(t-\tau_3-7\tau)\frac{\pi}{2}+\theta_2)} \right) dt \quad (115)$$
$$= \int_0^T \left( r_2 r_3 e^{j(C(t-\tau_3-7\tau)-C(t-\tau_3-7\tau)\frac{\pi}{2}+\theta_3-\theta_2)} \right) dt$$
$$\approx \int_0^T (r_2 r_3 e^{j(\theta_3-\theta_2)}) dt$$
$$= r_2 r_3 e^{j(\theta_3-\theta_2)} \times T$$

Therefore, the weighting of the antenna ANT1 is expressed by the following formula.

$$W_1 = \frac{1}{r_1} e^{-j\theta_1} \quad (116)$$

Further, the weighting of the antenna ANT2 is expressed by the following formula.

$$W_2 = r_1 e^{-j\theta_1} \times \frac{1}{r_1 r_2} e^{j(\theta_1-\theta_2)} \quad (117)$$
$$= \frac{1}{r_2} e^{-j\theta_2}$$

Further, the weighting of the antenna ANT3 is expressed by the following formula.

$$W_3 = r_2 e^{-j\theta_2} \times \frac{1}{r_2 r_3} e^{j(\theta_2-\theta_3)} \quad (118)$$
$$= \frac{1}{r_3} e^{-j\theta_3}$$

Figure 18:
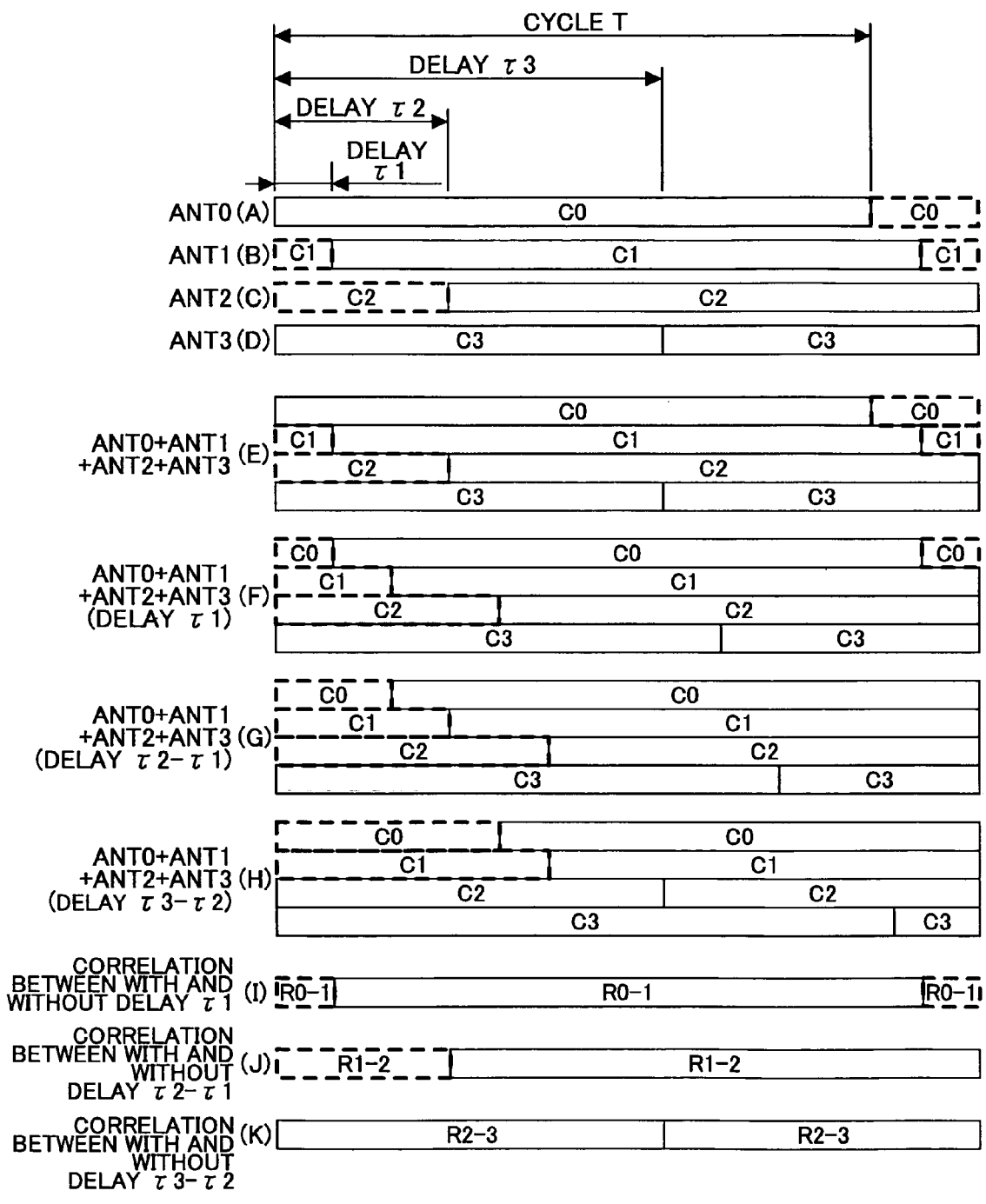
FIG. 18 is a timing chart showing operations of the radio frequency signal transmitting apparatus according to the tenth embodiment of the present invention.

FIG. 18 is a timing chart showing operations of the radio frequency signal transmitting apparatus according to the present embodiment.

In FIG. 18, ANT0 (A) represents the baseband signal (the main signal) output from the modulating unit 205 to which the calibration signal is directly (with no delay) added. ANT1 (B) represents the baseband signal (the main signal) output from the modulating unit 205 to which the calibration signal delayed by the delaying unit 218 is added. ANT2 (C) represents the baseband signal (the main signal) output from the modulating unit 205 to which the calibration signal delayed by the delaying unit 219 is added. Furthermore, ANT3 (D) represents the baseband signal (the main signal) output from the modulating unit 205 to which the calibration signal delayed by the delaying unit 220 is added.

Further, the signals ANT0 (A), ANT1 (B),

ANT2 (C), and ANT3 (D) are converted to respective radio frequency signals, provided to the DCs 190 through 193, respectively, provided to the multiplexer 206, and are combined. The combined signal output from the multiplexer 206 is converted into a baseband signal by the radio frequency signal receiving unit 207. This baseband signal is shown as ANT0+ANT1+ANT2+ANT3 (E).

The signal (E) delayed by $\tau_1$ by the delaying unit 208 is shown as ANT0+ANT1+ANT2+ANT3 (delay $\tau_1$) (F). Further, the signal (E) delayed by $\tau_2-\tau_1$ by the delaying unit 209 is shown as ANT0+ANT1+ANT2+ANT3 (delay $\tau_2-\tau_1$) (G). Furthermore, the signal (E) delayed by $\tau_3-\tau_2$ by the delaying unit 210 is shown as ANT0+ANT1+ANT2+ANT3 (delay $\tau_3-\tau_2$) (H) As shown at (I), (J), and (K), C1 of (E) and C0 of (F) have the same timing in the cycle T. Further, C2 of (E) and C1 of (G) have the same timing in the cycle T. Furthermore, C3 of (E) and C2 of (H) have the same timing in the cycle T. Accordingly, the correlation values between the antenna ANT0 and the antenna ANT1, between the antenna ANT1 and the antenna ANT2, and between the antenna ANT2 and the antenna ANT3 can be acquired.

As described above, the present embodiment is applicable to a system having any number of antennas, where the calibration is performed by detecting correlation between two or more antennas.

In the above, the embodiments of the radio frequency signal receiving apparatus and radio frequency signal transmitting apparatus of the present invention are described, to which the concept of the calibration of the present invention is applied. The concept of this calibration is summarized by flowcharts in FIG. 19 and FIG. 20.

Figure 19:
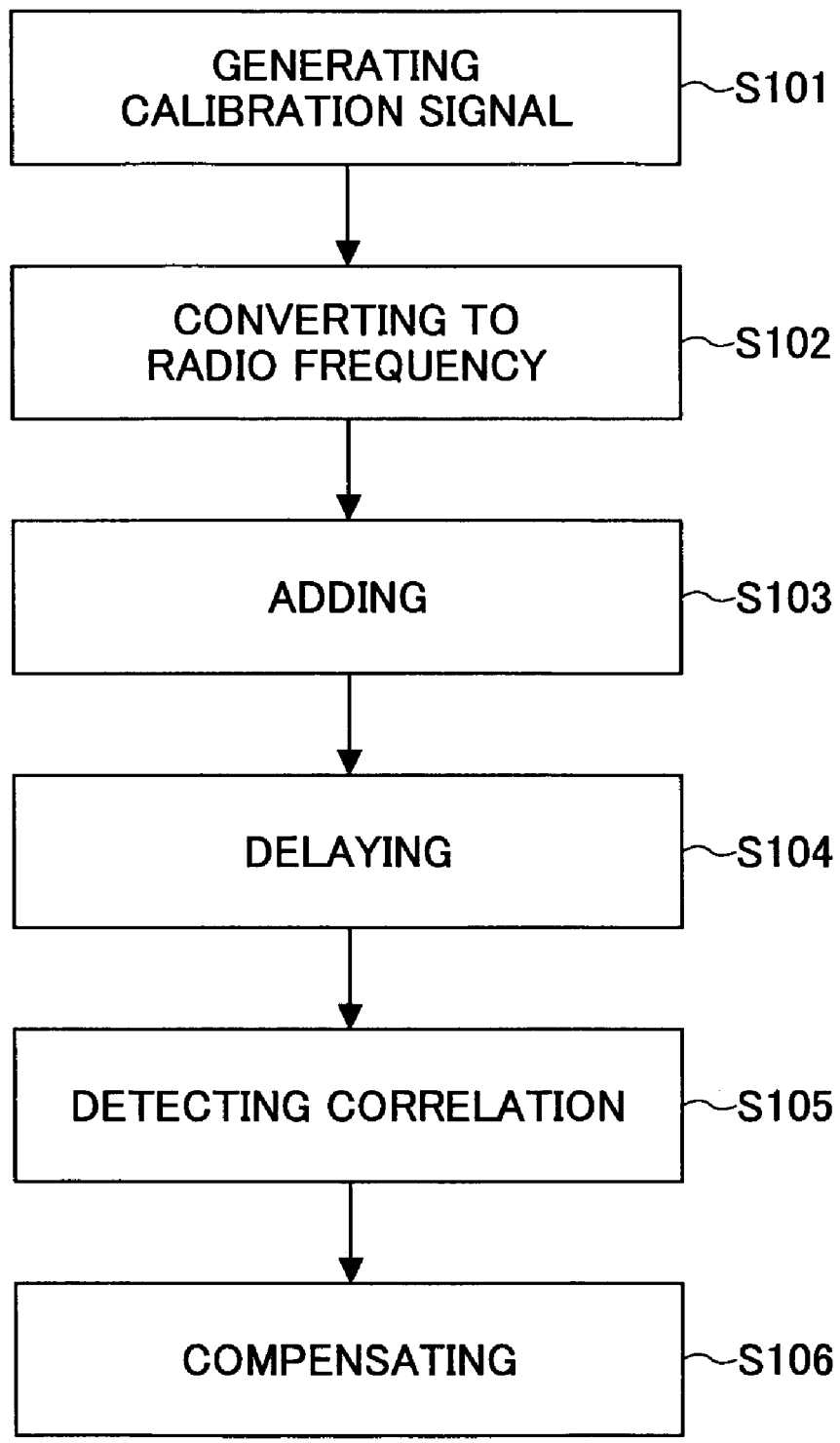
FIG. 19 is a flowchart explaining the concept of a calibration method of the present invention.

FIG. 19 summarizes the concept of the operations method of the radio frequency signal receiving apparatus (refer to FIG. 1) according to the first embodiment of the present invention. The method is applied to the radio frequency signal receiving apparatus that includes two or more antennas that receive a radio frequency signal spread by a spread code, radio frequency signal receiving units for each of the antennas, and a demodulating unit that receives and demodulates outputs of the radio frequency signal receiving units.

First, at Step S101, the calibration signal having a cycle different from the cycle of the spread code contained in the received signal is generated. Subsequently, at Step S102, the calibration signal generated at Step S101 is converted into a radio frequency signal. Subsequently, at Step S103, the calibration signal converted into the radio frequency signal at Step S102 is added to the radio frequency signal received by the antennas. Subsequently, at Step S104, one of the baseband signals converted by one of the radio frequency signal receiving units is delayed. Subsequently, at Step S105, correlation between the baseband signal delayed by Step S104 and the baseband signal that is converted by the other radio frequency signal receiving unit is acquired. Finally, at Step S106, differences of the phase and the gain that are produced by the radio frequency signal receiving units are compensated for based on the correlation output acquired at Step S105.

Figure 20:
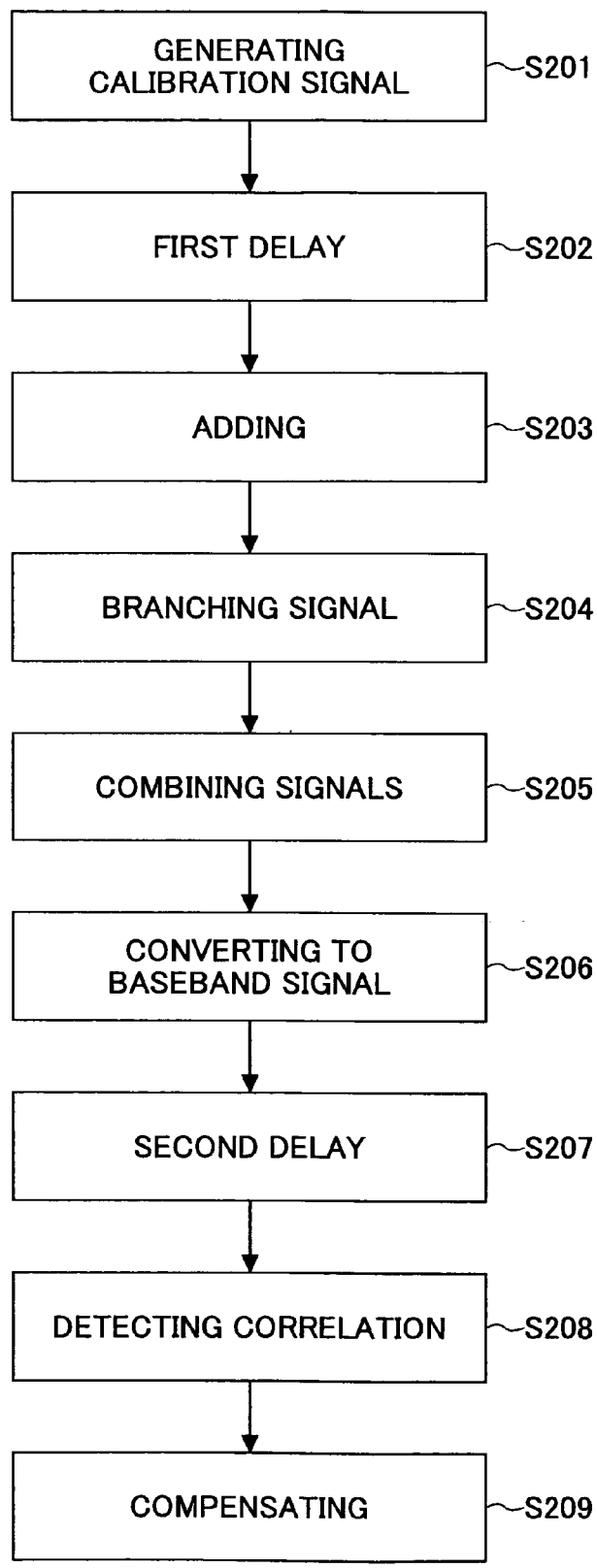
FIG. 20 is a flowchart explaining the concept of the calibration method of the present invention.

FIG. 20 is a flowchart explaining the concept of the calibration method of the radio frequency signal transmitting apparatus of the second embodiment of the present invention (refer to FIG. 3). This method is applied to a radio frequency signal transmitting apparatus that includes two or more antennas, radio frequency signal transmitting units for each of the antennas, and a modulating unit that modulates the main signal and provides the modulated main signal to the radio frequency signal transmitting units.

First, at Step S201, the calibration signal is generated, an autocorrelation of which peaks at a phase difference being 0, and is almost zero at other phase differences. Subsequently, the calibration signal generated at Step S201 is delayed by a first delay Step S202. Subsequently, at Step S203, the calibration signal generated at Step S201 and the calibration signal delayed by Step S202 are added to respective modulated baseband signals. Subsequently, at Step S204, results of the additions at Step S203 are converted into respective radio frequency signals, which are branched.

Next, at Step S205, the signals branched at Step S204 are combined. Subsequently, at Step S206, the result of combining in Step S205 is converted into a baseband signal. Subsequently, the baseband signal converted at Step S206 is delayed by a second delay Step S207. Subsequently, at Step S208, correlation between the baseband signal converted at Step S205 and the baseband signal delayed by Step S207 is acquired. Finally, at Step S209, differences of the phase and the gain that are produced by the radio frequency signal transmitting units are compensated for based on the correlation output acquired at Step S208.

Although the calibration signals used in the embodiments are of certain types having a cycle different from the received signal, they are examples; the present invention is not limited to these, but can also use other signals such as a chirp signal, the frequency of which fluctuates with time.

Figure 21:
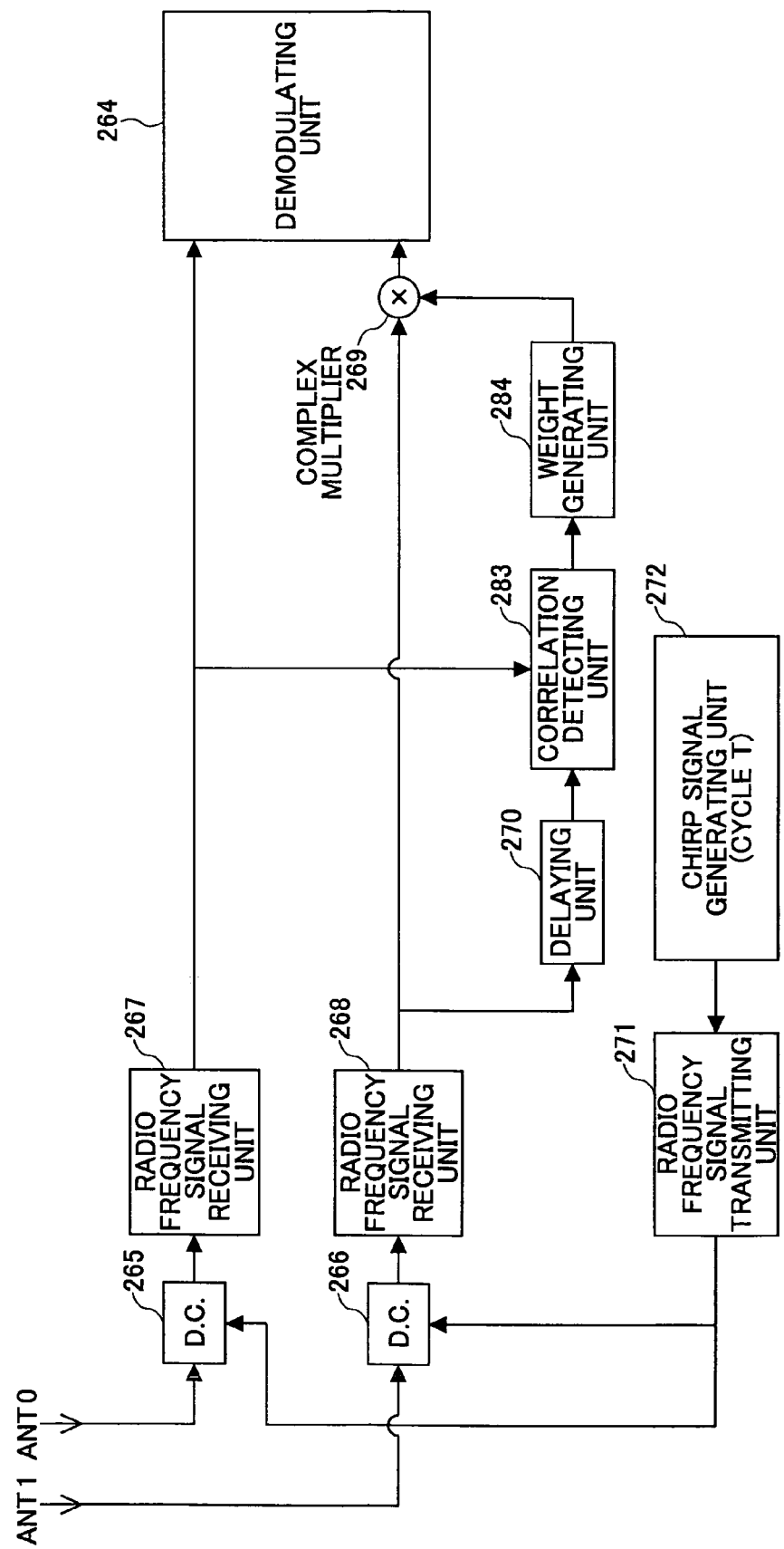
FIG. 21 is a block diagram showing the configuration of the radio frequency signal receiving apparatus according to another embodiment of the present invention.

FIG. 21 is a block diagram showing the configuration of the radio frequency signal receiving apparatus according to another embodiment of the present invention, using a chirp signal generating unit 272 in place of the calibration signal generating unit 15 of FIG. 1.

Figure 22:
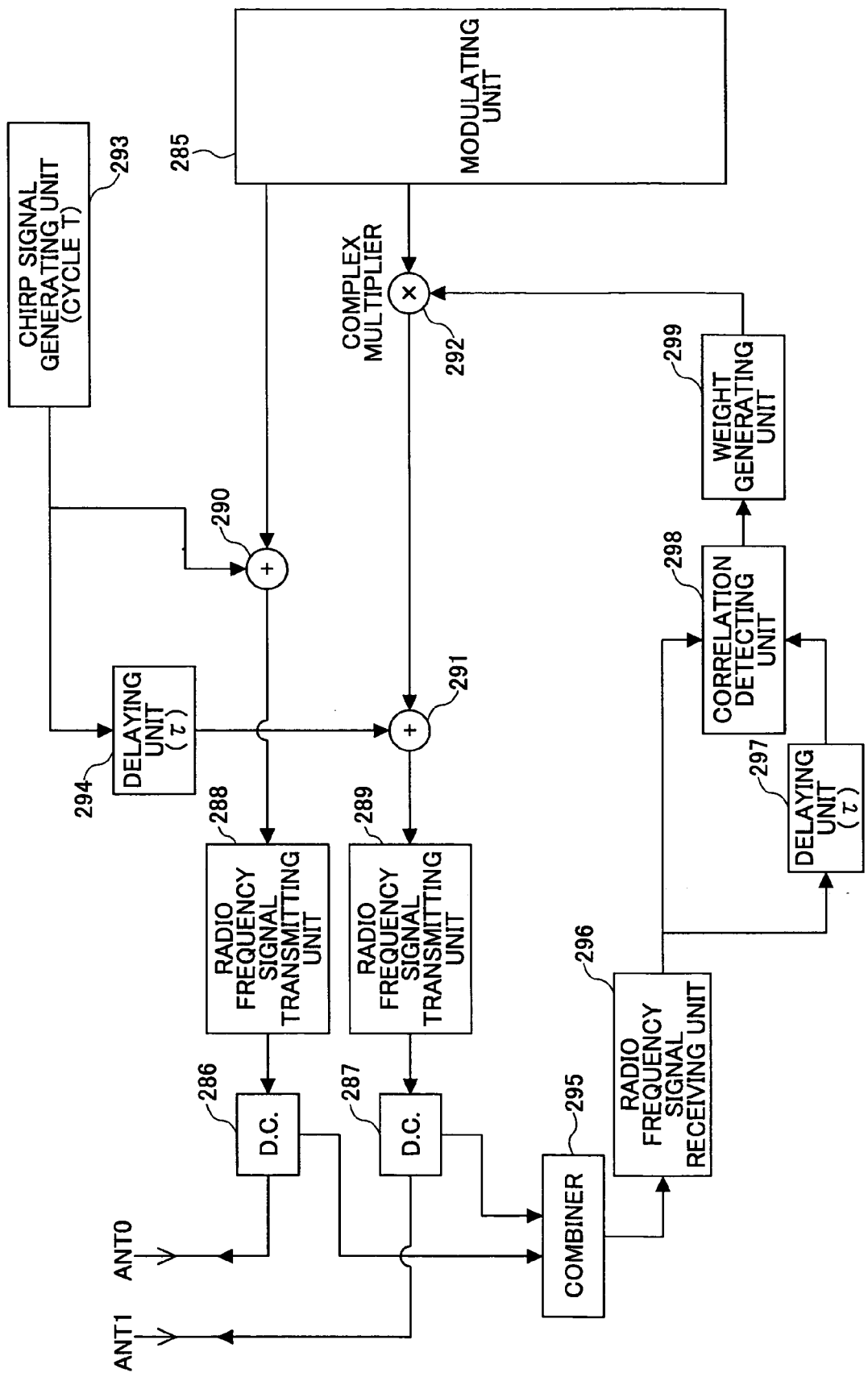
FIG. 22 is a block diagram showing the configuration of the radio frequency signal transmitting apparatus according to another embodiment of the present invention.
Figure 23:
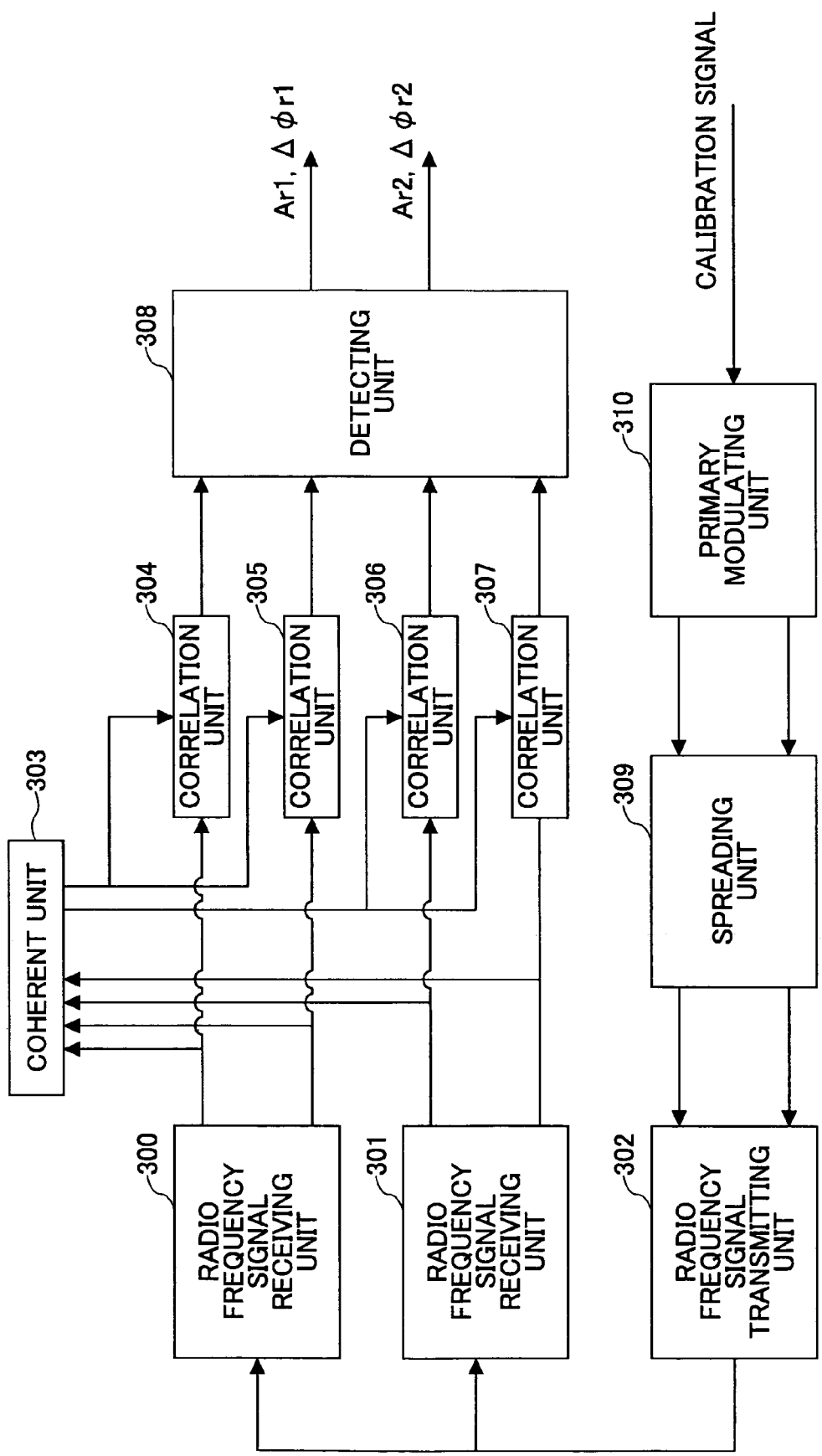
FIG. 23 is a block diagram showing a conventional calibration apparatus for an array antenna.

FIG. 22 is a block diagram showing the configuration of the radio frequency signal transmitting apparatus according to another embodiment of the present invention, using a chirp signal generating unit 293 in place of the calibration signal generating unit 42 of FIG. 3.

Further, the present invention is not limited to these embodiments, but various variations and modifications may be made without departing from the scope of the present invention.

The present application is based on Japanese Priority Application No. 2004-199681 filed on Jul. 6, 2004, with the Japanese Patent Office, the entire contents of which are hereby incorporated by reference.

What is claimed is:

1. A calibration method of a radio frequency signal receiving apparatus that includes a plurality of antennas, which antennas receive a radio frequency signal spread with a spread code, and a plurality of radio frequency signal receiving units, each being connected to a respective one of the antennas, comprising:

a step of generating a calibration signal having a cycle different from a cycle of the spread code;

a step of adding the calibration signal to the radio frequency signal received by each of the antennas, and providing the added signal to the respective radio frequency signal receiving units;

a step of detecting a value of correlation between a first baseband signal output by a first radio frequency signal receiving unit, and a second baseband signal output by a second radio frequency signal receiving unit, the second baseband signal being delayed by a predetermined amount; and a step of compensating for a phase difference and/or an amplitude difference between the antennas produced by the radio frequency signal receiving units based on the value of correlation.

2. The calibration method as claimed in claim 1, wherein the second radio frequency signal receiving unit is one of the radio frequency signal receiving units.

3. A calibration method of a radio frequency signal transmitting apparatus that includes a plurality of antennas and a plurality of radio frequency signal transmitting units, each transmitting unit being connected to a respective one of the antennas, comprising:

a step of generating a calibration signal, of which autocorrelation peaks at a phase difference being zero, and turns into no correlation at other phase differences;

a step of adding the calibration signal to baseband signals, each of which is to be converted to a radio frequency signal and transmitted by the respective radio frequency signal transmitting unit, and providing the added signals to the respective radio frequency signal transmitting units;

a step of combining the radio frequency signals output by the radio frequency signal transmitting units, and converting the combined radio frequency signal into a baseband signal;

a step of adding a predetermined delay to the converted baseband signal, and detecting a value of correlation between the converted signal that is delayed and the converted signal without the delay; and a step of compensating for a phase difference and a gain difference between the radio frequency signals based on the detected correlation value, the radio frequency signals being output by the radio frequency signal transmitting units.

4. A radio frequency signal receiving apparatus that includes a plurality of antennas, which antennas receive a radio frequency signal spread with a spread code, and a plurality of radio frequency signal receiving units, each being connected to a respective one of the antennas, comprising:

a calibration signal generating unit configured to generate a calibration signal that has a cycle different from the cycle of the spread code;

a frequency conversion unit configured to convert the calibration signal into a radio frequency signal;

an adder to add the calibration signal converted into the radio frequency signal to the radio frequency signal received by each of the antennas, a delaying unit that delays a first baseband signal from a first radio frequency signal receiving unit;

a correlation detection unit that detects correlation between the first baseband signal that is delayed by the delaying unit and a second baseband signal from a second radio frequency signal receiving unit; and a compensation unit to compensate for a phase difference and a gain difference between the baseband signals obtained by the radio frequency signal receiving units based on the output of the correlation detection unit.

5. The radio frequency signal receiving apparatus as claimed in claim 4, wherein the second radio frequency signal receiving unit is one of the radio frequency signal receiving units.

6. The radio frequency signal receiving apparatus as claimed in claim 4, wherein the calibration signal is a spectrum spreading signal of an M sequence.

7. The radio frequency signal receiving apparatus as claimed in claim 4, wherein the calibration signal is a multi-carrier signal.

8. The radio frequency signal receiving apparatus as claimed in claim 4, wherein the calibration signal is a chirp signal.

9. The radio frequency signal receiving apparatus as claimed in claim 4, wherein the correlation detection unit detects differences of the phase and the gain between the antennas.

10. The radio frequency signal receiving apparatus as claimed in claim 4, wherein the correlation detection unit detects differences of the phase and the gain between a predetermined antenna and the other antennas.

11. A radio frequency signal transmitting apparatus that includes a plurality of antennas and a plurality of radio frequency signal transmitting units, each transmitting unit being connected to a respective one of the antennas, comprising:

a calibration signal generating unit to generate a calibration signal, an autocorrelation of which peaks at a phase difference being zero, and turns into no correlation at other phase differences;

a first delaying unit that adds a predetermined delay to the calibration signal;

a first adder that adds the calibration signal to a baseband signal, and provides the added signal to a first radio frequency signal transmitting unit;

a second adder that adds the output of the first delaying unit to the baseband signal, and provides the added signal to a second radio frequency signal transmitting unit;

branching units, each being connected to a respective one of the first and the second radio frequency signal transmitting units, and branching the respective added signals;

a combiner that combines the branched added signals output from the branching units;

a frequency conversion unit to convert the duplexed signal into a baseband signal;

a second delaying unit that gives a predetermined delay to the baseband signal provided by the frequency conversion unit;

a correlation detection unit that detects correlation between the baseband signal that is not delayed and the baseband signal that is delayed by the second delaying unit; and a compensation unit to compensate for differences of the phase and the gain between the first and the second radio frequency signal transmitting units based on the output of the detection unit.

12. The radio frequency signal transmitting apparatus as claimed in claim 11, wherein the calibration signal is a spectrum spreading signal of an M sequence.

13. The radio frequency signal transmitting apparatus as claimed in claim 11, wherein the calibration signal is a frequency hopping signal.

14. The radio frequency signal transmitting apparatus as claimed in claim 11, wherein the calibration signal is a chirp signal.

15. The radio frequency signal transmitting apparatus as claimed in claim 11, wherein the correlation detection unit detects differences of the phase and the gain between the antennas.

16. The radio frequency signal transmitting apparatus as claimed in claim 11, wherein the correlation detection unit detects differences of the phase and the gain between a predetermined antenna and the other antennas.

* * * * *